(12) United States Patent
De Groot et al.

(10) Patent No.: US 7,978,338 B2
(45) Date of Patent: Jul. 12, 2011

(54) COMPOUND REFERENCE INTERFEROMETER

(75) Inventors: Peter De Groot, Middletown, CT (US); Mark Davidson, Palo Alto, CA (US); Jan Liesener, Middletown, CT (US); Xavier Colonna De Lega, Middlefield, CT (US); Leslie L. Deck, Middletown, CT (US)

(73) Assignee: Zygo Corporation, Middlefield, CT (US)

( * ) Notice: Subject to any disclaimer, the term of this patent is extended or adjusted under 35 U.S.C. 154(b) by 0 days.

(21) Appl. No.: 12/541,325

(22) Filed: Aug. 14, 2009

(65) Prior Publication Data

US 2010/0128276 A1 May 27, 2010

Related U.S. Application Data

(63) Continuation of application No. 12/509,098, filed on Jul. 24, 2009.

(60) Provisional application No. 61/118,151, filed on Nov. 26, 2008.

(51) Int. Cl.
*G01B 11/02* (2006.01)

(52) U.S. Cl. ...................................................... 356/497

(58) Field of Classification Search .................. 356/497, 356/485, 479
See application file for complete search history.

(56) References Cited

U.S. PATENT DOCUMENTS

| | | | |
|---|---|---|---|
| 2,612,074 A | 9/1952 | Mirau | |
| 4,188,122 A | 2/1980 | Massie et al. | |
| 4,199,219 A | 4/1980 | Suzuki et al. | |
| 4,340,306 A | 7/1982 | Balasubramanian | |
| 4,355,903 A | 10/1982 | Sandercock | |
| 4,523,846 A | 6/1985 | Breckinridge et al. | |
| 4,576,479 A | 3/1986 | Downs | |
| 4,583,858 A | 4/1986 | Lebling et al. | |
| 4,594,003 A | 6/1986 | Sommargren | |
| 4,618,262 A | 10/1986 | Maydan et al. | |
| 4,639,139 A | 1/1987 | Wyant et al. | |
| 4,660,980 A | 4/1987 | Takabayashi et al. | |
| 4,699,513 A | 10/1987 | Brooks et al. | |

(Continued)

FOREIGN PATENT DOCUMENTS

DE 4108944 9/1992

(Continued)

OTHER PUBLICATIONS

U.S. Appl. No. 60/177,912, filed Jan. 2000, de Groot.

(Continued)

*Primary Examiner* — Tarifur Chowdhury
*Assistant Examiner* — Jonathan M Hansen
(74) *Attorney, Agent, or Firm* — Fish & Richardson P.C.

(57) ABSTRACT

Interferometry system are disclosed that include a detector sub-system including a monitor detector, interferometer optics for combining test light from a test object with primary reference light from a first reference interface and secondary reference light from a second reference interface to form a monitor interference pattern on a monitor detector, wherein the first and second reference interfaces are mechanically fixed with respect to each other and the test light, a scanning stage configured to scan an optical path difference (OPD) between the test light and the primary and secondary reference light to the monitor detector while the detector sub-system records the monitor interference pattern for each of a series of OPD increments, and an electronic processor electronically coupled to the detector sub-system and the scanning stage, the electronic processor being configured to determine information about the OPD increments based on the detected monitor interference pattern.

19 Claims, 40 Drawing Sheets

U.S. PATENT DOCUMENTS

| | | | |
|---|---|---|---|
| 4,710,642 A | 12/1987 | McNeil | |
| 4,806,018 A | 2/1989 | Falk | |
| 4,818,110 A | 4/1989 | Davidson | |
| 4,869,593 A | 9/1989 | Biegen | |
| 4,923,301 A | 5/1990 | White | |
| 4,948,253 A | 8/1990 | Biegen | |
| 4,964,726 A | 10/1990 | Kleinknecht et al. | |
| 4,999,014 A | 3/1991 | Gold et al. | |
| 5,042,949 A | 8/1991 | Greenberg et al. | |
| 5,042,951 A | 8/1991 | Gold et al. | |
| 5,073,018 A | 12/1991 | Kind et al. | |
| 5,112,129 A | 5/1992 | Davidson et al. | |
| 5,122,648 A | 6/1992 | Cohen et al. | |
| 5,127,731 A | 7/1992 | De Groot | |
| 5,129,724 A | 7/1992 | Brophy et al. | |
| 5,133,601 A | 7/1992 | Cohen et al. | |
| 5,135,307 A | 8/1992 | de Groot et al. | |
| 5,153,669 A | 10/1992 | DeGroot | |
| 5,164,790 A | 11/1992 | McNeil et al. | |
| 5,166,751 A | 11/1992 | Massig | |
| 5,173,746 A | 12/1992 | Brophy | |
| 5,194,918 A | 3/1993 | Kino et al. | |
| 5,202,939 A | 4/1993 | Belleville et al. | |
| 5,241,369 A | 8/1993 | McNeil et al. | |
| 5,301,010 A | 4/1994 | Jones et al. | |
| 5,309,277 A | 5/1994 | Deck | |
| 5,343,294 A | 8/1994 | Kuchel et al. | |
| 5,355,221 A | 10/1994 | Cohen et al. | |
| 5,371,587 A | 12/1994 | De Groot et al. | |
| 5,371,588 A | 12/1994 | Davis et al. | |
| 5,384,717 A | 1/1995 | Ebenstein | |
| 5,386,119 A | 1/1995 | Ledger | |
| 5,390,023 A | 2/1995 | Biegen | |
| 5,398,113 A | 3/1995 | De Groot | |
| 5,402,234 A | 3/1995 | Deck | |
| 5,459,564 A | 10/1995 | Chivers | |
| 5,471,303 A | 11/1995 | Ai et al. | |
| 5,473,434 A | 12/1995 | De Groot | |
| 5,481,811 A | 1/1996 | Smith | |
| 5,483,064 A | 1/1996 | Frey et al. | |
| 5,539,517 A | 7/1996 | Cabib et al. | |
| 5,541,730 A | 7/1996 | Chaney | |
| 5,543,841 A | 8/1996 | Kanamori | |
| 5,555,471 A | 9/1996 | Xu et al. | |
| 5,587,792 A | 12/1996 | Nishizawa et al. | |
| 5,589,938 A | 12/1996 | Deck | |
| 5,594,543 A | 1/1997 | De Groot | |
| 5,596,409 A | 1/1997 | Marcus et al. | |
| 5,598,265 A | 1/1997 | De Groot | |
| 5,602,643 A | 2/1997 | Barrett | |
| 5,633,714 A | 5/1997 | Nyyssonen | |
| 5,640,270 A | 6/1997 | Aziz et al. | |
| 5,659,392 A | 8/1997 | Marcus et al. | |
| 5,671,050 A | 9/1997 | De Groot | |
| 5,703,692 A | 12/1997 | McNeil et al. | |
| 5,757,502 A | 5/1998 | Weling | |
| 5,774,224 A | 6/1998 | Kerstens | |
| 5,777,740 A | 7/1998 | Lacey et al. | |
| 5,777,741 A | 7/1998 | Deck | |
| 5,777,742 A | 7/1998 | Marron | |
| 5,784,164 A | 7/1998 | Deck et al. | |
| 5,856,871 A | 1/1999 | Cabib et al. | |
| 5,867,276 A | 2/1999 | McNeil et al. | |
| 5,880,838 A | 3/1999 | Marx et al. | |
| 5,898,501 A | 4/1999 | Suzuki et al. | |
| 5,900,633 A | 5/1999 | Solomon et al. | |
| 5,912,741 A | 6/1999 | Carter et al. | |
| 5,923,423 A | 7/1999 | Sawatari et al. | |
| 5,943,134 A | 8/1999 | Yamaguchi et al. | |
| 5,953,124 A | 9/1999 | Deck | |
| 5,956,141 A | 9/1999 | Hayashi | |
| 5,959,735 A | 9/1999 | Maris et al. | |
| 5,963,329 A | 10/1999 | Conrad et al. | |
| 5,995,224 A | 11/1999 | De Groot | |
| 5,999,263 A | 12/1999 | Deck et al. | |
| 6,011,624 A | 1/2000 | De Groot | |
| 6,028,670 A | 2/2000 | Deck | |
| 6,034,774 A | 3/2000 | Marcus et al. | |
| 6,038,027 A | 3/2000 | Marcus et al. | |
| 6,038,540 A | 3/2000 | Krist et al. | |
| 6,067,161 A | 5/2000 | Marcus et al. | |
| 6,072,581 A | 6/2000 | Stephenson et al. | |
| 6,075,601 A | 6/2000 | Marcus et al. | |
| 6,082,892 A | 7/2000 | Adel et al. | |
| 6,160,621 A | 12/2000 | Perry et al. | |
| 6,172,452 B1 | 1/2001 | Itaya et al. | |
| 6,175,669 B1 | 1/2001 | Colston et al. | |
| 6,181,420 B1 | 1/2001 | Badami et al. | |
| 6,201,609 B1 | 3/2001 | Hill et al. | |
| 6,208,424 B1 | 3/2001 | De Groot | |
| 6,219,144 B1 | 4/2001 | Hill et al. | |
| 6,226,092 B1 | 5/2001 | De Lega | |
| 6,242,739 B1 | 6/2001 | Cherkassky | |
| 6,249,351 B1 | 6/2001 | de Groot | |
| 6,252,667 B1 | 6/2001 | Hill et al. | |
| 6,259,521 B1 | 7/2001 | Miller et al. | |
| 6,275,297 B1 | 8/2001 | Zalicki | |
| 6,313,918 B1 | 11/2001 | Hill et al. | |
| 6,327,039 B1 | 12/2001 | De Groot et al. | |
| 6,359,692 B1 | 3/2002 | de Groot | |
| 6,370,299 B1 | 4/2002 | Green et al. | |
| 6,377,349 B1 | 4/2002 | Fercher | |
| 6,381,009 B1 | 4/2002 | McGahan | |
| 6,392,749 B1 | 5/2002 | Meeks et al. | |
| 6,407,816 B1 | 6/2002 | De Groot et al. | |
| 6,417,109 B1 | 7/2002 | Jordan et al. | |
| 6,417,927 B2 | 7/2002 | De Groot | |
| 6,429,943 B1 | 8/2002 | Opsal et al. | |
| 6,449,048 B1 | 9/2002 | Olszak | |
| 6,449,066 B1 | 9/2002 | Arns et al. | |
| 6,483,580 B1 | 11/2002 | Xu et al. | |
| 6,490,046 B1 | 12/2002 | Drabarek et al. | |
| 6,500,591 B1 | 12/2002 | Adams | |
| 6,507,405 B1 | 1/2003 | Grek et al. | |
| 6,525,825 B2 | 2/2003 | De Groot et al. | |
| 6,525,826 B2 | 2/2003 | De Groot et al. | |
| 6,529,279 B2 | 3/2003 | De Groot et al. | |
| 6,538,746 B1 | 3/2003 | Handrich | |
| 6,545,761 B1 | 4/2003 | Aziz et al. | |
| 6,545,763 B1 | 4/2003 | Kim et al. | |
| 6,590,656 B2 | 7/2003 | Xu et al. | |
| 6,597,460 B2 | 7/2003 | Groot et al. | |
| 6,611,330 B2 | 8/2003 | Lee et al. | |
| 6,624,893 B1 | 9/2003 | Schmit et al. | |
| 6,624,894 B2 * | 9/2003 | Olszak et al. | 356/511 |
| 6,631,004 B1 | 10/2003 | Hill et al. | |
| 6,633,389 B1 | 10/2003 | Poris et al. | |
| 6,633,831 B2 | 10/2003 | Nikoonahad et al. | |
| 6,636,322 B1 | 10/2003 | Terashita | |
| 6,694,284 B1 | 2/2004 | Nikoonahad et al. | |
| 6,714,307 B2 | 3/2004 | de Groot et al. | |
| 6,721,094 B1 | 4/2004 | Sinclair et al. | |
| 6,721,510 B2 | 4/2004 | Graves et al. | |
| 6,741,357 B2 | 5/2004 | Wang et al. | |
| 6,741,360 B2 | 5/2004 | D'Agraives et al. | |
| 6,775,006 B2 | 8/2004 | de Groot et al. | |
| 6,775,009 B2 | 8/2004 | Hill | |
| 6,778,280 B2 | 8/2004 | De Groot et al. | |
| 6,788,422 B2 | 9/2004 | Deck | |
| 6,816,264 B1 | 11/2004 | Dobbs | |
| 6,822,745 B2 | 11/2004 | De Groot | |
| 6,842,254 B2 | 1/2005 | Van Neste et al. | |
| 6,847,453 B2 | 1/2005 | Bush | |
| 6,856,384 B1 | 2/2005 | Rovira | |
| 6,888,638 B1 | 5/2005 | Hill | |
| 6,891,627 B1 | 5/2005 | Levy et al. | |
| 6,901,176 B2 | 5/2005 | Balachandran et al. | |
| 6,909,509 B2 | 6/2005 | DeGroot | |
| 6,925,860 B1 | 8/2005 | Poris et al. | |
| 6,940,604 B2 | 9/2005 | Jung et al. | |
| 6,956,658 B2 | 10/2005 | Meeks et al. | |
| 6,956,660 B2 | 10/2005 | Meeks et al. | |
| 6,977,730 B2 | 12/2005 | Evans | |
| 6,985,232 B2 | 1/2006 | Sezginer | |
| 6,987,570 B1 | 1/2006 | Schmit et al. | |
| 6,989,905 B2 | 1/2006 | De Groot | |
| 6,999,180 B1 | 2/2006 | Janik et al. | |

| | | |
|---|---|---|
| 7,012,700 B2 | 3/2006 | De Groot et al. |
| 7,018,271 B2 | 3/2006 | Wiswesser et al. |
| 7,030,995 B2 | 4/2006 | De Groot et al. |
| 7,038,850 B2 | 5/2006 | Chang et al. |
| 7,046,371 B2 | 5/2006 | De Lega et al. |
| 7,061,623 B2 | 6/2006 | Davidson |
| 7,068,376 B2 | 6/2006 | De Groot |
| 7,088,451 B2 | 8/2006 | Sezginer |
| 7,102,761 B2 | 9/2006 | de Lega et al. |
| 7,106,454 B2 | 9/2006 | De Groot et al. |
| 7,119,909 B2 | 10/2006 | Unruh et al. |
| 7,139,081 B2 | 11/2006 | De Groot |
| 7,139,083 B2 | 11/2006 | Fielden et al. |
| 7,142,311 B2 | 11/2006 | De Lega |
| 7,177,029 B2 | 2/2007 | De Groot |
| 7,177,030 B2 | 2/2007 | Leizerson |
| 7,187,453 B2 | 3/2007 | Belleville |
| 7,205,518 B2 | 4/2007 | Neuvonen |
| 7,239,398 B2 | 7/2007 | De Groot et al. |
| 7,271,918 B2 | 9/2007 | De Groot et al. |
| 7,277,183 B2 | 10/2007 | Deck |
| 7,283,248 B2 | 10/2007 | Hill |
| 7,289,224 B2 | 10/2007 | De Lega et al. |
| 7,289,225 B2 | 10/2007 | De Groot |
| 7,292,346 B2 | 11/2007 | De Groot et al. |
| 7,298,494 B2 | 11/2007 | De Groot |
| 7,304,747 B2 | 12/2007 | de Lega |
| 7,315,382 B2 | 1/2008 | De Groot |
| 7,321,430 B2 | 1/2008 | Deck |
| 7,321,431 B2 | 1/2008 | De Groot |
| 7,324,210 B2 | 1/2008 | De Groot et al. |
| 7,324,214 B2 | 1/2008 | De Groot et al. |
| 7,372,575 B2 | 5/2008 | Fujita |
| 7,403,289 B2 | 7/2008 | De Groot |
| 7,405,833 B2 | 7/2008 | Smythe et al. |
| 7,417,740 B2 | 8/2008 | Alphonse et al. |
| 7,417,743 B2 | 8/2008 | De Groot |
| 7,428,052 B2 | 9/2008 | Fujita |
| 7,428,057 B2 | 9/2008 | De Lega et al. |
| 7,446,881 B2 | 11/2008 | Suzuki et al. |
| 7,446,882 B2 | 11/2008 | De Lega et al. |
| 7,488,929 B2 | 2/2009 | Townley-Smith |
| 7,492,468 B2 | 2/2009 | Henselmans et al. |
| 7,492,469 B2 | 2/2009 | de Groot |
| 2002/0001086 A1 | 1/2002 | De Groot |
| 2002/0015146 A1 | 2/2002 | Meeks et al. |
| 2002/0085208 A1 | 7/2002 | Hauger et al. |
| 2002/0131053 A1 | 9/2002 | De Groot et al. |
| 2002/0135775 A1 | 9/2002 | de Groot et al. |
| 2002/0140945 A1 | 10/2002 | De Groot et al. |
| 2002/0140946 A1 | 10/2002 | De Groot et al. |
| 2002/0148955 A1 | 10/2002 | Hill |
| 2002/0176091 A1 | 11/2002 | Deck |
| 2002/0196450 A1 | 12/2002 | Olszak et al. |
| 2003/0007156 A1 | 1/2003 | De Groot et al. |
| 2003/0011784 A1 | 1/2003 | de Groot et al. |
| 2003/0048458 A1 | 3/2003 | Mieher et al. |
| 2003/0075721 A1 | 4/2003 | Li |
| 2003/0112444 A1 | 6/2003 | Yang et al. |
| 2003/0137671 A1 | 7/2003 | de Groot et al. |
| 2003/0197871 A1 | 10/2003 | de Groot |
| 2003/0223079 A1 | 12/2003 | Hill |
| 2004/0012791 A1 | 1/2004 | De Lega et al. |
| 2004/0027576 A1 | 2/2004 | de Groot et al. |
| 2004/0046965 A1 | 3/2004 | Hill |
| 2004/0075843 A1 | 4/2004 | Marron et al. |
| 2004/0085544 A1 | 5/2004 | de Groot et al. |
| 2004/0185582 A1 | 9/2004 | Kueny |
| 2004/0189999 A1 | 9/2004 | De Groot et al. |
| 2004/0233442 A1 | 11/2004 | Mieher et al. |
| 2004/0233444 A1 | 11/2004 | Mieher et al. |
| 2004/0246493 A1 | 12/2004 | Kim et al. |
| 2005/0007599 A1 | 1/2005 | De Groot |
| 2005/0024773 A1 | 2/2005 | Lille |
| 2005/0029192 A1 | 2/2005 | Arnold et al. |
| 2005/0030549 A1 | 2/2005 | Hill |
| 2005/0057757 A1 | 3/2005 | De Lega et al. |
| 2005/0068540 A1 | 3/2005 | De Groot et al. |
| 2005/0073692 A1 | 4/2005 | De Groot et al. |
| 2005/0078318 A1 | 4/2005 | De Groot |
| 2005/0078319 A1 | 4/2005 | De Groot |
| 2005/0088663 A1 | 4/2005 | De Groot et al. |
| 2005/0134862 A1 | 6/2005 | Hill |
| 2005/0146727 A1 | 7/2005 | Hill |
| 2005/0151951 A1 | 7/2005 | Hill |
| 2005/0157306 A1 | 7/2005 | Schmit et al. |
| 2005/0162664 A1 | 7/2005 | Hill |
| 2005/0168754 A1 | 8/2005 | Hill |
| 2005/0168755 A1 | 8/2005 | Hill |
| 2005/0179911 A1 | 8/2005 | Boomgarden et al. |
| 2005/0200856 A1 | 9/2005 | De Groot |
| 2005/0225769 A1 | 10/2005 | Bankhead et al. |
| 2005/0232531 A1 | 10/2005 | Hadley et al. |
| 2005/0237534 A1 | 10/2005 | Deck |
| 2005/0237535 A1 | 10/2005 | Deck |
| 2005/0237537 A1 | 10/2005 | Leizerson et al. |
| 2005/0238289 A1 | 10/2005 | Shull et al. |
| 2006/0008596 A1 | 1/2006 | Pokorny et al. |
| 2006/0012582 A1 | 1/2006 | de Lega |
| 2006/0072104 A1 | 4/2006 | Engel et al. |
| 2006/0103850 A1 | 5/2006 | Alphonse et al. |
| 2006/0119841 A1 | 6/2006 | Saunders et al. |
| 2006/0158657 A1 | 7/2006 | De Lega et al. |
| 2006/0158658 A1 | 7/2006 | De Lega et al. |
| 2006/0170932 A1 | 8/2006 | Hayashi et al. |
| 2006/0187465 A1* | 8/2006 | Groot ........................... 356/512 |
| 2006/0262321 A1 | 11/2006 | De Groot |
| 2007/0002330 A1 | 1/2007 | Hill |
| 2007/0008551 A1 | 1/2007 | Tang |
| 2007/0035742 A1 | 2/2007 | Hill |
| 2007/0046953 A1 | 3/2007 | De Groot et al. |
| 2007/0064240 A1 | 3/2007 | Hill |
| 2007/0081167 A1 | 4/2007 | De Groot |
| 2007/0086013 A1 | 4/2007 | de Lega et al. |
| 2007/0086016 A1 | 4/2007 | Carlson |
| 2007/0091317 A1 | 4/2007 | Freischlad et al. |
| 2007/0091318 A1 | 4/2007 | Freishlad et al. |
| 2007/0091940 A1 | 4/2007 | Jameson |
| 2007/0097380 A1 | 5/2007 | de Groot et al. |
| 2007/0127034 A1 | 6/2007 | Koshimizu et al. |
| 2007/0127036 A1 | 6/2007 | Liao et al. |
| 2007/0139656 A1 | 6/2007 | Wan |
| 2007/0171425 A1 | 7/2007 | De Groot et al. |
| 2007/0206201 A1 | 9/2007 | De Groot et al. |
| 2007/0222988 A1 | 9/2007 | Jiang et al. |
| 2007/0247637 A1 | 10/2007 | De Groot |
| 2008/0018901 A1 | 1/2008 | De Groot |
| 2008/0049233 A1 | 2/2008 | De Groot |
| 2008/0062405 A1 | 3/2008 | Hill |
| 2008/0065350 A1 | 3/2008 | De Groot |
| 2008/0068614 A1 | 3/2008 | De Groot |
| 2008/0088849 A1 | 4/2008 | de Lega et al. |
| 2008/0117428 A1 | 5/2008 | Hill |
| 2008/0151229 A1 | 6/2008 | Hill |
| 2008/0165345 A1 | 7/2008 | Hill |
| 2008/0165347 A1 | 7/2008 | De Groot et al. |
| 2008/0174784 A1 | 7/2008 | De Lega et al. |
| 2008/0180679 A1 | 7/2008 | De Groot |
| 2008/0180694 A1 | 7/2008 | De Groot et al. |
| 2008/0221837 A1 | 9/2008 | De Groot |
| 2008/0266571 A1 | 10/2008 | Deck |
| 2008/0266574 A1 | 10/2008 | De Groot et al. |
| 2008/0285051 A1 | 11/2008 | Hill |
| 2009/0018786 A1 | 1/2009 | Munteanu et al. |

FOREIGN PATENT DOCUMENTS

| | | |
|---|---|---|
| DE | 4309056 | 9/1994 |
| EP | 0 397 388 | 11/1990 |
| EP | 0 549 166 | 6/1993 |
| EP | 0 617 255 | 9/1994 |
| EP | 0 647 310 | 10/1997 |
| EP | 0 929 094 | 7/1999 |
| GB | 2385417 | 8/2003 |
| JP | 8327327 | 12/1996 |
| JP | 09-218016 | 8/1997 |
| JP | 9-297004 | 11/1997 |
| JP | 2000121317 | 4/2000 |
| JP | 2000-180124 | 6/2000 |

| JP | 2001-141652 | 5/2001 |
| JP | 2001-272603 | 10/2001 |
| JP | 2007-121499 | 5/2007 |
| KR | 10-0701974 | 3/2007 |
| WO | WO 93/24805 | 12/1993 |
| WO | WO 95/09343 | 4/1995 |
| WO | WO 97/44633 | 11/1997 |
| WO | WO 02/082008 | 10/2002 |
| WO | 03/036229 | 5/2003 |
| WO | WO 03/062802 | 7/2003 |
| WO | WO 2004/023071 | 4/2004 |

OTHER PUBLICATIONS

Abdulhalim, "Spectroscopic interference microscopy technique for measurement of layer parameters", Meas. Sci. Technol., vol. 12, pp. 1996-2001 (2001).

Akcay, C. et al., "Spectral shaping to improve the point spread function in optical coherence tomography", Optics Letters, vol. 28, No. 20, pp. 1921-1923 (Oct. 15, 2003).

Azzam, R.M.A. et al, "Ellipsometric function of a film-substrate system: Applications to the design of reflection-type optical devices and to ellipsometry", Journal of the Optical Society of America, vol. 5, No. 3, pp. 252-260 (1975).

Azzam, R.M.A. et al., "Reflection and Transmission of Polarized Light by Stratified Planar Structures", Ellipsometry and Polarized Light, Elsevier Science B.V. ISBN 0 444 87016 4 (Paperback) pp. 267-363 (1987).

Bashkansky, M. et al., "Signal Processing for Improving Field Cross-correlation Function in Optical Coherence Tomography", Supplement to Optics & Photonics News, 9(5) (May 1998).

Berman et al., "Review of In Situ & In-line Detection for CMP Applications", Semiconductor Fabtech—8.sup.th Edition, pp. 267-274.

Biegen, "Determination of the Phase Change on Reflection from Two-beam Interference," Optics Letters, 19:21:1690-1692, Nov. 1, 1994.

Bosseboeuf, A. et al., "Application of microscopic interferometry techniques in the MEMS field", Proc. SPIE, 5145, pp. 1-16 (2003).

Chim, S. S. C. and Kino, G. S., "Three-Dimensional Image Realization in Interference Microscopy", Applied Optics, May 10, 1992, vol. 31, No. 14.

Creath, Katherine, "Step height measurement using two-wavelength phase-shifting interferometry", Applied Optics, vol. 26, No. 14, pp. 2810-2816 (Jul. 15, 1987).

Danielson et al., "Absolute Optical Ranging Using Low Coherence Interferometry," Applied Optics, 30:21:2975-2979, Jul. 20, 1991.

Davidson, M. et al., "An Application of Interference Microscopy to Integrated Circuit Inspection and Metrology", Proceedings of SPIE, vol. 775, pp. 233-247 (1987).

de Groot et al., "Angle-resolved three-dimensional analysis of surface films by coherence scanning interferometry", Optics Letters, vol. 32, No. 12, pp. 1638-1640 (Jun. 15, 2007).

de Groot et al.; "Three-dimensional imaging by sub-Nyquist sampling of white-light interfergrams"; Optics Letters vol. 18, No. 17; pp. 1462-1464, Sep. 1, 1993.

de Groot, P. et al., "Determination of fringe order in white-light interference microscopy", Appl. Opt., 41(22) pp. 4571-4578 (2002).

de Groot, P. et al., "Signal modeling for low coherence height-scanning interference microscopy", Applied Optics, vol. 43 No. 25, pp. 4821-4830 (Sep. 1, 2004).

de Groot, P. et al., "Signal modeling for modern interference microscopes", SPIE Proceedings vol. 5457, pp. 26-34 (2004).

de Groot, P., "Extending the unambiguous range of two-color interferometers", Applied Optics, vol. 33, No. 25, pp. 5948-5953 (Sep. 1, 1994).

de Groot, P., "Derivation of algorithms for phase-shifting interferometry using the concept of a data-sampling window", Appl. Opt., 34(22), p. 4723-4730 (1995).

de Groot, P., "Phase-shift calibration errors in interometers with spherical Fizeua cavities," Applied Optics, vol. 34:16, pp. 2856-2863 (Jun. 1, 1995).

de Groot, P., "Three-color laser-diode interferometer," Applied Optics, vol. 30, No. 25, pp. 3612-3616 (Sep. 1, 1991).

P. de Groot, "Microscopic surface form and roughness," in Optical Metrology Encyclopedia of Optics, vol. 3, Wiley-VCH Publishers, Weinheim) p. 2107-2110 (2004).

de Groot, Peter et al., "Laser Gage Using Chirped Synthetic Wavelength Interferometry," Proceedings of SPIE 1821-12:1-10 (1993).

P. De Groot et al., "Optical interferometry for measurement of the geometric dimensions of industrial parts," Applied Optics, vol. 41, No. 19, 3853-3860, Jul. 1, 2002.

P. de Groot, "Vibration in phase shifting interferometry," J. Opt. Soc. Am. A 12(2), 354-365 (1995).

P. de Groot, X. Colonna De Lega, D. Grigg, "Step height measurements using a combination of a laser displacement gage and a broadband interferometric surface profiler," SPIE 4478, Interferometry XI: Applications, 127-130, (2002).

X. Colonna de Lega and P. de Groot, "Characterization of materials and film stacks for accurate surface topography measurement using a white-light optical profiler," SPIE 6995, paper 25 (2008).

de Lega, X., et al., "Optical topography measurement of patterned wafers," American Institute of Physics Conference Proceedings, vol. 788, pp. 432-436 (2005).

X. Colonna de Lega, P. de Groot and D. Grigg "Dimensional measurement of engineered parts by combining surface profiling with displacement measuring interferometry," Proc. Fringe 2001, The 4th International Workshop on Automatic Processing of Fringe Patterns, Wolfgang Osten and Werner Jüptner Eds., Elsevier, 2001. pp. 333-340 (2001).

Deck, L. et al., "Two-color light-emitting-diode source for high-precision phase-shifting interferometry", Optics Letters, vol. 18, No. 22, pp. 1899-1901 (Nov. 15, 1993).

Dresel et al., "Three Dimensional Sensing of Rough Surfaces by Coherence Radar," Applied Optics, 31:7:919-925, Mar. 1, 1992.

Feke, Gilbert D. et al., "Interferometric back focal plane microellipsometry", Applied Optics, vol. 37, No. 10, pp. 1796-1802 (Apr. 1, 1998).

Flournoy, P.A. et al., "White-light interferometric thickness gauge", Appl. Opt., 11(9), pp. 1907-1915 (1972).

Gale, D.M. et al., "Linnik microscope imaging of integrated circuit structures", Applied Optics vol. 35, No. 1, pp. 131-148 (Jan. 1, 1996).

Ghiglia, Dennis C. et al., "Quality-Guided Path Following", Two-Dimensional Phase Unwrapping—Theory, Algorithms and Software, John Wiley & Sons publishers, ISBN 0-471-24935-1, pp. 122-136 (1998).

Hausler, G. et al., "Coherence Radar and Spectral Radar—New Tools for Dermatological Diagnosis", Journal of Biomedical Optics, vol. 3, No. 1, pp. 21-31 (Jan. 1998).

Hecht, "Basics of Coherence Theory," Optics, 2nd Ed., Addison Wesley, pp. 516-517 (1987).

Holmes, R.D. et al., "Scanning microellipsometry for extraction of true topography", Electronics Letters, vol. 31, No. 5, pp. 358-359 (Mar. 2, 1995).

J.E. Greivenkamp, "Generalized data reduction for heterodyne interferometry", Opt. Eng., vol. 23 No. 4, pp. 350-352 (Jul./Aug. 1984).

Kim, Seung-Woo et al., "Thickness-profile measurement of transparent thin-film layers by white-light scanning interferometry", Applied Optics, vol. 38, No. 28, pp. 5968-5973 (Oct. 1, 1999).

Kino et al., "Mirau Correlation Microscope," Applied Optics, 29:26:3775-3783, Sep. 10, 1990.

Kohlhaas, A. Fromchen. C. and Brinkmeyer, E., "High-Resolution OCDR for Testing Integrated-Optical Waveguides: Dispersion-Corrupted Experimental Data Corrected by a Numerical Algorithm", Journal of Lightwave Technology, Nov. 1991, vol. 9, No. 11.

Kujawinska, Malgorzata, "Spatial Phase Measurement Methods", Interferogram Analysis: Digital Fringe Pattern Measurement Techniques, IOP Publishing Ltd. 1993, pp. 141-193.

Larkin, Kieran G., "Efficient nonlinear algorithm for envelope detection in white light interferometry", J. Opt. Soc. Am A4, pp. 832-843 (1996).

Lay, O.P. et al., "Coherent Range-Gated Laser Displacement Metrology with Compact Optical Head," Optics Letters 32:2933-2935 (2007).

Lee et al., "Profilometry with a coherence scanning microscope", Appl. Opt., 29(26), pp. 3784-3788 (1990).

Lee-Bennett, I., "Advances in non-contacting surface metrology", OF&T Workshop, paper OTuC1 (2004).
Leonhardt, K. et al., "Micro-Ellipso-Height-Profilometry", Optics Communications, vol. 80, No. 3, 4, pp. 205-209 (Jan. 1, 1991).
Liu, Y. et al., "Common path interferometric microellipsometry", SPIE, vol. 2782, pp. 635-645 (1996).
Lyakin et al., "The interferometric system with resolution better than coherence length for determination of geometrical thickness and refractive index of a layer object", Proceedings of the SPIE—The International Society for Optical Engineering SPIE-INT, Soc. Opt. Eng USA, vol. 4956, pp. 163-169 (Jul. 2003).
M. Marcus, "Fiber optic interferometry for industrial process monitoring and control applications," Proc. SPIE, vol. 4578, pp. 136-144 (2002).
Morgan, C.J., "Least-Squares estimation in phase-measurement interferometry", Apt. Let., 7(8), pp. 368-370 (1982).
Ngoi et al., "Phase-shifting interferometry immune to vibration", Applied Optics, vol. 40, No. 19, pp. 3211-3214 (2001).
Novak et al., "Template-based software for accurate MEMS characterization", Proceedings of SPIE, Fol. 4980, pp. 75-80 (2003).
Onodera, Ribun et al., "Two-wavelength interferometry that uses a Fourier-transform method", Applied Optics, vol. 37, No. 34, pp. 7988-7994 (Dec. 1, 1998).
Oppenheim, A. V. et al., "10.3: The time-dependent Fourier Transform", Discrete-Time Signal Processing, 2.sup.nd Edition, pp. 714-722 (Prentice Hall, New Jersey, 1999).
Park et al., "Direct Quadratic Polynomial Fitting for Fringe Peak Detection of White Light Scanning Interferograms," Opt. Eng., 39:4:952-959, Apr. 2000.
Petitgrand, S. et al., "Measures 3D de topographies et de vibrations a l'echelle (sub)micrometrique par microscopic optique interferometrique", Proc. Club CMOI, Methods et Techniques Optiques pour l'Industrie (2002).
Pfortner, Andreas et al., "Red-green-blue interferometer for the metrology of discontinuous structures", Applied Optics, vol. 42, No. 4, pp. 667-673 (Feb. 1, 2003).
Pluta, Maksymilian, "Advanced Light Microscopy", vol. 3, (Elsevier, Amsterdam, 1993) pp. 265-271.
Press, W.H. et al., "Linear Correlation", Numerical Recipes in C, Cambridge University Press, 2.sup.nd Edition, pp. 636-639 (1992).
Rosencwaig, Allan et al., "Beam profile reflectometry: A new technique for dielectric film measurements", Applied Physics Letters, vol. 60, No. 11, pp. 1301-1303 (Mar. 16, 1992).
Sandoz, P. et al., "High-resolution profilometry by using phase calculation algorithms for spectroscopic analysis of white-light interferograms", Journal of Modern Optics, vol. 43, No. 4, pp. 701-708 (1996).
J. L. Seligson, C. A. Callari, J. E. Greivenkamp, and J. W. Ward, "Stability of a lateral-shearing heterodyne Twyman-Green interferometer," Opt. Eng 23(4), 353 (1984).
G. Lai and T. Yatagai, "Generalized phase-shifting interferometry," J. Opt. Soc. Am. A 8(5), 822-827 (1991).
J. Xu, Q. Xu, L. Chai, "Iterative algorithm for phase extraction from interferograms with random and spatially nonuniform phase shifts," Applied Optics, 47, 480-485 (2008).
H. Guo, M. Chen, "Least-squares algorithm for phase-stepping interferometry with an unknown relative step," Applied Optics, 44, pp. 4854-4859, (2005).
C. Farrell and M. Player, "Phase step measurement and variable step algorithms in phase shifting interferometry," Meas. Sci. Technol. 3, 953 (1992).
E. Ikonen, J. Kauppinen, T. Korkolainen, J. Luukkainen, and K. Riski, "Interferometric calibration of gauge blocks by using one stabilized laser and a white-light source," Appl. Opt. 30, pp. 4477-4478 (1991).
A. Oszak and J. Schmit, "High-stability white-light interferometry with reference signal for real-time correction of scanning errors," Opt. Eng. 42, 54-59 (2003).
J. Schmit and A. G. Olszak and S. McDermed, "White light interferometry with reference signal," Proc. SPIE 4777 (2002).

L. Deck, "Vibration-resistant phase-shifting interferometry," Appl. Opt. 35, 6655-6662 (1996).
S. Kim, M. Kang, and S. Lee, "White light phase-shifting interferometry with self-compensation of PZT scanning errors," Proc. SPIE 3740, 16-19 (1999).
J. Schwider, R. Burow, K.-E. Elssner, J. Gizanna, R. Spolaczyk, and K. Merkel, "Digital wave-front measuring interferometry: some systematic error sources," Appl. Opt. 22, 3421-3432 (1983).
W. H. Press et al., "Fourier Transform of Discretely Sampled Data." §12.1 in "Numerical Recipes in C: The Art of Scientific Computing, 2d ed," Cambridge, England: Cambridge University Press, 500-509, 1992.
N. R. Lomb "Least-squares frequency analysis of unequally spaced data," Astrophysics and Space Science 39 447-462 (1976).
J. D. Scargle, "Studies in astronomical time series analysis. II. Statistical aspects of spectral analysis of unevenly spaced data," Astrophysical Journal 263, 835-853 (1982).
W. H. Press et al., "Spectral Analysis of Unevenly Sampled Data", §13.8 in "Numerical Recipes in C: The Art of Scientific Computing, 2d ed," Cambridge, England: Cambridge University Press, 575-584, 1992.
R. Doloca, R. Tutsch, "Vibration induced phase-shift interferometer," Proc. of SPIE 6292 (2006).
Sandoz, P. et al., "Optical implementation of frequency domain analysis for white light interferometry", Proceedings SPIE, vol. 2545, pp. 221-228 (Jun. 1995).
Sandoz, P. et al., "Processing of white light correlograms: simultaneous pahse and envelope measurements by wavelet transformation", SPIE, 3098, pp. 73-82 (1997).
Sandoz, Patrick "Wavelet transform as a processing tool in white-light interferometry", Optics Letters, vol. 22, No. 14, pp. 1065-1067 (Jul. 15, 1997).
Schmit, J. et al., "Extended averaging technique for derivation of error-compensating algorithms in phase-shifting interferometry," Applied Optics, vol. 34:19, pp. 3610-3619 (Jul. 1, 1995).
Schnell, U. et al., "Dispersive white-light interferometry for absolute distance measurement with dielectric multilayer systems on the target", Optics Letters, vol. 21, No. 7, pp. 528-530 (Apr. 1996).
Schwider, J. et al., "Dispersive interferometric profilometer", Optics Letters, vol. 19, No. 13, pp. 995-997 (Jul. 1994).
See et al , Scanning optical microellipsometer for pure surface profiling, Applied Optics, Dec. 1996, pp. 6663-6668.
Shatalin, S. V. et al., "Reflection conoscopy and micro-ellipsometry of isotropic thin film structures", Journal of Microscopy, vol. 179, Part 3, pp. 241-252 (Sep. 1995).
Sheppard et al., "Effect of numerical aperture on interference fringe spacing", Applied Optics, vol. 34, No. 22, pp. 4731-4734 (Aug. 1, 1995).
Totzeck, M., "Numerical simulation of high-NA quantitative polarization microscopy and corresponding near-fields", Optik, vol. 112, No. 9, pp. 399-406 (2001).
Tripathi, R. et al., "Spectral shaping for non-Gaussian source spectra in optical coherence tomography", Optics Letters, vol. 27, No. 6, pp. 406-408 (2002).
Tzannes, A.P. et al., "Measurement of the modulation transfer function of infrared cameras," Optical Engineering, vol. 34, No. 6, pp. 1808-1817 (Jun. 1995).
Willenborg, D. et al, "A novel micro-spot dielectric film thickness measurement system", SPIE, vol. 1594, pp. 322-333 (1991).
Weng, Jidong et al., "A Compact All-Fiber Displacement Interferometer for Measuring the Foil Velocity Diven by Laser," Review of Scientific Instruments 79:113101-11303 (2008).
Wyant, "Phase shifting interferometry" (1998).
Youngquist, R. C. Carr, S. and Davies, D. E. N., "Optical Coherence-Domain Reflectometry: a New Optical Evaluation Technique", Optical Letters, Mar. 1987, vol. 12, No. 3.
International Search Report dated May 19, 2009 corresponding to Int'l. Appln. No. PCT/US08/082785.
International Search Report dated May 1, 2008 corresponding to Int'l. Appln. No. PCT/US07/01772.

Saxer, Christopher E., et al., "High-speed fiber-based polarization-sensitive optical coherence tomography of in vivo human skin", Optics Letters, vol. 25, No. 18, pp. 1355-1357 (Sep. 15, 2000).

Wang, Anbo et al., "Self-Calibrated interferometric-Intensity-Based Optical Fiber Sensors", Journal of Lightwave Technology, vol. 19, No. 10, pp. 1495-1501 (Oct. 10, 2001).

International Search Report and Written Opinion dated Jun. 29, 2010, corresponding to Int'l. Appln. No. PCT/US2009/065572.

International Search Report and Written Opinion dated Jun. 30, 2010, corresponding to Int'l. Appln. No. PCT/US2009/065529.

Munteanu, Florin and Schmit, Joanna, "Iterative least square phase-measuring method that tolerates extended finite bandwidth illumination," Appliec Optics, vol. 48, No. 6/20 (Feb. 2009).

* cited by examiner

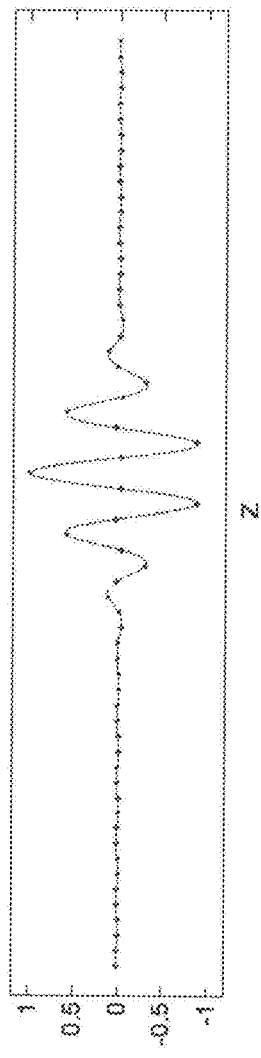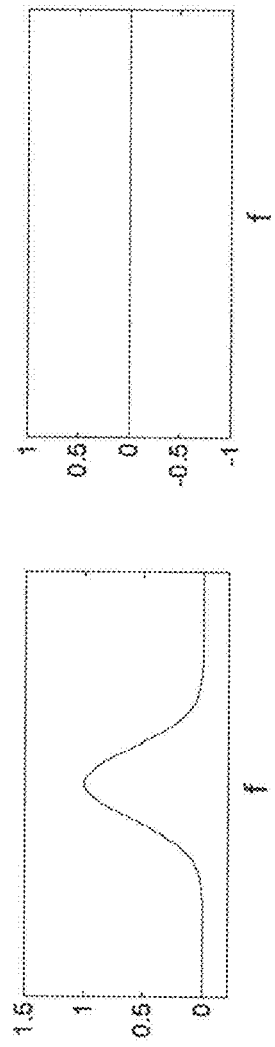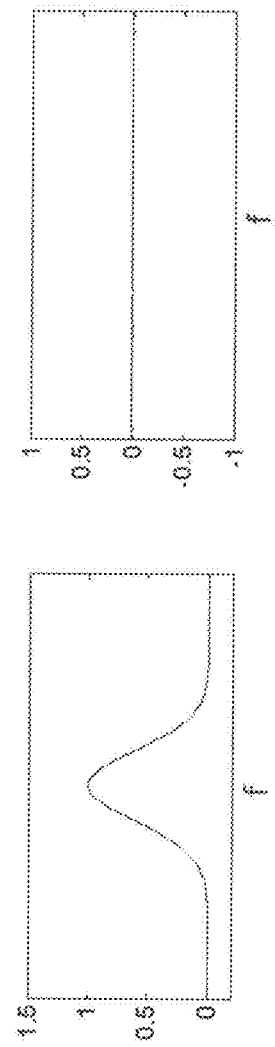
FIG. 13A  FIG. 13B  FIG. 13C  FIG. 13D  FIG. 13E

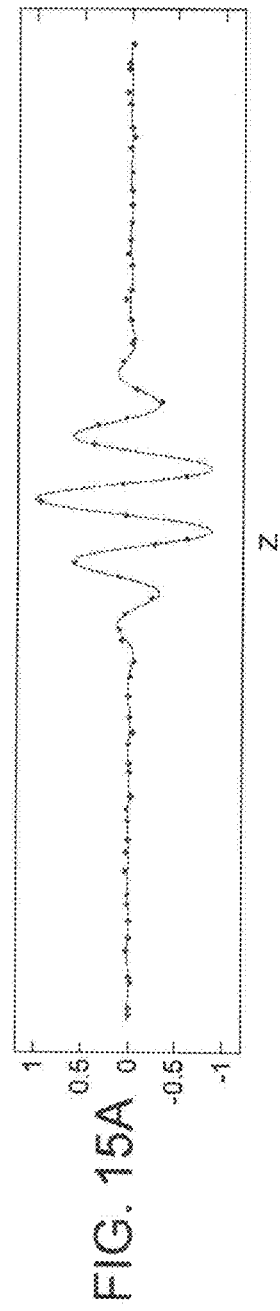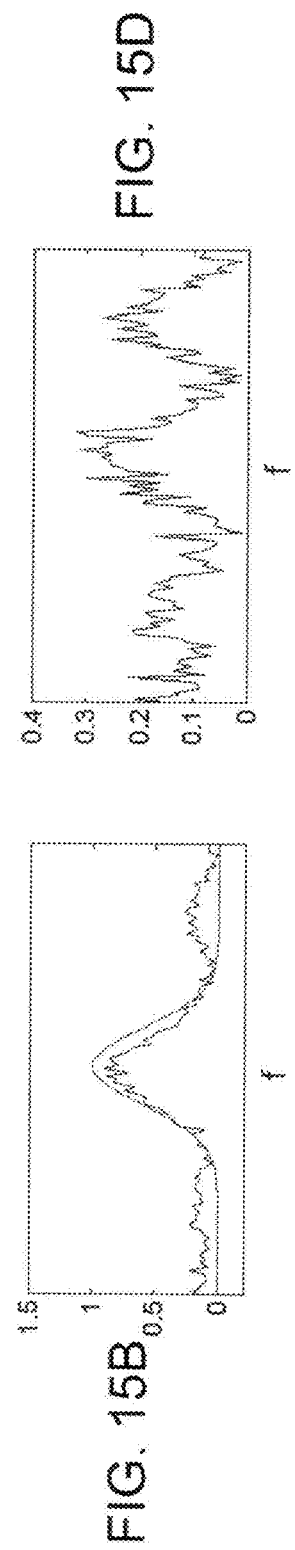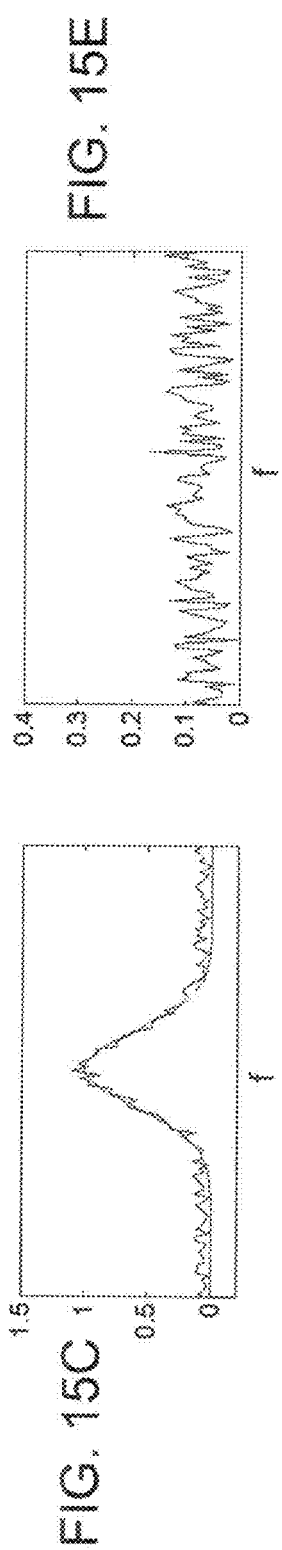

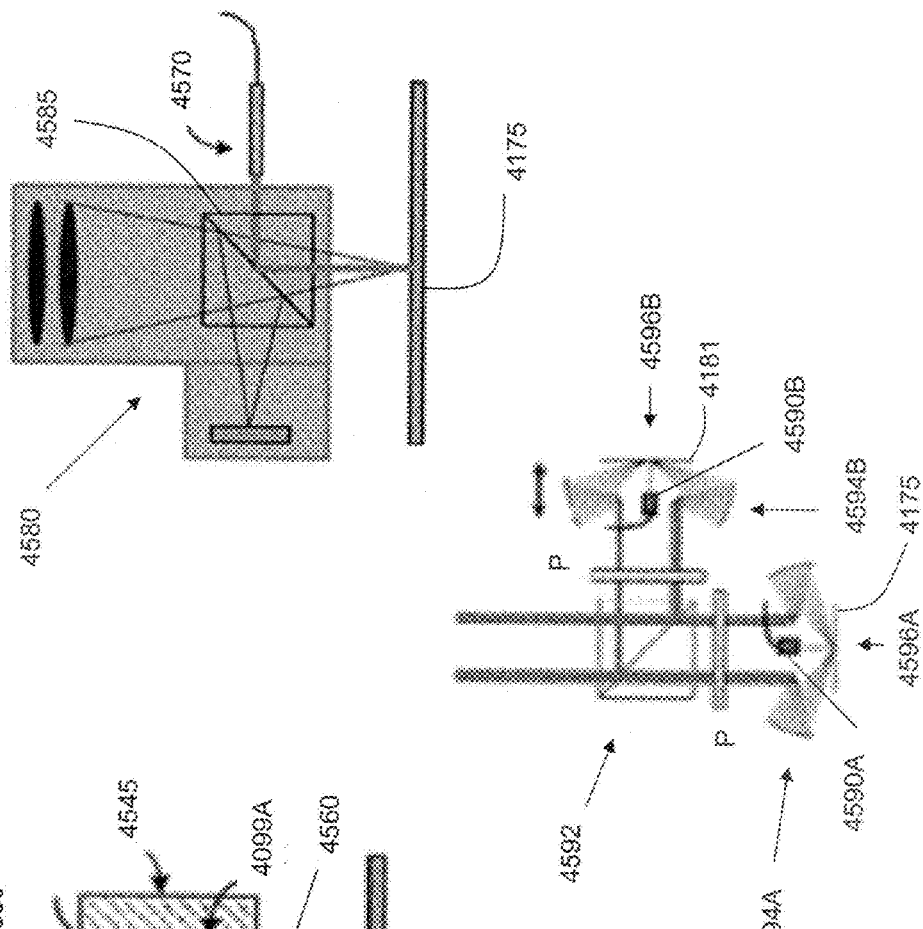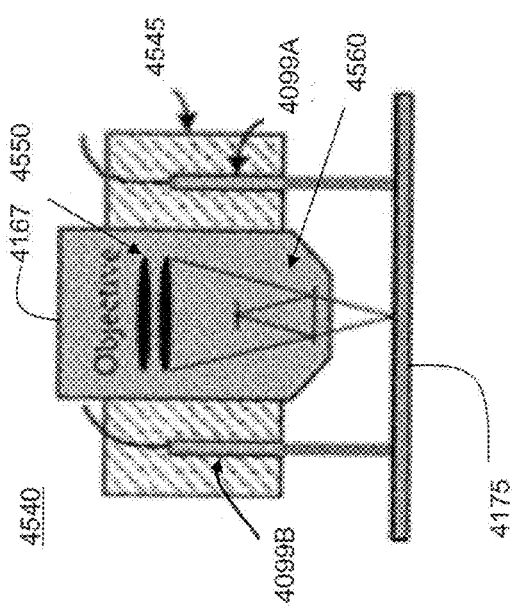

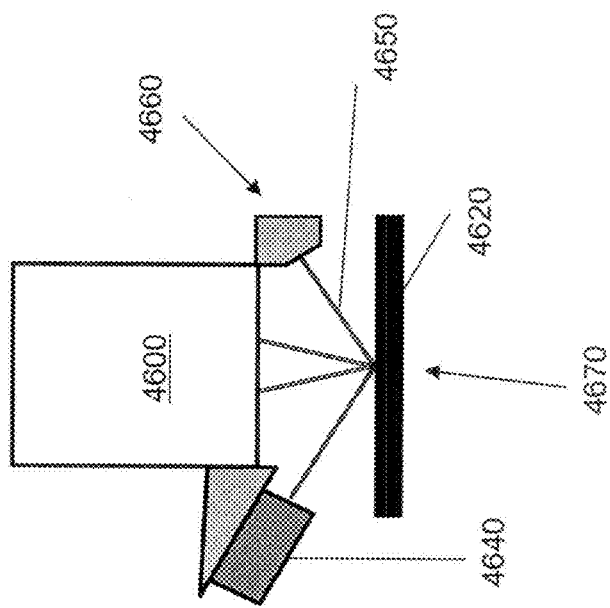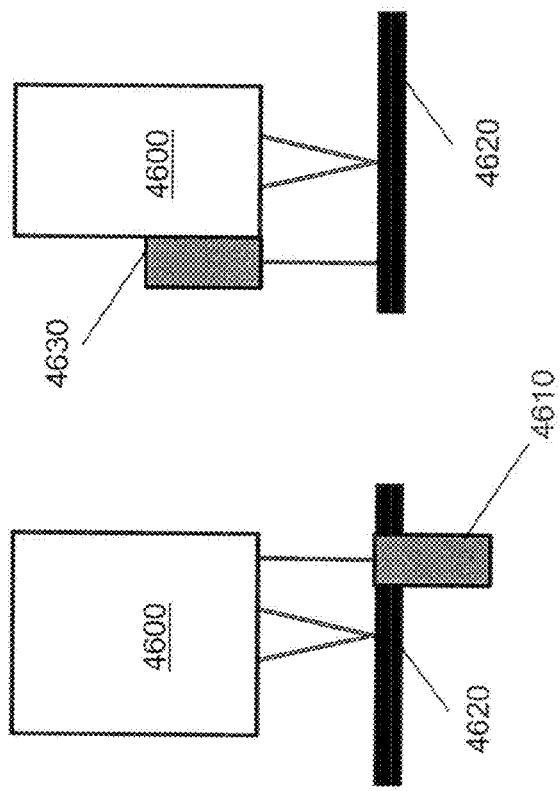

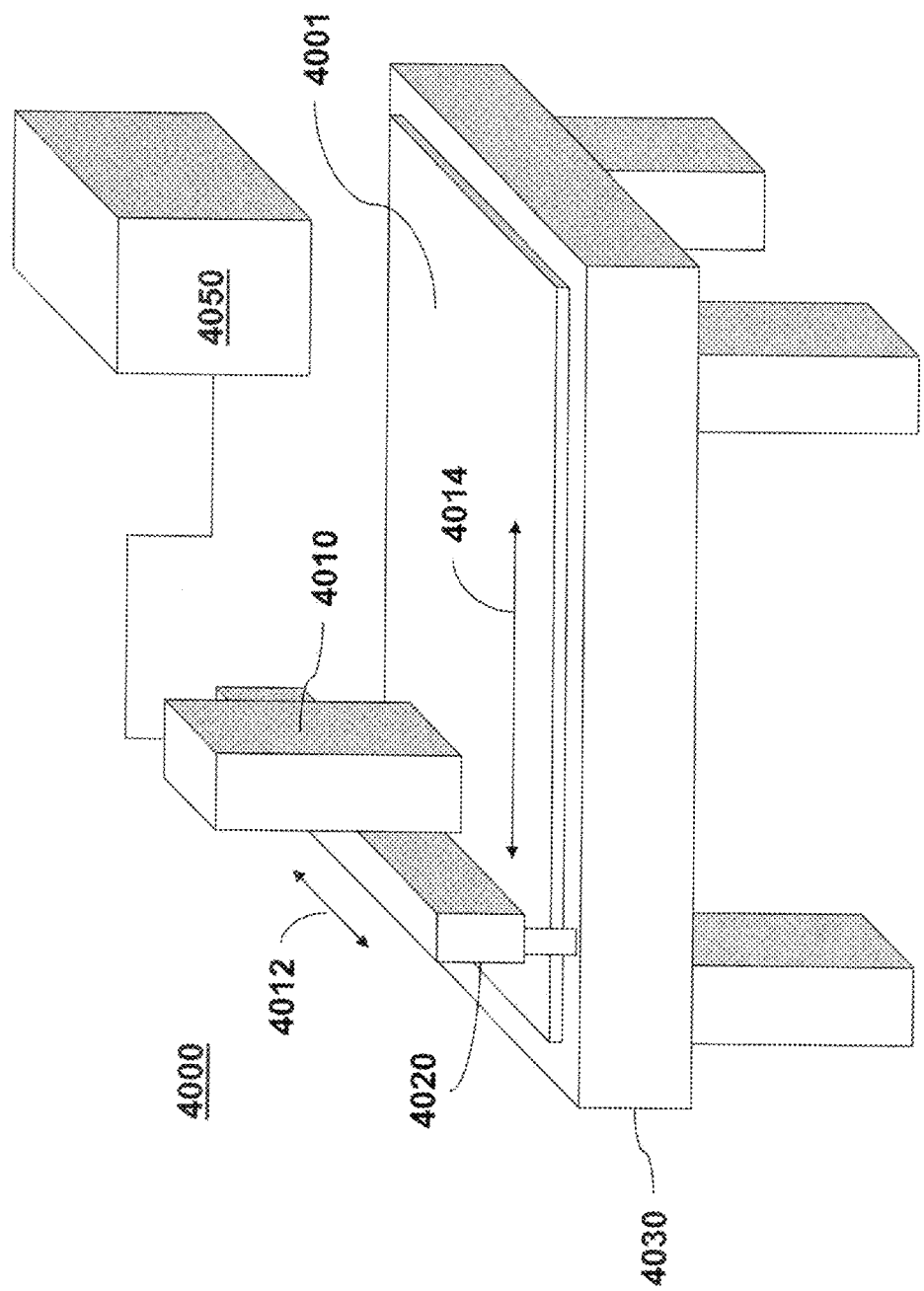

COMPOUND REFERENCE INTERFEROMETER

CROSS-REFERENCE TO RELATED APPLICATIONS

This application is a continuation application of U.S. application Ser. No. 12/509,098, entitled "SCAN ERROR CORRECTION IN LOW COHERENCE SCANNING INTERFEROMETRY," filed Jul. 24, 2009, which claims priority to Provisional Patent Application No. 61/118,151, entitled "SCAN ERROR CORRECTION IN LOW COHERENCE SCANNING INTERFEROMETRY," filed on Nov. 26, 2008, the entire contents both of which are incorporated herein by reference.

TECHNICAL FIELD

The invention relates to interferometry.

BACKGROUND

Interferometric techniques are commonly used to obtain information about a test object, such as to measure the profile of a surface of the test object. To do so, an interferometer combines measurement light reflected from the surface of interest with reference light reflected from a reference surface to produce an interferogram. Fringes in the interferogram are indicative of spatial variations between the surface of interest and the reference surface.

A variety of interferometric techniques have been successfully used to characterize a test object. These techniques include low coherence scanning techniques and phase-shifting interferometry (PSI) techniques.

With PSI, the optical interference pattern is recorded for each of multiple phase-shifts between the reference and test wavefronts to produce a series of optical interference patterns that span, for example, at least a half cycle of optical interference (e.g., from constructive, to destructive interference). The optical interference patterns define a series of intensity values for each spatial location of the pattern, wherein each series of intensity values has a sinusoidal dependence on the phase-shifts with a phase-offset equal to the phase difference between the combined test and reference wavefronts for that spatial location. Using numerical techniques, the phase-offset for each spatial location is extracted from the sinusoidal dependence of the intensity values to provide a profile of the test surface relative the reference surface. Such numerical techniques are generally referred to as phase-shifting algorithms.

The phase-shifts in PSI can be produced by changing the optical path length from the measurement surface to the interferometer relative to the optical path length from the reference surface to the interferometer. For example, the reference surface can be moved relative to the measurement surface. Alternatively, the phase-shifts can be introduced for a constant, non-zero optical path difference by changing the wavelength of the measurement and reference light. The latter application is known as wavelength tuning PSI and is described, e.g., in U.S. Pat. No. 4,594,003 to G. E. Sommargren.

Low coherence scanning interferometry, on the other hand, scans the optical path length difference (OPD) between the reference and measurement legs of the interferometer over a range comparable to (e.g., so that there is at least some modulation of the coherence envelope where interference fringes occur), or larger than, the coherence length of the interfering test and reference light, to produce a scanning interferometry signal for each camera pixel used to measure the interferogram. The coherence length of the light is relatively short compared to the coherence length of light commonly used for PSI and relative to the range of OPD's scanned in a measurement. A low coherence length can be produced, for example, by using a white-light source, which is referred to as scanning white light interferometry (SWLI). A typical scanning white light interferometry (SWLI) signal is a few fringes localized near the zero OPD position. The signal is typically characterized by a sinusoidal carrier modulation (the "fringes") with bell-shaped fringe-contrast envelope. The conventional idea underlying low coherence interferometry metrology is to make use of the localization of the fringes to measure surface profiles.

Low coherence interferometry processing techniques include two principle trends. The first approach is to locate the peak or center of the envelope, assuming that this position corresponds to the zero OPD of a two-beam interferometer for which one beam reflects from the object surface. The second approach is to transform the signal into the frequency domain and calculate the rate of change of phase with wavelength, assuming that an essentially linear slope is directly proportional to object position. See, for example, U.S. Pat. No. 5,398,113 to Peter de Groot. This latter approach is referred to as Frequency Domain Analysis (FDA).

Low coherence scanning interferometry can be used to measure surface topography and/or other characteristics of objects having complex surface structures, such as thin film(s), discrete structures of dissimilar materials, or discrete structures that are underresolved by the optical resolution of an interference microscope. Such measurements are relevant to the characterization of flat panel display components, semiconductor wafer metrology, and in-situ thin film and dissimilar materials analysis. See, e.g., U.S. Patent Publication No. US-2004-0189999-A1 by Peter de Groot et al. entitled "PROFILING COMPLEX SURFACE STRUCTURES USING SCANNING INTERFEROMETRY" and published on Sep. 30, 2004, the contents of which are incorporated herein by reference, and U.S. Patent Publication No. 2004-0085544-A1 by Peter de Groot entitled "INTERFEROMETRY METHOD FOR ELLIPSOMETRY, REFLECTOMETRY, AND SCATTEROMETRY MEASUREMENTS, INCLUDING CHARACTERIZATION OF THIN FILM STRUCTURES" and published on May 6, 2004, the contents of which are incorporated herein by reference.

SUMMARY

The disclosure relates generally to methods and systems for reducing uncertainty in interferometry measurements. More specifically, the methods and systems are used to reduce errors that can arise in low coherence interferometry measurements when an actual optical path length difference (OPD) increment between successive detector frames during the measurement are perturbed from a nominal OPD. These errors arise from sources like vibration and are referred to as "scan errors."

A potential solution to the scan error problem is to characterize or monitor the true scan history of the instrument and to feed this information into the signal processing to correct for this information. One way to gather this information is with a laser displacement measuring interferometer (DMI) working in tandem with the interferometer. More generally, the scan history can be obtained using a monitor interference signal obtained using a source having a coherence length longer than the OPD scan range. While information about the scan history can be obtained from monitor interference signals using conventional PSI algorithms, the applicants have realized that such analysis would not capture information about scan errors occurring due to vibrations having frequencies higher than the frame rate of the interferometer's detector. However, where multiple monitor signals are obtained having different phases, the monitor signals can be used to determine information about scan errors caused by such high frequency vibrations.

Accordingly, during a low coherence interferometric data acquisition, disclosed systems simultaneously collect interference data over several points in the field of view (FOV) having a range of phase or interference frequency offsets, using the same interferometer optics as for the low coherence interferometric data acquisition, but with a separate detector or equivalent detection means operating at a single wavelength (or wavelength band providing light having a sufficiently large coherence length). A processor determines the scan-motion history from the monitor interference data, including vibration over a vibrational frequency range that includes both low and high vibrational frequencies. This information is then used to correct the broadband interferometric data prior to any further processing.

In general, the disclosed methods and systems can be applied to interference microscopes configured to image the test object onto the detector (conventional imaging), or interference microscopes configured so that the location on the detector corresponds to a particular angle of incidence of the illumination on the test object (e.g., by imaging a pupil plane of the microscope onto the detector). This latter configuration is referred to herein as Pupil-Plane SWLI (PUPS). Conventional imaging systems provide, for example, 3D profiles of surface features of a test object. PUPS, on the other hand, provides detailed structure information for a small area of the surface, including multi-layer film thickness and index analysis, and the dimensions of optically-unresolved features within the measurement area. Both measurement modes typically use a multi-element detector such as a video camera to collect data over a field of view (FOV) that covers a surface image or a pupil-plane image.

In conventional imaging and PUPS, data is typically acquired over a time scale of 1/10 to several seconds, and both modes are sensitive to mechanical disturbances occurring during the data acquisition time, where scan errors cause an increase in system noise.

In the measurement of optically-unresolved features using PUPS, the dimensional resolution of the system is inversely proportional to the noise in the interferometrically-derived spectral amplitude, which is a complex function of vibration and scanning errors. It is believed that by reducing the noise due to vibration and scan, a PUPS tool's resolution may be substantially enhanced, and may be advantageous allowing PUPS systems to keep up with, e.g., semiconductor processing metrology as features decrease in size.

Low coherence measurements are increasingly employed in production scenarios with poorly-controlled environments, leading to significant vibrational noise. Given the desire to employ advanced optical 3D metrology in these situations, vibration solutions, such as those presented in the methods and systems disclosed herein, are highly desirable.

In another aspect, the disclosure features methods of correcting low coherence interferometry data once information about scan errors is obtained. While the scan error information can be obtained using the techniques discussed above, other implementations are also possible. For example, information about scan errors can be obtained in a variety of ways, such as, by use of accelerometers, touch probes, capacitive gages, air gages, optical encoders, and/or techniques based on interpretation of the low coherence interferometry data themselves.

Typically, once acquired, the information is fed into further data processing resulting in data that is as close as possible to that of an undisturbed system. In general, the information about scan errors can be used in a variety of ways to improve the accuracy of scanning interferometry measurements.

In some embodiments, the data processing involves spectral analysis methods that use the scan-motion information and replaces a conventional discrete Fourier algorithm in one part of the data processing chain. The spectral analysis methods, however, are generally applicable to any kind of data taken at uneven intervals and therefore not limited to certain types of application.

In certain embodiments, algorithms start by creating a set of basis functions that correspond to pure oscillatory signals at different frequencies sampled at the given uneven increments. Those basis functions appear as distorted waves. Next, the signal of interest is decomposed into the basis functions by solving a linear equation system, revealing the frequency components of the signal of interest, similar to what is computed by a regular discrete Fourier transform (DFT) in the case of an evenly sampled data set.

Solving the linear equation system can be computationally done by means of a matrix inversion, where the matrix columns are the basis functions. The inverted matrix is then multiplied by the vector containing the data that is spectrally analyzed.

In the context of analyzing a low coherence signal obtained using conventional imaging, it should be noted that the same inverted matrix can be used for all pixels. The spectral analysis is therefore reduced to one matrix inversion and P multiplications of a matrix with a vector, where P is the number of pixels. In terms of computational cost, this is not quite as fast as performing regular DFTs since highly optimized algorithms exist for DFTs.

Alternatively, the methods can be used when the signals recorded at different locations of the field of view of an interferometer have different (but known) sampling increments. For example, the increment distribution can be in some cases described as a combination of tilt and piston perturbations of the interferometer cavity.

With little modification, the methods are also capable of compensating the effects of intensity fluctuations of the source (e.g. light source in a microscope). The basis functions are then pure oscillatory signals sampled at the known sampling positions, where each value is multiplied with a factor that is proportional to the corresponding source intensity which has to be known from an independent measurement.

In some embodiments, information about the scan errors is determined using a compound reference. A compound reference is a reference object that has at least two reference interfaces. A reference interface can be, e.g., a surface of an optical element, an interface between two optical elements, an interface between on optical element and an coating layer, or an interface between two coating layers of an optical element. A primary reference interface functions as a conventional reference interface, providing reference light in an interferometry system for examining an object surface, e.g., for surface height or other characteristics. In general, interference fringes generated by the primary reference interface are visible on a primary camera or other type of imaging device, which is connected to a computer or other data acquisition and processing apparatus.

The secondary reference interface is configured provide information that allows one to monitor the displacement of the test object relative to the interference microscope while scanning the OPD of the interference microscope. In general, the secondary reference interface is mechanically fixed with respect to the primary reference interface. In other words, the relative position and orientation of the secondary reference interface remains constant with respect to the primary reference interface during data acquisition. The effect of the primary reference and secondary reference interfaces is to provide a field-dependent complex effective reflectivity that varies at least in phase over the field of view of the system. In general, the effective reflectivity is structured to facilitate determining an overall or low-spatial frequency phase offset for the interference image.

In some embodiments, the interference effects of the secondary reference interface of the compound reference are visible to a second camera (also referred to as a monitor camera) but not to the primary camera, which sees only the interference between the primary reference interface reflection and, e.g., the object surface reflection.

In some embodiments, the primary reference interface and the secondary reference interface have a relative tilt, resulting in an effective reflectivity with rapidly varying phase in the direction of the tilt.

In general, an analysis of the interference effects based on only the secondary reference interface as viewed, for example, by the monitor camera provides information that facilitates interpretation of the interference effects based on only the primary reference interface as viewed by the primary camera.

To distinguish between the interference effects based on the primary and secondary reference interfaces, the monitor camera can operate with a source spectrum that is different from that of the primary camera. For example, the monitor camera may view only spectrally narrowband light (e.g., monochromatic light), while the primary camera views spectrally broadband light. Alternatively, or additionally, the monitor camera may view light of a different wavelength than the light the reaches the primary camera.

In addition or alternatively, the secondary reference interface can be adjusted to be at a sufficiently large angle or other geometric property with respect to the primary reference interface that its reflection may be separated to be only detected by the monitor camera. For example, light reflected from the secondary reference may propagate along a path that is blocked from the primary camera.

In some embodiments, information about scan errors can be obtained using one or fiber-based DMI's. Fiber-based DMI's can include simple, compact sensors formed from commercially available components (e.g., telecom components). In general, the fiber based sensor systems can be configured to operate independently from the interferometry system or can be synchronized via, e.g., using a common processor for controlling the systems. Individual sensors can be multi-plexed using, e.g., a common source and a common reference cavity. Examples of sensor systems can include components that provide illumination, heterodyning, light distribution, light detection, and phase extraction. In some embodiments, sensors of the sensor system are attached to different parts of the interferometry system to monitor various scanning motions (degrees of freedom) performed for the measurement process. Information from the fiber-based DMI's can be used for autofocusing the interferometry system, e.g., in an interference microscope.

Various aspects of the invention are summarized as follows.

In general, in one aspect, the invention features apparatus that includes a broadband scanning interferometry system including interferometer optics for combining test light from a test object with reference light from a reference object to form an interference pattern on a detector, wherein the test and reference light are derived from a common light source. The interferometry system further includes a scanning stage configured to scan an optical path difference (OPD) between the test and reference light from the common source to the detector and a detector system including the detector for recording the interference pattern for each of a series of OPD increments, wherein the frequency of each OPD increment defines a frame rate. The interferometer optics are configured to produce at least two monitor interferometry signals each indicative of changes in the OPD as the OPD is scanned, wherein the detector system is further configured to record the monitor interferometry signals. The apparatus also includes an electronic processor electronically coupled to the detection system and scanning stage and configured to determine information about the OPD increments with sensitivity to perturbations to the OPD increments at frequencies greater than the frame rate.

Embodiments of the apparatus can include one or more of the following features and/or features of other aspects. For example, the scanning stage can be configured to scan the OPD over a range larger than a coherence length of the common source. The scanning stage can be configured to scan the OPD by varying a focus of the interferometer optics relative to the test object. The scanning stage can be configured to scan the OPD without varying a focus of the interferometer optics relative to the test object. The scanning stage can scan the OPD by varying a position of the reference object with respect to the interferometer optics.

In some embodiments, the interferometer optics include a Mirau objective or a Linnik objective. The interferometer optics can be configured to image the test object to the detector.

The interferometer optics can define a pupil plane and are configured to image the pupil plane to the detector. The scanning stage can be configured to scan the OPD in a manner where the OPD varies depending upon the position in the pupil plane and determining the information about the OPD increments can include accounting for the location dependence of the interference pattern. In certain embodiments, the scanning stage is configured to scan the OPD without varying a focus of the interferometer optics relative to the test object.

The interferometer optics can include an optical component configured to derive monitor light from output light provided by the interferometer optics, wherein the output light comprises the test and reference light. The optical component can be a beam splitter configured to direct a portion of the output light to the detector and another portion of the output light to a secondary detector configured to record the monitor interferometry signals. Alternatively, or additionally, the optical component includes a spectral filter configured to direct a portion of the output light to the detection system, wherein the monitor interferometry signals are detected based on the portion of the output light. The portion can be a monochromatic portion of the output light. The monitor light can be derived from the common light source. The monitor light can correspond to a spectral component of the test and reference light. The interference pattern can correspond to an intensity profile of the output light. The monitor light can be derived from a secondary light source different from the common light source. The monitor light source can have a coherence length longer than a coherence length of the common light source.

In some embodiments, the electronic processor is configured to determine information about the OPD increments by matching a corresponding sinusoidal function to each of the at least two monitor interferometry signals. The monitor interferometry signals can each include a plurality of sampled data points acquired using the detector while scanning the OPD and matching the sinusoidal function to the monitor interferometry signals can include interpolating the sampled data points to provide an interpolated signal. Matching the sinusoidal function to the monitor interferometry signals can further include associating a nominal interference phase with each interferometry signal based on the interpolated signal. Determining information about the OPD increments can include calculating a deviation in a measured phase of the monitor interferometry signal based on the corresponding nominal interference phase.

The at least two monitor interferometry signals can have different interference phases. The at least two monitor interferometry signals can have different frequencies.

In some embodiments, the detector is a multi-element detector. The multi-element detector can include elements configured to record the at least two monitor interference signals.

The detector system can include a secondary detector separate from the primary detector, the secondary detector being configured to record the at least two monitor interferometry signals. The secondary detector can be a multi-element detector configured so that each of the elements record a corresponding monitor interferometry signal.

The electronic processor can be further configured to determine information about the test object based on a primary interference signal corresponding to the interference pattern recorded using the detector. Determining the information can include reducing uncertainty in the information based on the information about the OPD increments.

In general, in a further aspect, the invention features methods that include providing a low coherence interferometry signal produced using a scanning interferometry system, wherein the scanning interferometry system produces the low coherence interferometry signal by combining test light from a test object with reference light from a reference object using interferometer optics to form an interference pattern on a detector which records the interference pattern while scanning an optical path difference (OPD) between the test and reference light for each of a series of OPD increments, where the frequency of each OPD increment defines a frame rate. The methods further include providing at least two monitor interferometry signals each produced using the interferometer optics and each indicative of changes in the OPD as the OPD is scanned and determining, based on the monitor interferometry signals, information about the OPD increments with sensitivity to perturbations to the OPD increments at frequencies greater than the frame rate.

Implementations of the method can include one or more of the following features and/or features of other aspects. For example, the test light and reference light can be produced from a common source and the OPD is scanned over a range larger than a coherence length of the common source. Scanning the OPD can include varying a focus of the interferometer optics relative to the test object. Scanning the OPD can include varying a position of the reference object with respect to the interferometer optics. Providing the low coherence interferometry signal can include imaging the test object to the detector.

In some embodiments, the interferometer optics define a pupil plane and providing the low coherence interferometry signal includes imaging the pupil plane to the detector. Determining the information about the OPD increments can include accounting for a location dependence of the interference pattern.

Providing the at least two monitor interferometry signals can include deriving monitor light from output light provided by the interferometer optics, wherein the output light comprises the test and reference light. The monitor light can be detected using the detector. The monitor light can be detected using a secondary detector different from the detector used to record the interference pattern. Deriving the monitor light can include spectrally filtering the output light. In some embodiments, the monitor light is derived from the same light source as the test and reference light. In certain embodiments, the monitor light is derived from a light source different from the source of the test and reference light. The source of the monitor light can have a coherence length longer than the source of the test and reference light.

Determining information about the OPD increments can include matching a corresponding sinusoidal function to each of the at least two monitor interferometry signals. The monitor interferometry signals each can include a plurality of sampled data points and matching the sinusoidal function to the monitor interferometry signals can include interpolating the sampled data points to provide an interpolated signal. Matching the sinusoidal function to the monitor interferometry signals can further include associating a nominal interference phase with each interferometry signal based on the interpolated signal. Determining information about the OPD increments can further include calculating a deviation in a measured phase of the monitor interferometry signal based on the corresponding nominal interference phase.

The at least two monitor interferometry signals can have different interference phases. The at least two monitor interferometry signals can have different frequencies.

The methods can further include determining information about the test object based on a primary interference signal corresponding to the interference pattern recorded using the detector. Determining the information can reduce uncertainty in the information based on the information about the OPD increments.

In another aspect, the invention features processes for making a display panel that include providing a component of the display panel, determining information about the component using the methods or apparatus discussed previously, and forming the display panel using the component. The component can include a pair of substrates separated by a gap and the information can include information about the gap. Forming the display panel can include adjusting the gap based on the information. Forming the display panel can include filling the gap with a liquid crystal material.

The component can include a substrate and a layer of a resist on the substrate. The information can include information about the thickness of the layer of resist. The layer of resist can be a patterned layer, and the information can include information about a dimension or an overlay error of a feature of the patterned layer. Forming the display can include etching a layer of material under the layer of resist.

The component can include a substrate that includes spacers and the information can include information about the spacers. Forming the display can include modifying the spacers based on the information.

In general, in another aspect, the invention features methods that include providing one or more interferometry signals for a test object, where the interferometry signals correspond to a sequence of optical path difference (OPD) values which are not all equally spaced from one another because of noise. The methods further include providing information about the unequal spacing of the sequence of OPD values, decomposing each of the interferometry signals into a contribution from a plurality of basis functions each corresponding to a different frequency and sampled at the unequally spaced OPD values, and using information about the contribution from each of the multiple basis functions to each of the interferometry signals to determine information about the test object.

Implementations of the method can include one or more of the following features and/or features of other aspects. The decomposition of each interferometry signal into a contribution from each of the basis functions can include information about an amplitude and phase of each basis function to each interferometry signal. Each basis function can be a sinusoidal basis function sampled at the unequally spaced OPD values. The decomposition can be a linear decomposition.

The one or more interferometry signals can include multiple interferometry signals corresponding to different locations of the test object. The one or more interferometry signals can include multiple interferometry signals corresponding to different locations of a pupil plane for an objective used to illuminate the test object to produce the interferometry signals. Each of the interferometry signals can be decomposed into contributions from the same plurality of basis functions.

Each interferometry signal can correspond to interference intensity values measured when test light emerging from the test object is combined with reference light on a detector for each of the different OPD values, wherein the test and reference light are derived from a common source, and the OPD is the optical path length difference between the test light and the reference light from the common source to the detector.

The multiple basis functions can include non-orthogonal basis functions. The multiple basis functions can be linearly independent basis functions.

Decomposing the interferometry signals can include forming a matrix in which each column of the matrix corresponds to a basis function, inverting the matrix, and applying the inverted matrix to each interferometry signal. A number of elements of each basis function can exceed the number of basis functions.

Each interferometry signal can correspond to interference intensity values measured when test light emerging from the test object is combined with reference light on a detector for each of the different OPD values, where the test and reference light are derived from a common light source, and each basis function can account for variations of the measured interference intensity values from nominal values corresponding to an error free interferometry signal. The variations can be due to variations in an intensity level of the light source. The variations can be due to finite frame integration times of the detector.

Providing the information about the unequal spacing of the sequence of OPD values can include producing at least one monitor interferometry signal indicative of changes in the OPD, where the monitor interferometry signal is produced while the interferometry signals correspond to the sequence of OPD values are acquired. Information about the unequal spacing of the sequence of OPD values can include producing multiple monitor interferometry signals. The monitor interferometry signal can be produced using the same interferometer optics used to produce the interferometry signals corresponding to the sequence of OPD values.

Using the information can include constructing a corrected interferometry signal based on the information about the contribution from each of the multiple basis functions to each of the interferometry signals and determining information about the test object based on the corrected interferometry signal.

The information about the unequal spacing of the sequence of OPD values can be produced using a sensor, such as, for example, a displacement measuring interferometer, an accelerometer, a touch probe, a capacitive gauge, an air gauge, or an optical encoder.

In another aspect, the invention features processes for making a display panel that include providing a component of the display panel, determining information about the component using the methods discussed in connection with the preceding aspect or using the apparatus discussed below, and forming the display panel using the component. The component can include a pair of substrates separated by a gap and the information can include information about the gap. Forming the display panel can include adjusting the gap based on the information. Forming the display panel can include filling the gap with a liquid crystal material.

The component can include a substrate and a layer of a resist on the substrate. The information can include information about the thickness of the layer of resist. The layer of resist can be a patterned layer, and the information can include information about a dimension or an overlay error of a feature of the patterned layer. Forming the display can include etching a layer of material under the layer of resist.

The component can include a substrate that includes spacers and the information can include information about the spacers. Forming the display can include modifying the spacers based on the information.

In general, in another aspect, the invention features apparatus that include an interferometry system comprising interferometer optics for combining test light from a test object with reference light from a reference object to form an interference pattern on a detector, where the test and reference light are derived from a common light source. The interferometry system further includes a scanning stage configured to scan an optical path difference (OPD) between the test and reference light from the common source to the detector and a detector system comprising the detector for recording the interference pattern for each of a series of OPD values thereby providing one or more interferometry signals, and an electronic processor coupled to the detection system and configured to determine information about the test object based on the one or more interferometry signals. The sequence of OPD values are not all equally spaced from one another because of noise and the electronic processor is configured to determine the information about the test object by decomposing each of the interferometry signals into a contribution from a plurality of basis functions each corresponding to a different frequency and sampled at the unequally spaced OPD values.

Embodiments of the apparatus can include one or more of the following features and/or features of other aspects. For example, the interferometer optics can be configured to image the test object to the detector. The interferometer optics can define a pupil plane and can be configured to image the pupil plane to the detector. The interferometer can be part of an interference microscope. The scanning stage can be configured to scan the OPD over a range larger than a coherence length of the common source.

In some embodiments, the apparatus further includes a sensor in communication with the electronic processor, the sensor being configured to provide information about the unequally spaced OPD values to the electronic processor. The sensor can use the interferometer optics to direct a monitor beam to reflect from the test object. The sensor can be a displacement measuring interferometer, an accelerometer, a touch probe, a capacitive gauge, an air gauge, or an optical encoder. In some embodiments, the sensor is configured to derive a first wavefront and a second wavefront from input radiation and to combine the first and second wavefronts to provide output radiation comprising information about an optical path length difference between the paths of the first and second wavefronts, the sensor including a reflective element positioned in the path of the first wavefront, the reflective element being mounted on either the objective or the stage, and a fiber waveguide configured to deliver the input radiation to the sensor or to deliver the output radiation from the sensor to a sensor detector.

In general, in another aspect, the invention features apparatus that includes a scanning interferometry system including interferometer optics for directing test light to a test object over a range of illumination angles and combining test light reflected from the test object with reference light from a reference object to form an interference pattern on a multi-element detector, where the test and reference light are derived from a common light source and the interferometer optics are configured to direct at least a portion of the combined light to the detector so that different elements of the detector correspond to different illumination angles of the test object by the test light. The interferometry system further includes a scanning stage configured to scan an optical path difference (OPD) between the test and reference light from the common source to the detector and a detector system comprising the detector for recording the interference pattern for each of a series of OPD increments, the scanning interferometry system being further configured to produce at least one monitor interferometry signal indicative of changes in the OPD as the OPD is scanned, and an electronic processor electronically coupled to the detection system and scanning stage and configured to determine information about the OPD increments with sensitivity to perturbations to the OPD increments Embodiments of the apparatus can include one or more of the following features and/or features of other aspects. For example, the interferometer optics can define a pupil plane and can be configured to image the pupil plane to the detector. The scanning interferometry system is a broadband scanning interferometry system. The scanning stage can be configured to scan the OPD over a range larger or shorter than a coherence length of the common source. The scanning interferometry system can be further configured to produce at least two monitor interferometry signals each indicative of changes in the OPD as the OPD is scanned. The frequency of each OPD increment defines a frame rate and the electronic processor can be configured to determine information about the OPD increments with sensitivity to perturbations to the OPD increments at frequencies greater than the frame rate. The scanning interferometry system can be configured to produce at least one monitor interferometry signal using the interferometer optics.

In general, in another aspect, the invention features apparatus that includes an interference microscope including an objective and a stage moveable relative to the objective. The apparatus also includes a sensor configured to derive a first wavefront and a second wavefront from input radiation and to combine the first and second wavefronts to provide output radiation comprising information about an optical path length difference between the paths of the first and second wavefronts, the sensor including a reflective element positioned in the path of the first wavefront, the reflective element being mounted on either the objective or the stage. The apparatus includes a fiber waveguide configured to deliver the input radiation to the sensor or to deliver the output radiation from the sensor to a corresponding detector, and an electronic controller configured to monitor a displacement of the stage relative to the objective based on the information from the sensor.

Embodiments of the apparatus can include one or more of the following features and/or features of other aspects. For example, the interference microscope can be a low coherence scanning interference microscope. The interference microscope can include interferometer optics and a detector, the interferometer optics being configured to image a test object positioned on the stage to the detector. The interference microscope can include interferometer optics and a detector, where the interferometer optics define a pupil plane and are configured to image the pupil plane to the detector.

The objective can be a Mirau objective or a Linnik objective.

In another aspect, the invention features interferometry systems that include a detector sub-system comprising a monitor detector, interferometer optics for combining test light from a test object with primary reference light from a first reference interface and secondary reference light from a second reference interface to form a monitor interference pattern on a monitor detector, wherein the first and second reference interfaces are mechanically fixed with respect to each other and the test light, a scanning stage configured to scan an optical path difference (OPD) between the test light and the primary and secondary reference light to the monitor detector while the detector sub-system records the monitor interference pattern for each of a series of OPD increments, and an electronic processor electronically coupled to the detector sub-system and the scanning stage, the electronic processor being configured to determine information about the OPD increments based on the detected monitor interference pattern.

Embodiments of the interferometry systems can include one or more of the following features and/or features of other aspects. For example, the detector sub-system can include a primary detector and the interferometer optics are arranged to combine test light and first reference light to form a primary interference pattern on the primary detector, the primary interference pattern being different from the monitor interference pattern. The electronic processor can be configured to determine information about the test object based on the detected primary interference pattern. Determining information about the test object can include reducing uncertainty in the information about the test object due to vibrations in the interferometry system based on the information about the OPD increments.

The interferometer optics can be configured so that the primary detector receives none of the secondary reference light. The interferometer optics comprise an aperture stop positioned to transmit test light and primary reference light to the primary detector, but block secondary reference light from the primary detector. The interferometer optics can include a wavelength filter that transmits test light and primary reference light to the primary detector, but blocks secondary reference light from the primary detector.

The monitor detector can be a multi-element detector and the first and second reference interfaces can be configured so that a relative phase difference between the primary and secondary reference light varies across a field of view of the multi-element detector.

The first and second reference interfaces can be arranged so that the primary and secondary reference light propagate along non-parallel paths at the monitor detector. The first and second reference interfaces can be surfaces. The first and second reference interfaces can correspond to opposing surfaces of a common optical element. The common optical element can be a wedge. The first and second interfaces can correspond to surfaces of different optical elements.

The second reference interface can be a planar interface. For example, the primary reference interface is a planar interface. In some embodiments, the primary interface is a non-planar interface. The non-planar interface can be a spherical interface. The primary reference interface can be an aspherical interface.

The interferometer optics can define an optical axis and the first and second interfaces are oriented at different angles with respect to the optical axis.

The interferometry system can include an illumination sub-system for producing the test light, primary reference light, and secondary reference light. The illumination sub-system can include a common light source that produces the test light, primary reference light, and secondary reference light. In some embodiments, the common source is a broadband source. The illumination sub-system can include a primary source for providing the test light and primary reference light and a monitor source for providing the secondary reference light. The primary source can be a broadband source. The monitor source can be a narrowband source (e.g., a monochrome source).

The illumination sub-system can include a light source for providing at least the test light and the primary reference light and the scanning stage is configured to scan the OPD over a range larger than a coherence length of the light source. The illumination sub-system can include a light source for providing at least the test light and the primary reference light and the scanning stage is configured to scan the OPD over a range shorter than a coherence length of the light source.

The interferometer optics can be configured to image the test object to a multi-element detector in the detector sub-system. The interferometer optics can define a pupil and the interferometer optics can be configured to image the pupil to a multi-element detector in the detector sub-system. The multi-element detector can be the monitor detector.

The interferometer optics can be arranged as a Fizeau interferometer, a Linnik interferometer, or a Mirau interferometer.

In general, in another aspect, the invention features methods that include combining test light from a test object with primary reference light from a first reference interface and secondary reference light from a second reference interface to form a monitor interference pattern on a monitor detector, wherein the first and second reference interfaces are mechanically fixed with respect to each other and the test light, scanning an optical path difference (OPD) between the test light and the primary and secondary reference light to the monitor detector, recording the monitor interference pattern for each of a series of OPD increments, and determining information about the OPD increments based on the detected monitor interference pattern. Implementations of the methods can include any of the features of other aspects.

In general, in a further aspect, the invention feature interferometry systems that include interferometer optics for combining test light from a test object with primary reference light from a first reference interface and secondary reference light from a second reference interface to form a first interference pattern on a monitor detector, the interferometer optics also combining test light with primary reference light to form a second interference pattern on a primary detector, wherein the first and second reference interfaces are mechanically fixed with respect to each, and an electronic processor electronically coupled to the primary and monitor detectors, the electronic processor being configured to determine information about the test object based on the second interference pattern and determining the information about the test object includes reducing uncertainty in the information about the test object due to vibrations in the interferometry system based on information from the first interference pattern. Embodiments of the interferometry systems can include features of other aspects.

In general, in a further aspect, the invention features methods that include combining test light from a test object with primary reference light from a first reference interface and secondary reference light from a second reference interface to form a first interference pattern on a monitor detector, combining test light with primary reference light to form a second interference pattern on a primary detector, wherein the first and second reference interfaces are mechanically fixed with respect to each, and determining information about the test object based on the second interference pattern, wherein determining the information about the test object includes reducing uncertainty in the information about the test object due to vibrations in the interferometry system based on information from the first interference pattern. Embodiments of the interferometry systems can include features of other aspects.

In general, in another aspect, the invention features apparatus that include a microscope including an objective and a stage for positioning a test object relative to the objective, the stage being moveable with respect to the objective, and a sensor system, that includes a sensor light source, an interferometric sensor configured to receive light from the sensor light source, to introduce an optical path difference (OPD) between a first portion and a second portion of the light, the OPD being related to a distance between the objective lens and the stage, and to combine the first and second portions of the light to provide output light, a detector configured to detect the output light from the interferometric sensor, a fiber waveguide configured to direct light between the sensor light source, the interferometric sensor and the detector, a tunable optical cavity in a path of the light from the sensor light source and the interferometric sensor, and an electronic controller in communication with the detector, the electronic controller being configured to determine information related to the OPD based on the detected output light.

Embodiments of the apparatus can include one or more of the following features and/or features of other aspects. For example, the electronic controller can be configured to adjust a focus of the microscope based on the information. The microscope can be an interferometric microscope. The interferometric microscope can be a scanning white light interferometry (SWLI) microscope. The interferometric microscope is a pupil plane SWLI microscope. The objective can be a Mirau objective, a Linnik objective, or a Michelson objective. The interferometric microscope can be configured to determine information about a test object positioned on the stage by illuminating the test object with test light and to combining the test light with reference light from a reference object to form an interference pattern on a detector, wherein the test light and reference light are derived from a common source, and the apparatus can be configured to reduce uncertainty in the information about the test object due to scan errors based on the determined information related to the sensor OPD.

In some embodiments, the sensor system includes one or more additional interferometric sensors each configured to receive light from the sensor light source. Each interferometric sensor can be configured to introduce an OPD between two components of its corresponding light, each OPD being related to a corresponding displacement between the objective and the stage along a corresponding axis. The electronic controller can be configured to determine information about a tilt of the stage relative to the objective based on determining information related to the corresponding OPD for at least two of the interferometric sensors. The sensor system can include one or more additional detectors, each configured to receive output light from a corresponding interferometric sensor. Each additional interferometric sensor can receive light from the sensor light source and directs output light to its corresponding sensor through a corresponding fiber waveguide. The tunable optical cavity can be in the path of the light from the sensor light source to each interferometric sensor.

The interferometric sensor can include a lens positioned to receive light exiting the fiber waveguide and to focus the light to a waist. The lens can be a graded index lens. The lens can be attached to the objective. Alternatively, the lens can be attached to the stage. In some embodiments, the fiber waveguide is a fiber with a thermally expanded core.

The microscope can include a microscope light source and the objective comprises one or more optical elements, the microscope being configured to deliver light from the microscope light source to the test object and the one or more optical elements being configured to collect light from the test object, and the interferometric sensor can be configured to direct light to the stage through the one or more optical elements of the objective.

The sensor light source can be a broadband light source. The sensor light source can have a peak intensity at a wavelength in a range from 900 nm to 1,600 nm. The sensor light source can have a full-width at half maximum of 50 nm or less. The sensor light source can have a coherence length of about 100 microns or less.

The tunable optical cavity can include two optical paths for the light, each path comprising a fiber stretcher module. The sensor light source and the detector can be located in a housing separate from the microscope.

The information can be about a displacement between the objective lens and the stage along an axis. The microscope can be configured to scan the stage parallel to the axis. The information can be about an absolute displacement between the objective lens and the stage. Alternatively, the information can be about a relative distance between the objective lens and the stage.

The microscope can include a microscope light source and can be configured to deliver light from the microscope light source to a test object located on the stage, wherein a wavelength of peak intensity of the microscope light source is about 100 nm or more from a wavelength of peak intensity of the sensor light source. The wavelength of peak intensity of the microscope light source can be in a range from 300 nm to 700 nm and the wavelength of peak intensity of the sensor light source is in a range from 900 nm to 1,600 nm.

In general, in a further aspect, the invention features apparatus that includes an imaging interferometer including one or more optical elements and a stage for positioning a test object relative to the one or more optical elements, the stage being moveable with respect to the one or more optical elements, and a sensor system that includes a sensor light source, an interferometric sensor configured to receive light from the sensor light source, to introduce an optical path difference (OPD) between a first portion and a second portion of the light, the OPD being related to a distance between the one or more optical elements and the stage, and to combine the first and second portions of the light to provide output light, a detector configured to detect the output light from the interferometric sensor, a fiber waveguide configured to direct light between the sensor light source, the interferometric sensor and the detector, a tunable optical cavity in a path of the light from the sensor light source and the interferometric sensor, and an electronic controller in communication with the detector, the electronic controller being configured to determine information related to the OPD based on the detected output light.

Embodiments of the apparatus can include one or more of the following features and/or features of other aspects. For example, the imaging interferometer can be an interferometric microscope. The imaging interferometer can be a SWLI interferometer or a PUPS interferometer.

In general, in a further aspect, the invention features apparatus that include an imaging interferometer comprising one or more optical elements and a stage for positioning a test object relative to the one or more optical elements, the stage being moveable with respect to the one or more optical elements, and a sensor system, that includes a sensor light source, a plurality of interferometric sensors each configured to receive light from the sensor light source, to introduce an corresponding optical path difference (OPD) between a corresponding first portion and a corresponding second portion of the light, each OPD being related to a corresponding distance between the one or more optical elements and the stage, and to combine the corresponding first and second portions of the light to provide corresponding output light, a plurality of detectors each configured to detect the output light from a corresponding interferometric sensor, a tunable optical cavity in a path of the light from the sensor light source to the interferometric sensors, and an electronic controller in communication with the detectors, the electronic controller being configured to determine information related to the OPDs based on the detected output light from each interferometric sensor. Embodiments of the apparatus can include one or more of the features of other aspects.

In general, in a further aspect, the invention features apparatus that include a microscope including an objective and a stage for positioning a test object relative to the objective, the stage being moveable with respect to the objective, and a sensor system, that includes a sensor light source, a plurality of interferometric sensors each configured to receive light from the sensor light source, to introduce an corresponding optical path difference (OPD) between a corresponding first portion and a corresponding second portion of the light, each OPD being related to a corresponding distance between the objective lens and the stage, and to combine the corresponding first and second portions of the light to provide corresponding output light, a plurality of detectors each configured to detect the output light from a corresponding interferometric sensor, a tunable optical cavity in a path of the light from the sensor light source to the interferometric sensors, and an electronic controller in communication with the detectors, the electronic controller being configured to determine information related to the OPDs based on the detected output light from each interferometric sensor. Embodiments of the apparatus can include one or more of the features of other aspects.

A number of documents are incorporated into this application by reference. In the event of conflict, the present application will control.

The details of one or more embodiments are set forth in the accompanying drawings and the description below. Other features and advantages will be apparent from the description and drawings, and from the claims.

DESCRIPTION OF DRAWINGS

FIGS. 13A-13E are plots from numerical experiments comparing a J-matrix approach with a DFT approach.

FIGS. 15A-15E are plots from numerical experiments comparing a J-matrix approach with a DFT approach.

FIG. 39 is a schematic diagram showing a combination of a Mirau objective and two sensors.

FIG. 40 is a schematic diagram showing a combination of a Michelson objective and a sensor.

FIG. 41 is a schematic diagram showing a combination of a Linnik objective and two sensors.

FIG. 42A is a schematic diagram showing a configuration of an objective with a sensor.

FIG. 42B is a schematic diagram showing a configuration of an objective with a sensor.

FIG. 42C is a schematic diagram showing a configuration of an objective with a sensor.

FIG. 52C is a diagram of an embodiment inspection station for LCD panels including an interferometric sensor.

Like reference symbols in the various drawings indicate like elements.

DETAILED DESCRIPTION

Figure 1:
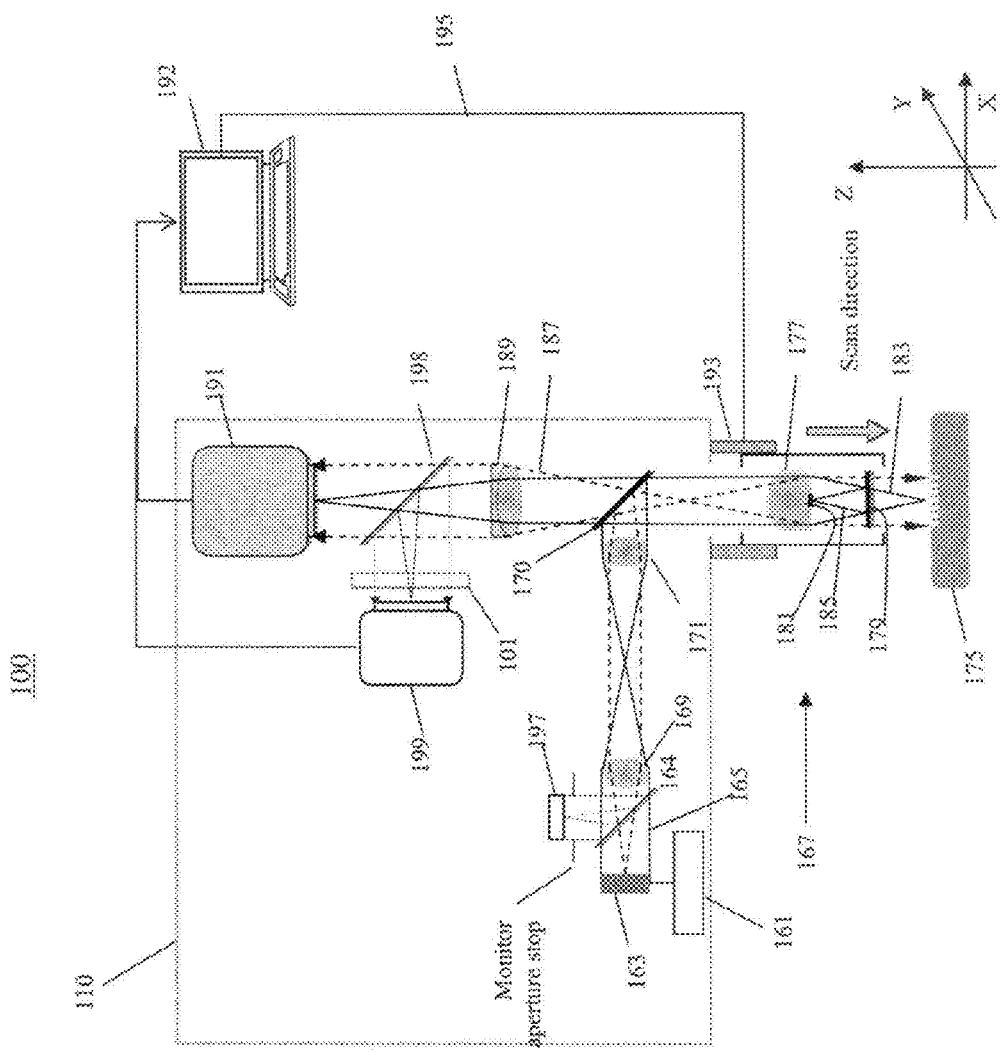
FIG. 1 is a schematic diagram of an embodiment of a low coherence interferometry system including an interference microscope.

Referring to FIG. 1, a low coherence interferometry system 100 includes an interference microscope 110 arranged to study a test object 175. Interference microscope 110 is in communication with a general purpose computer 192 that performs analysis of data signals from interference microscope 110 to provide information about test object 175. A Cartesian coordinate system is provided for reference.

Interference microscope 110 includes an interference objective 167 and a beam splitter 170 arranged to reflect illumination from a source sub-system in microscope 110 to test object 175 via interference objective 167, and to transmit illumination reflected from test object 175 to a detector sub-system for subsequent detection. Interference objective 167 is a Mirau-type objective and includes an objective lens 177, a beam splitter 179, and a reference surface 181.

The source sub-system includes a primary source 163, a secondary source 197, and a beam combiner 164 arranged to combine light from primary source 163 and secondary source 197 and direct the light to beam splitter 170 via relay optics 169 and 171. As will be explained in more detail below, primary source 163 provides low coherence light for the low coherence interferometry measurements while secondary source 197 provides light having a longer coherence length for monitoring the scan-history during a scan.

Primary source 163 is a spatially-extended broadband source providing illumination over a broad band of wavelengths (e.g., an emission spectrum having a full-width, half-maximum of more than 50 nm, or preferably, even more than 100 nm). For example, source 163 can be a white light emitting diode (LED), a filament of a halogen bulb, an arc lamp such as a Xenon arc lamp or a so-called supercontinuum source that uses non-linear effects in optical materials to generate very broad source spectra (e.g., having spectral FWHM of about 200 nm or more).

Secondary source 197 has a coherence length that is longer than the coherence length of primary source 163. In some embodiments, secondary source 197 is a highly coherent source, such as a single mode laser source. Source 197 can be a monochromatic source.

The detector sub-system also includes an intensity monitor 161, coupled to primary source 163. Monitor 161 provides information about the intensity of primary source 163, allowing system 100 to account for fluctuations in this intensity.

The detector sub-system includes a primary detector 191, a secondary detector 199, and a beam splitter 198 arranged to direct light from interference objective 167 to the primary and secondary detectors. Primary detector 191 and secondary detector 199 are both multi-element detectors (e.g., multi-element CCD or CMOS detectors). Optionally, the detector sub-system includes a bandpass filter 101 that filters the light impinging on secondary detector 199, allowing only light from secondary source 197 to reach the secondary detector 199.

During operation of system 100, primary source 163 provides input light 165 to interference objective 167 via relay optics 169 and 171 and beam splitter 170. Light from secondary source 197 is combined with input light 165 by beam combiner 164. Objective 167 and relay optic 189 direct light 183, 187 reflected from test object 175 onto detector 191, forming an image of test object 175 in a field of view (FOV) at detector 191. Beam splitter 198 also directs a portion of the light from objective 167 to secondary detector 199. Note that marginal rays are indicated by 183 and chief rays are indicated by 187.

Beam splitter 179 directs a portion of the light (shown by rays 185) to reference surface 181, and recombines the light reflected from reference surface 181 with light reflected from test object 185. At detector 191, the combined light reflected from test object 175 (referred to as test light) and reference surface 181 (referred to as reference light) form an optical interference pattern on detector 191. Because interference microscope 100 is configured for conventional imaging, the optical interference pattern (also referred to as an interferogram or interference image) corresponds to an image of the test surface.

Interference microscope 110 also includes an actuator 193 that controls the position of interference objective 167 relative to test object 175. For example, actuator 193 can be a piezoelectric transducer coupled to interference objective 167 to adjust the distance between test object 175 and interference objective 167 in the Z-direction. This type of relative motion between test object 175 and interference objective 167 is referred to as focus scanning because it scans the position of the focal plane of interference objective 167 relative to test object 175.

During operation, actuator 193 scans interference objective 167 relative to test object 175, thereby varying the OPD between the test light and reference light producing an interferometry signal at each of the detector elements. Actuator 193 is connected to computer 192 via a connection line 195 through which computer 192 can control, for example, the scan-velocity during data acquisition. In addition, or alternatively, actuator 193 can provide information about the scan-motion, such as an intended scan-increment to computer 192.

Figure 2:
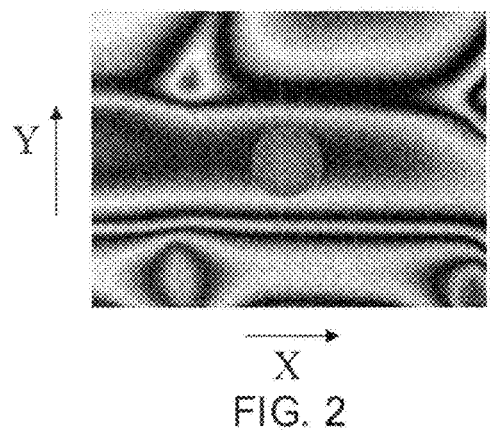
FIG. 2 is a diagram of an interference pattern in a field of view of a detector.

FIG. 2 shows an exemplary optical interference pattern at detector 191 for a single scan position, showing interference fringes related to surface-height modulations of the test object in the X- and Y-directions. Intensity values of the optical interference pattern across detector 191 are measured by different elements of detector 191 and provided to an electronic processor of computer 192 for analysis. Each detector element acquires intensity data at a frame rate (e.g., about 30 Hz or more, about 50 Hz or more, about 100 Hz or more), which is typically constant during the scan. The intensity values measured with a detector element and associated with a sequence of OPD values between the test and reference light form the low coherence interferometry signal.

Figure 3:
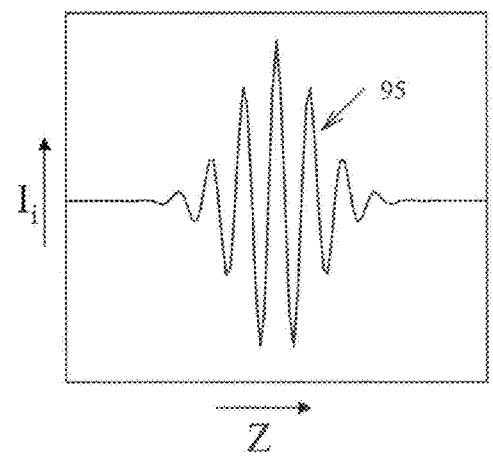
FIG. 3 is a plot showing intensity versus OPD of a low coherence interferometry signal.

FIG. 3 shows a plot of detected intensity, $I_j$, as a function of scan position for a single element of detector 191. The plot shows a typical low coherence interference signal with sinusoidal interference fringes modulated by a Gaussian envelope at the position of zero OPD between the test and reference light. The width of the Gaussian envelope depends on the coherence length of primary source 163. The OPD scan is longer than the coherence length of the source.

Figure 4:
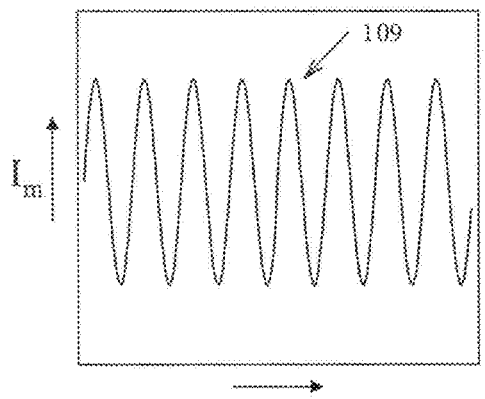
FIG. 4 is a plot showing intensity versus OPD for a monitor signal.

While primary detector 191 acquires low coherence interference signals, secondary detector 199 acquires interference signals based on the coherent light from secondary source 197. FIG. 4 shows a plot of such an interference signal for a single pixel of the secondary detector 199 as a function of the scan-position Z. The interference signals acquired using secondary detector 199 are referred to as monitor signals.

Typically, the OPD is scanned at a constant velocity and data points are acquired at even time intervals. In principle, each data point is acquired at even displacement increments in the OPD. However, even though the scan is usually assumed to be of constant velocity, the scan motion often deviates from a linear movement due to mechanical imperfections or the movement disturbing vibrations, for example. Thus, the acquired interferometric data can include errors related to the non-uniformity of the scan, which cause deviations of the actual scan-position from a nominal scan-position to which the measured intensity values are associated.

Figure 5:
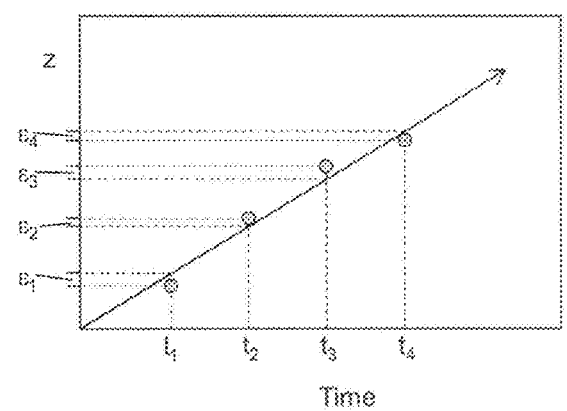
FIG. 5 is a plot of relative test object displacement as a function of time during a scan showing the effect of scan errors.

Such errors are referred to as "scan errors," which are illustrated graphically in FIG. 5. This figure shows a plot of z as a function of time, where z is the relative displacement between test object 175 and objective 167. Essentially, z corresponds to the OPD between the test and reference light. The plot shows a line representing a constant velocity scan. Four acquisition times are shown ($t_1$-$t_4$). In the absence of scan errors, the position, z, of the test object would lie on the line. However, scan errors cause a deviation between this nominal position and the actual position of the test object at the acquisition time, hence the actual positions of the test object, shown in the plot as the data points, deviate from the line. The magnitude of the scan error at each acquisition time is shown as $\in_i$, where i=1 ... 4.

In general, the sensitivity of measurements made using system 100 to scan errors varies depending on the frequency of the scan error source. For example, system sensitivity can vary depending on the frequency of vibrations experienced by the system. As an example, in FIG. 6, the relative sensitivity $S_v$ to vibrations is plotted as a function of vibration frequency $f_{vib}$ for a low coherence system operating with a mean wavelength of 570 nm, a full-width at half maximum spectral bandwidth of 200 nm, a low NA objective, a sampling scan-interval of 71.5 nm, and a primary detector with a 100 Hz frame rate. Sensitivity is low for frequencies from 20-30 Hz and 70-80 Hz, with peaks of relatively high sensitivity between those frequency bands. An exemplary fringe carrier frequency is approximately 25 Hz for SWLI and the primary detector therefore samples approximately four times for each fringe. It is believed that the high sensitivity region for frequencies <25 Hz shown in FIG. 6 can be related to errors in the scan-speed, while the high sensitivity regions for frequencies >25 Hz may be related to distortions in the scan-increment due to vibrations. The distortion may be rapidly changing in sign for the data acquisition for neighboring scan-position, e.g., from recorded camera frame to camera frame. In general, as used herein, "low frequency" scan error sources (e.g., low frequency vibrations) refer to frequencies equal to or less than the frame rate of the detector used to acquire the low coherence interference signals (e.g., primary detector 191). "High frequency" scan error sources (e.g., high frequency vibrations) refer to frequencies greater than the frame rate of the detector used to acquire the low coherence interference signals.

To reduce the effects of scan errors in measurements made using system 100, computer 192 uses information from the monitor signals acquired using secondary detector 199 to reduce the effect of scan errors in the low coherence signals acquired using primary detector 191. As the monitor signals are based on a coherent light source (secondary source 197), the fringes extend over the length of the scan and the interpretation providing phase information (and correspondingly relative displacement information) over the entire scan range. As will be discussed below, in general, the analysis of monitor signals for multiple points in the FOV of secondary detector 199 allows determining the scan errors, including those caused by vibration, specifically in the high frequency region as defined above.

Assuming that the phases of the scanned monitor signals show some differences over the FOV, this diversity of phases (i.e., differing phase offsets of at least some of the monitor signals) allows for the correction of systematic errors in the interpretation for scan errors that may be changing rapidly from scan-position to scan-position. Thus, when appropriately analyzed, this feature enables one to accurately measure high frequency vibrations that would be incorrectly measured in the absence of multiple measurements providing the phase diversity. Providing a large selection of image points for the monitor signals accommodates also highly-patterned object surfaces, such as semiconductor wafers.

Thus, once computer 192 has determined the scan-motion history, for example, the true (or at least more correct) scan-motion can be determined for the low coherence signals based on the interpretation of the monitor signals. Further processing of the low coherence data collected by primary detector 191 (e.g., by means of a cubic spline interpolation or other algorithm) reduces the effect of scan errors on this data. Data analysis of both the monitor signal data and the low coherence signal data are described in more detail below.

PUPS Interferometry Systems

While the foregoing discussion is with respect to an interference microscope configured to image the test object to the detector, scan error correction can also be applied to other configurations. For example, in some embodiments, interference microscopes can be configured to image a pupil plane of the microscope to the detector. Such configurations are referred to as PUPS configurations. This mode of operation can be useful, for example, for determining the complex reflectivity of the test surface.

Figure 7:
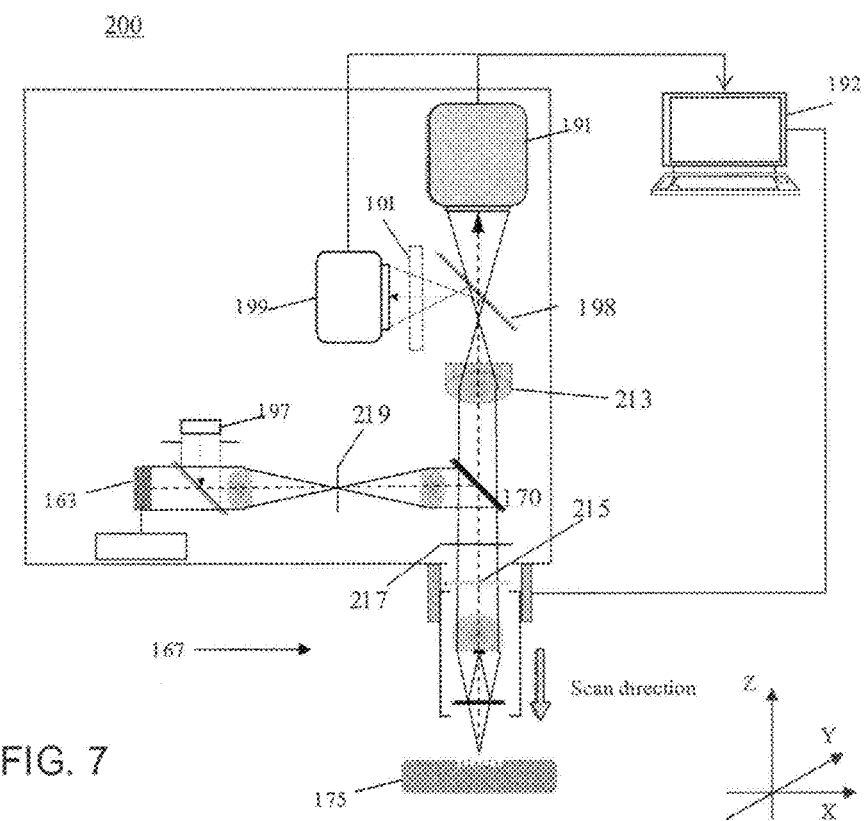
FIG. 7 is a schematic diagram of an embodiment of a low coherence interferometry system including an interference microscope.

FIG. 7 illustrates a PUPS interferometry system 200 incorporating a number of elements previously described in connection with system 100 shown in FIG. 1. However, unlike system 100, system 200 includes a pupil-plane imaging tube lens 213 and a polarizer 215 positioned between objective lens 167 and beam splitter 170. In system 200, a pupil plane 217 is imaged onto detector 191. A field stop 219 restricts the sample illumination to a small area on test object 175. System 100 acquires data in the same manner as system 100, described above.

For analysis, electronic processor 192 transforms the interferometry signals from primary detector 191 into a frequency domain and extracts the phase and amplitude information for the different wavelength components of primary light source 163. As the source spectrum can be broad, many independent spectral components can be calculated. The amplitude and phase data can be related directly to the complex reflectivity of the test surface, which can be analyzed to determine information about the test object.

Because of the arrangement of system 200, each detector element of primary detector 191 provides measurements at a multiplicity of wavelengths for a specific angle of incidence and polarization state (according to the polarizer 215). The collection of detector elements thus covers a range of angles of incidence, polarization states and wavelengths.

Figure 8:
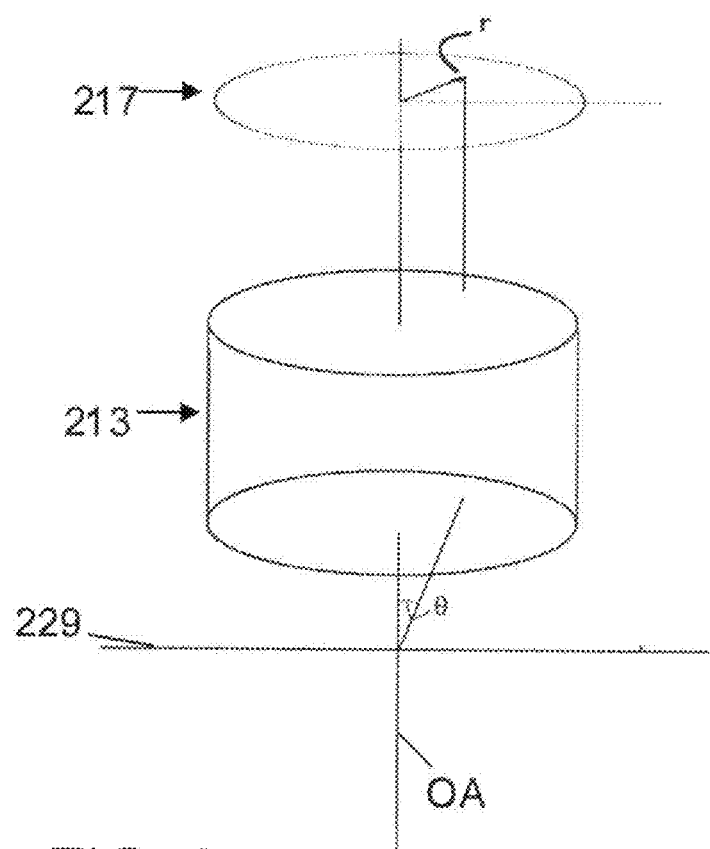
FIG. 8 is a schematic diagram illustrating the relationship between light in an image plane and a pupil plane.

FIG. 8 illustrates the relationship between light at a focus plane 229 (e.g., at the test object) and at pupil plane 217. Because each source point illuminating pupil plane 217 creates a plane wave front for test light illuminating the test object, the radial location of the source point in pupil plane 217 defines the angle of incidence of this illumination bundle with respect to the object normal. Thus, all source points located at a given distance r from the optical axis of correspond to a fixed angle of incidence θ, by which an objective lens focuses the test light to the test object. For a pupil-plane imaging tube lens with numerical aperture NA and maximal radial distance $r_{max}$ for transmitted light, the relation between a point in pupil plane 217 at the distance r from optical axis OA and the angle of incidence θ in the focus plane 229 is given by $\sin(\theta)=(r/r_{max})NA$.

Path-Length Scanning

Figure 6:
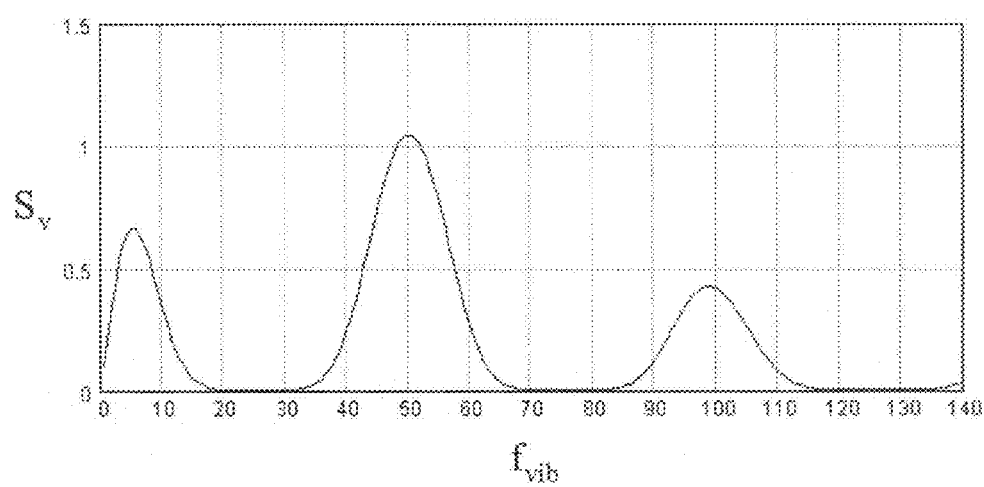
FIG. 6 is a plot showing system sensitivity to scan error as a function of vibrational frequency.
Figure 9:
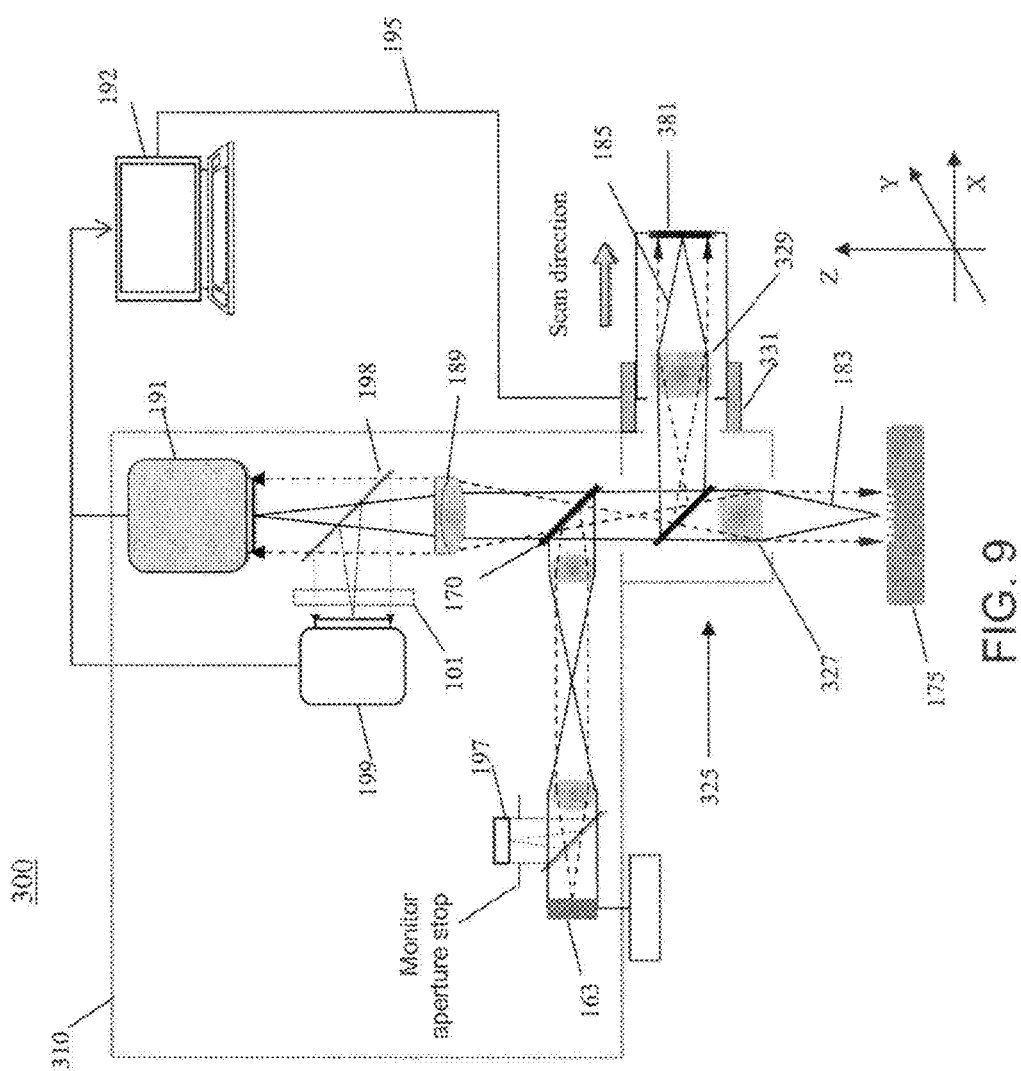
FIG. 9 is a schematic diagram of an embodiment of a low coherence interferometry system including an interference microscope.

The foregoing embodiments, described in connection with FIGS. 1 and 6, both utilize Mirau objectives that provide focus scanning. In general, however, other configurations are also possible. For example, interferometry systems that include Linnik objectives can be used. Such a system is shown in FIG. 9. Specifically, system 300 includes an interference microscope 310 arranged to image test object 175 onto the detector. System 300 includes a number of elements previously described in connection with system 100 above. However, rather than a Mirau objective, system 300 includes a Linnik interference objective 325, which features a beam splitter 379 that splits light from beam splitter 170 into test light and reference light along different arms of the objective. Objective 325 includes a test objective 327 in the arm of the test light and a corresponding reference objective 329 in the reference light arm. A reference object 381 is positioned in the reference arm and reflects the reference light back to beam splitter 379.

Reference objective 329 and reference object 381 are mounted in an assembly that is coupled to the other components of objective 325 via an actuator 331. During operation, actuator 331 adjusts the OPD between the test light and reference light by moving the reference objective 329 and reference surface 381 relative to beam splitter 379. The path length between reference objective 329 and reference surface 381 remains constant during the scan. Accordingly, the OPD between the test and reference light is changed independently of the object focus. This type of scanning is referred to herein as "path-length" scanning. In system 300, path-length scanning increases the length of the collimated space in the reference leg of the Linnik configuration whereas in the test leg the object stays at the same focus position during the scan.

Figure 10:
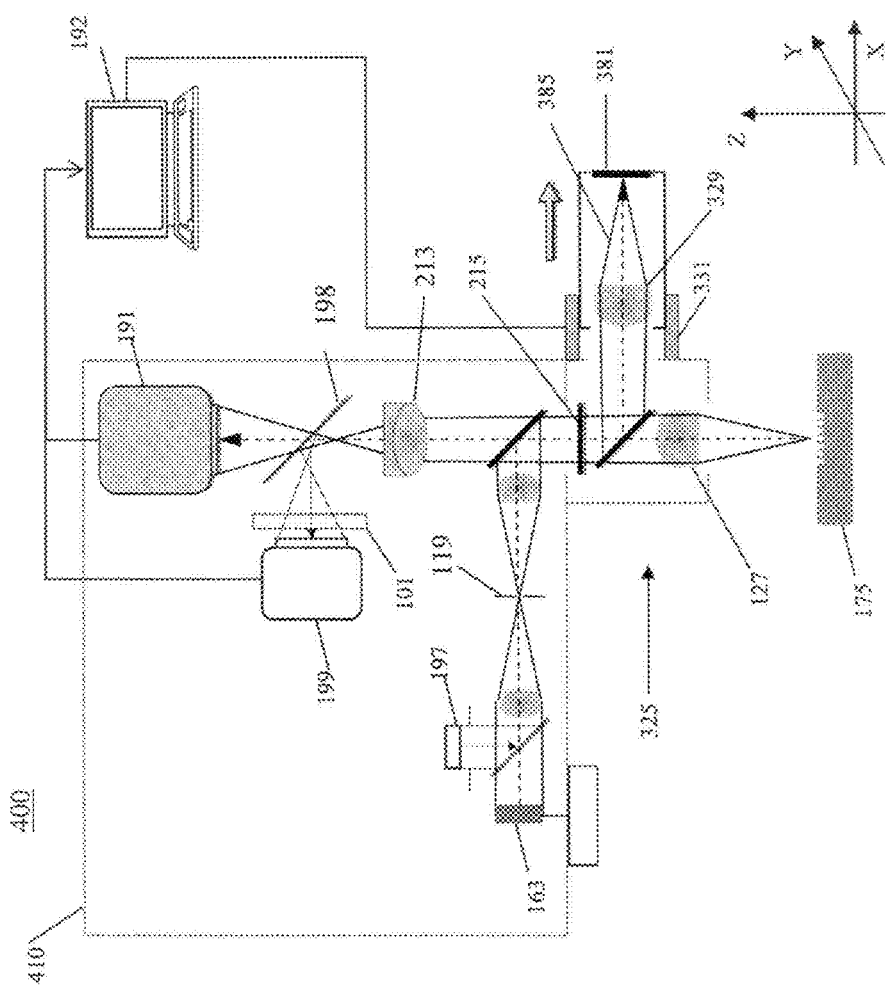
FIG. 10 is a schematic diagram of an embodiment of a low coherence interferometry system including an interference microscope.

Interferometry systems that feature Linnik objectives can also be configured for PUPS mode operation. Referring to FIG. 10, for example, a system 400 includes an interference microscope 410 that includes Linnik objective 325 and, like system 200 described above, is configured to image a pupil plane onto primary detector 191.

In general, when correcting for scan errors, scan motion analysis should be based on the scanning mode (e.g., focus or path-length scanning) and imaging mode (e.g., object imaging or PUPS) of the interferometry system. For example, carrier fringe frequency in low coherence signals can vary depending on the system's mode of operation. For a Linnik interferometer system operated in the PUPS mode, for example, path-length scanning causes the same fringe carrier frequency for all position in the pupil plane image. Whereas, for a Mirau interferometer operated in the PUPS mode, focus scanning (scanning the object focus simultaneously with the OPD) causes the fringe carrier frequency to fall off as the distance from the optical axis in the pupil plane increases in proportion to cos(θ), where θ is the angle a ray makes with the optical axis at the object plane (see FIG. 8).

Note that while the path-length scanning in the Linnik case generally creates a constant frequency monitor signal across the pupil, there can be two types of perturbations of the interferometric cavity. One type is vibration are unwanted scan motions (e.g., non-linearity) that occur on the reference leg as objective 329 and reference minor 381 move as a unit. In this case the scan errors create optical path variations in the monitor signal that are independent of the position where the monitor signal is measured in the pupil. The other type is vibration that takes place in the object leg, resulting in variations of the distance between lens 127 and object surface 175. In this case the vibration introduces optical path variations in the monitor signal that are function of the angle of incidence in object space (or equivalently that are function of the radial position at the pupil). It is necessary in such a configuration to separate these two motion components to properly account for them in the subsequent signal correction.

In certain embodiments, a variation in fringe carrier frequency can be used in cases where the phase diversity of the multiple monitor signals across the FOV in PUPS mode at zero OPD is small. The variation in fringe carrier frequency with radial position generates a diversity of phases across the pupil FOV on either side of zero OPD, providing the necessary information to accurately determine scan increments over low and high vibration frequencies.

In general, the scan error correction techniques discussed herein are compatible with both scanning methods and with both conventional and pupil plane imaging, with some differences in the data processing, particularly in the PUPS mode. If scanning in path length as in a Linnik-objective microscope adapted for PUPS measurements (see, e.g., FIG. 10), the fringe carrier frequency is the same for all pixels in the pupil image. If scanning the object focus simultaneously with the OPD as in the Mirau-objective microscope of FIG. 7, then the fringe carrier frequency falls off as the distance from the optical axis in the pupil plane increases in proportion to cos(θ), where θ is the angle the ray makes with the optical axis at the object plane. This variation in frequency can be advantageous in cases where the phase diversity across the FOV in PUPS mode at zero OPD is small. The variation in frequency with radial position generates a diversity of phases across the pupil FOV on either side of zero OPD, providing the necessary information to accurately determine scan increments over all vibrational frequencies.

Determining Scan Positions from Monitor Data

In general, a variety of methods are available for determining the scan positions from the monitor data. For example, if one restricts the analysis to low-frequency sources of scan errors, it is sufficient to apply conventional phase-shifting interferometry (PSI) algorithms to estimate the phase of the monitor signals at a specific camera frame and a specific pixel. For example, if a nominal phase shift between camera frames is π/2, a well-known phase shift algorithm has the form $$\tan[\Phi(r)] = \frac{2(g_2 - g_4)}{-(g_1 + g_5) + 2g_3}. \qquad (1)$$

Here, r is a vector specifying the pixel location, and $g_{1, 2, \ldots 5}$ are corresponding intensity measurements at that pixel for a sequence of camera frames acquired during the data-acquisition scan (see, e.g., Schwider, et al., 1983; Encyclopedia of Optics, p. 2101, Table 2). Eq. (1) provides, in principle, the phase Φ at the mid frame $g_3$. As another example, PSI algorithms can be applied to determine scan positions proposed by Deck (L. Deck, "Vibration-resistant phase-shifting interferometry," Appl. Opt. 35, 6655-6662 (1996)) and by Olszak and Schmit (U.S. Pat. No. 6,624,894). However, the PSI algorithm method is effective for low-frequency vibrations only; because the algorithm is itself sensitive to high-frequency vibrations in the same way as the low coherence signal.

To compensate high-frequency vibrations as well as for the low-frequencies, methods are used that measure the phase Φ(r) at a minimum of two different pixel locations. For example, in the specific case of the use of a PSI algorithm (e.g., as shown in Eq. (1) or similar), it is believed that errors in determining Φ(r) are cyclic at twice the frequency of Φ(r). Accordingly, averaging measurements of two or more phases in quadrature (different by 90°) can cancel errors related to high-frequency vibrations.

More generally, several methods have been developed in the context of PSI for determining the actual scan positions a posteriori from interference data. In general, these methods are most effective if there is a range of phases Φ(r) and/or frequencies to work with, which can be provided, for example, by using a multi-element detector to acquire the monitor signals (e.g., as described in the embodiments above) along with a feature that introduces some phase diversity (where all monitor frequencies have the same frequency) in the interferogram across the FOV of the multi-element detector.

Phase diversity can be introduced, for example, by the natural height variation of the test object when the system is operated in conventional imaging mode. As another example, phase diversity can be introduced by in conventional imaging mode by tilting the test object or reference object to introduce interference fringes. In PUPS mode, in systems using a Mirau objective or similar, the system geometry naturally introduces a range of interference-fringe frequencies across the FOV of the detector.

The following discussion provides an exemplary method of determining scan positions using a range of phases Φ(r). Considering first a PUPS-Linnik system (e.g., as shown in FIG. 10), in which the reference minor and objective lens are moved together as a rigid object along the optical axis to achieve a path-length scan, the path difference for specular reflection at different points in the pupil plane as z(t, r) where t denotes the time parameter during the scanning procedure. This path difference will consist of a perfect scan plus an error term:

$$z(t,r)=z_0(t,r)+\in(t,r) \quad (2)$$

where $z_0$ denotes the ideal scan and ∈ denotes the error or noise term. The phase of the interferometer will be given by $$\Phi(t,r)=\Phi_0(r)+2\pi z(t,r)/\lambda \quad (3)$$

where $\Phi_0$ is a phase offset giving different points in the pixel plane a potential phase difference. The wavelength of the light from the secondary source is given by λ, and it is assumed to be independent of r.

Choosing the origin for r to be the point corresponding to the optical axis in the pupil plane, and letting θ(r) denote the angle of incidence at the object focus plane of the specular ray passing through r in the pupil plane, it follows from the Abbé sine condition that $$\sin[\theta(r)]=\kappa|r| \text{ for some constant } \kappa \quad (4)$$

The scan of path difference will not depend on θ when the object and reference mirror move together as in a Linnik system, thus achieving a scan in the collimated space. But when the object focus is being scanned as in a Mirau system, the OPD depends on θ. Accordingly, one has two limiting cases $$z_0(t,r)=z_0(t), \text{ independent of } r \text{ if pathlength is scanned}$$

$$z_0(t,r)=\cos(\theta(r))z_0(t,0), \text{ if the focus is scanned} \quad (5)$$

If both the path length and focus were scanned (which is possible in a Linnik system, for example), then $z_0$ would be a linear sum of these two types of motion.

As discussed above, in some embodiments, the scan is nominally a perfectly linear function of t, all the points of the pupil plane have the same nominal OPD at the start of the scan, and there is ideally no tilting of the object or reference as the scan progresses. In this case, one can write $$z_0(t,0)=c+\dot{z}_0 t, \quad (6)$$

Where c is a constant that may vary from scan to scan and where $\dot{z}_0$ is also a constant. The scan as a function of r will then depend on the type of scan (Eq. (5)).

In general the error term ∈ can depend on both t and r, but since the object is assumed to be a rigid body without any rotation as it scans, the error can be represented more simply as $$\in(t,r)=\in_p(t)+\cos(\theta(r))\in_f(t). \quad (7)$$

The first sum in this expression represents vibration or scan error in the collimated space, and the second term proportional to cos(θ) represents vibration or scan error in the high numerical aperture space of the interferometer caused by focus error. The assumption is that ∈ is small.

The monitor signal interference intensity that is detected at the pupil plane by the secondary detector is time dependent, and it depends on the phase difference in the interferometer as given by the following formula $$I(t,r)=[A(r)+dA(t,r)]\cos[\Phi(t,r)]+c(r)+dc(t,r) \quad (8)$$

A(r) denotes the mean amplitude of the interferogram at the point r. dA(t, r) denotes the fluctuations about the mean of the interferogram's amplitude at the point r. Φ(t, r) denotes the phase at r as a function of time t. c(r) denotes a mean offset for the interferogram signal which is in general r dependent. dc(t,r) denotes a fluctuation about the mean of the offset. This is typically a slowly varying function of time.

The intensity I(t, r) is sampled at a discrete set of times $\{t_i\}$ and a discrete set of points in the pupil plane $\{r_i\}$. The ideal-time sample points are assumed to be equally spaced so that $$t_{i+1}=t_i+\delta t, \text{ where } \delta t \text{ is independent of } i. \quad (9)$$

For a point r the full set of times $\{t_i\}$ can be thought of as a one dimensional array, and an estimate can be made of the noise terms $\in_p(t)$ and $\in_f(t)$. A single pixel does not give a reliable estimate of these error terms at high vibrational frequencies, as noted above. But with a multiplicity of such vectors at different points $\{r_i\}$, a large number of estimates can be made for each of these noise terms. The final estimates are obtained by applying a median to the set of measurements $$\in_p(t)=\text{median}(\in_p^i(t))$$

$$\in_f(t)=\text{median}(\in_f^i(t)) \quad (10)$$

where here i denotes the estimate made using the vector taken at different times for the point $r_i$. The choice of which points $\{r_i\}$ to use is somewhat arbitrary, the main consideration being that the points should have as much variance in the starting phase as possible, or if focus scanning is being used, that it have several θ values.

The following algorithm acts on a single vector set $\{t_i\}$. The first step is to calculate precisely the peaks of the vector $I(t_i, r)$. This requires that that δt be small enough so that the number of samples in a single sine wave of interference signal data be in the range 8 to 30 samples per wave. With this fine sampling, an interpolation of the sampled points can be made using, for example, a cubic spline $$I_{Fine} = \text{spline}(z, I, z_{fine}) \quad (11)$$

From the vector $I_{Fine}$ one can calculate the extrema of the signal (both maxima and minima) which occur at phases which are odd multiples of π/2.

$$\text{peaks} = \text{peakfinder}(I_{Fine}) \quad (12)$$

Using these peak values we can estimate all of the following quantities: $c(t)+dc(t)$, $A+dA(t)$, and the ideal phase $\Phi_{ideal}$ as a function of t. One finds $\Phi_{ideal}$ by fitting the following functional form to the peak data:

$$\Phi_{Ideal}(t_i, r) = \Phi_{Ideal}(t_0, r) + (i-1)\Delta\Phi_{Ideal}(r) \quad (13)$$

where $\Delta\Phi_{Ideal}(r) = 2\pi\dot{z}_0/\lambda$ for pathlength scanning $\Delta\Phi_{Ideal}(r) = 2\pi \cos(\theta(r))\dot{z}_0/\lambda$ for focus scanning $\quad (14)$ The fitting task amounts to finding the best values of the starting phases $\Phi_{ideal}(t_0, r)$ to make the peaks of the cosine function occur where the observed peaks were found. If the value for $\dot{z}_0$ is not known precisely, then it too can be part of the data-fitting algorithm.

Other methods of fitting the monitor signals are also possible. For example, an alternative to peak finding is an FFT means to estimate the phase. However, an advantage of using peaks is that it does not require that the sample period divide evenly into the whole scan length, which may be an advantage when scanning the focus plane because the sample period would vary from ring to ring in the pupil plane for a PUPS analysis.

The next task is to estimate the error in $\Phi$ caused by inaccurate scanning. This can be done, for example, with an arc cosine function as follows (which it to be understood as returning a value between 0 and π)

$$d\Phi = \Phi - \Phi_{ideal} = \text{sign}(\sin\Phi_{Ideal})*(\cos^{-1}((I-c-dc)/(A+dA))) - \Phi_{Ideal} \quad (15)$$

This formula should be applied to all the sample points of the vector. Once $d\Phi$ is estimated, it is a simple matter to calculate the error $\in(t, r)$. Processing a plurality of such vectors for different values of θ provides sufficient information to separate the error terms $\in_p(t)$ and $\in_f(t)$. For instance, if n monitor signals are analyzed at different angles of incidence the collected information yields n equations for each time sample t:

$$\varepsilon_1(t) = \varepsilon_p(t) + \cos(\theta_1)\varepsilon_f(t)$$
$$M$$
$$\varepsilon_n(t) = \varepsilon_p(t) + \cos(\theta_n)\varepsilon_f(t)$$

This provides an overdetermined system of equations that is readily solved to provide estimates for both $\in_p(t)$ and $\in_f(t)$. This procedure is required for example in the case of a pathlength scan in the Linnik geometry where vibration is possible in both the reference and object legs. For a Linnik or Mirau interferometer where focus-scan is used the math above simplifies to:

$$\varepsilon_1(t) = \cos(\theta_1)\varepsilon_f(t)$$
$$M$$
$$\varepsilon_n(t) = \cos(\theta_n)\varepsilon_f(t)$$

in which case one can simply compute the median value of the resulting n estimates of $\in_f(t)$.

Correction of the Low-Coherence Signal Data

In general, once the scan errors are known, the low coherence interferometry data can be corrected to account for the errors. The following is a more a detailed example to illustrate correction of the low coherence signal itself prior to any further processing. Once the scan positions have been measured, the low coherence scan data can be corrected by means of cubic interpolation or other types of interpolation formula. Let $I_w(t, r)$ denote the low coherence scan data. It is known from the scan error analysis that this data was not sampled at the times $\{t_i\}$, but rather was sampled at these times plus an error term. So the actual samples occurred at times $$T_i(r) = t_i + \Delta_i(r) \quad (16)$$

where $$\Delta_i(r) = [e_p(t_i) + \cos(\theta(r))e_f(t_i)] / \frac{dz_{ideal}(r)}{dt} \quad (17)$$

Where $$\frac{dz_{ideal}(r)}{dt} = \dot{z}_0 \text{ for } pathlength \text{ scanning} \quad (18)$$

$$\frac{dz_{ideal}(r)}{dt} = \cos(\theta(r))\dot{z}_0 \text{ for object focus scanning}$$

So, we have measured the values $I_w(T_i, r)$, but we desired to measure $I_w(t_i, r)$, and so we can use cubic spline interpolation to calculate $I_w(t_i, r)$ approximately by using the formula $$I_w(t_i, r) = I_w(T_i - \Delta_i(r), r) \quad (19)$$

To perform the cubic spline, a table of points $[T_i, I_i]$ is established for i=0, 1, 2, ... n for the function I=I(t). That makes n+1 points and n intervals between them. The cubic spline interpolation is typically a piecewise continuous curve, passing through each of the values in the table. There is a separate cubic polynomial for each interval, each with its own coefficients:

$$S_i(t) = a_i(t-T_i)^3 + b_i(t-T_i)^2 + c_i(t-T_i) + d_i \text{ for } t \in [T_i, T_{i+1}] \quad (20)$$

together, these polynomial segments are denoted S(t), the spline.

Since there are n intervals and four coefficients for each a total of 4n parameters are needed to define the spline S(t). 4n independent conditions are needed to fix them. Two conditions can be obtained for each interval from the requirement that the cubic polynomial match the values of the table at both ends of the interval:

$$S_i(T_i) = I_i, S_i(T_{i+1}) = I_{i+1} \quad (21)$$

Notice that these conditions result in a piecewise continuous function. 2n more conditions are still needed. Since it is desirable to make the interpolation as smooth as possible, one can require that the first and second derivatives also be continuous:

$$S'_{i-1}(T_i) = S'_i(T_i), S''_{i-1}(T_i) = S''_i(T_i) \quad (22)$$

These conditions apply for i=1, 2, ..., n−1, resulting in 2n−1 constraints. Accordingly, two more conditions are needed to completely fix the spline. There are some standard choices left to the user:

$$S''_0(T_0)=0, S''_{n-1}(T_n)=0, \text{ called "natural"} \quad (23)$$

$$S'_0(T_0)=I'_0, S'_{n-1}(T_n)=I'_n, \text{ called "clamped"} \quad (24)$$

Other choices are possible if the function is periodic. Which is best depends on the application.

With 4n coefficients and 4n linear conditions it is straightforward to work out the equations that determine them using, for example, conventional algorithms.

The low coherence interference signal corrected in this way may then be processed according to the application, be it PUPS analysis of surface structure or conventional surface topography measurements.

J-Matrix Approach

In some embodiments, an approach referred to as the "J-matrix" approach can be used to correct interferometry data using scan error information from monitor signals. This approach is described below.

In a scan-error free measurement that provides absolutely evenly spaced samples of a signal, the resulting undisturbed signal can be represented by an M element vector u, which can be spectrally analyzed by performing a discrete Fourier transform (DFT). The DFT is mathematically equivalent to solving a linear equation system in the matrix form $$\underline{F} \cdot \vec{s} = \vec{u}, \quad (25)$$

where the columns of the M×M matrix $\underline{F}$ are basis functions representing purely oscillatory signals and the signal u is interpreted as a linear combination of those basis functions. In a complex notation the elements of matrix $\underline{F}$ are $$F_{m,n} = \frac{1}{M} e^{2\pi i \cdot (m-1) \cdot (n-1) \cdot \frac{1}{M}}. \quad (26)$$

The equation system is solved for the spectral coefficients contained in vector $\vec{s}$:

$$\vec{s} = \underline{F}^{-1} \cdot \vec{u} \quad (27)$$

$\underline{F}^{-1}$ turns out to be $$(F^{-1})_{n,m} = e^{-2\pi i \cdot (n-1) \cdot (m-1) \cdot \frac{1}{M}} \quad (28a)$$

so that the $m^{th}$ element of vector $\vec{s}$ becomes $$S_n = \sum_{m=1}^{M} \vec{u}_m \cdot e^{-i 2\pi i \cdot (n-1) \cdot (m-1) \cdot \frac{1}{M}} \quad (28b)$$

which has the form of a conventional definition of a discrete Fourier transformation (apart from the index shift which is a consequence of fact that the indices start at 1, not 0). The M elements of vector $\vec{s}$ denote the frequency content of the $0^{th}$, $1^{st}$, ..., $(M-1)^{st}$ harmonic in the undisturbed signal $\vec{u}$. Note that the $(M-h)^{th}$ harmonic is equivalent to the $-h^{th}$ harmonic. That means that the spectral components at the upper end of the spectrum are actually negative frequency components.

Now consider a signal taken at uneven sampling increments, such as nominally even sampling increments compromised by scan errors (e.g., due to vibration in the measurement system) or missing data points. The spectral analysis of the disturbed signal $\vec{d}$ by means of a regular DFT would inevitably result in a disturbed spectrum.

The Lomb-Scargle method is one way to perform a spectral analysis of unevenly spaced data if the sampling increments are known. In general, the Lomb-Scargle method represents a least-squares fitting of sine curves to the data. A power spectrum estimate is calculated for each frequency of interest independently. The fact that the fitting functions are not orthogonal to each other can lead to some leakage between different frequency components. The method is therefore generally not an exact method but is nevertheless a very powerful method in the presence of high noise levels.

In certain embodiments, one can take an approach for the spectral analysis of unevenly spaced data that is closer to a DFT. In general, in contrast to the way the DFT was set up above, a modified set of basis functions is used to form a new M×M matrix J. Each basis function (matrix column) contains the values of a pure oscillatory signal sampled at the known sampling positions. As in the DFT case, the aim is to construct the measured signal as a linear combination of the basis functions. The elements of the new matrix are $$J_{m,n} = c \cdot e^{2\pi i \cdot X_m \cdot Y_n}. \quad (29)$$

The function $X_m$ holds the information about the unevenly sampled scan positions. In an OPD scan of an interferometer, for example, $X_m$ can represent the M scan positions at which data were taken (e.g., $$X_m = \frac{z_m}{\text{nominal scan increment}},$$

where $z_m$ are the actual physical scan positions, taking into account the angular dependence shown in Eq. (7)). In general, a variety of techniques can be used to acquire values for $X_m$ such as, for example, the techniques discussed above. Additional techniques are discussed below The function $Y_n$, defines what the frequencies of interest are. For an application where the frequency analysis substitutes a DFT, the function $Y_n$, becomes, for example, $$Y_n = \begin{cases} (n-1) \cdot \frac{1}{M}, & \text{for } (n-1) \leq \frac{M}{2} \\ (n-1-M) \cdot \frac{1}{M}, & \text{for } (n-1) > \frac{M}{2} \end{cases} \quad (30)$$

and thereby represents positive and negative frequencies ranging from 0 to an equivalent of $$\frac{M}{2}$$

periods within the scan. The upper frequency limit, known as the Nyquist frequency, is a general limit of the DFT, whereas the method using the J-matrix can in special cases be composed to analyze frequencies beyond that limit, as shown in the numerical examples discussed below. The constant c is a factor that can be chosen to be 1 or $$\frac{1}{M}$$

if a definition closer to a DFT is desired.

The new linear equation system in matrix form $$\underline{J} \cdot \vec{s} = \vec{d} \qquad (31)$$

is solved for the spectral components in vector $\vec{s}$:

$$\vec{s} = \underline{J}^{-1} \cdot \vec{d}. \qquad (32)$$

Provided that all data points in vector $\vec{d}$ are independent (the M values in $X_m$ are unique), this method results in an exact solution.

It should be noted that the set of basis functions in matrix $\underline{J}$ is generally not orthogonal. For an exact solution, however, linear independence of the basis functions is sufficient.

In applications like low coherence interferometry, where typically a large amount of data sets (e.g., one for each camera pixel) need to be spectrally analyzed, the same J-matrix inverse $J^{-1}$ can be applied to all data sets because the uneven OPD sampling is the same for all the pixels. This makes the method reasonably fast because calculations are limited to one matrix inversion and P multiplications of a matrix with a vector, where P is the number of camera pixels.

As discussed previously, actual measurement systems are not only exposed to scan errors caused, for example, by vibration, but also measurement noise that adds an unknown value to one or more recorded data points (e.g., shot noise or digitization errors in the camera of an interferometer).

In general, the accuracy of a spectral analysis using the J-matrix can be affected by a number of factors. For example the degree to which the result of the spectral analysis using the J-matrix is affected by the noise depends on both the signal-to-noise ratio and the condition of the J-matrix and its inverse.

Generally, extremely uneven scan increments with nearly-identical values of $X_m$ for different m lead to barely-independent basis functions and badly-conditioned matrices and therefore instable solutions of the calculated spectrum in the presence of noise.

It is believed that in the case of stability problems due to noise, a higher degree of stability can be achieved by limiting the spectral analysis to a frequency band in which a spectrum magnitude greater than zero is expected. The J-matrix then becomes rectangular (less columns than rows). Consequently, the linear equation system is over-determined. An optimal solution in the least-square sense is calculated. Since the inverse of a rectangular matrix does not exist, a pseudo-inverse of the matrix should be calculated, which can be done using, for example, singular value decomposition (SVD) or the Moore-Penrose inverse of the form $$J^{-1} = (J^T J)^{-1} J^T, \qquad (33)$$

where the superscripted T denotes the transpose of a matrix. Apart from being more stable, the approach with a rectangular J-matrix has the further advantage of being faster, especially if the inverse matrix has to be multiplied to many data vectors.

The formalism, now being able to spectrally analyze data that was taken at uneven sampling positions, can be extended to also compensate for more general signal distortions. These additional distortions can be a function of the camera frame m (such as a fluctuating light source in an interferometric application), a function of the frequency component n (such as spectrally filtering effects of elements in the measurement setup) or a combination thereof (such as a spectrally fluctuating light source). These effects are combined in the function $I_{m,n}$. Monitoring this function requires independent metrology. Potentially, the function $I_{m,n}$ and the function $X_m$ containing the information about the sampling positions can be measured at higher rates than the disturbed signal $\vec{d}$ (data that has to be spectrally analyzed). The J matrix elements then become a weighted average of terms of the form shown on the right hand side of Eq. 29. Here S is the number of values for I and X that are monitored within the integration time of the sensor measuring the elements of $\vec{d}$ (e.g., within the frame integration time of a camera). A new set of basis functions is used to formulate the general form of the J matrix.

$$J_{m,n} = \frac{1}{S} \cdot \sum_{s=1}^{S} c \cdot I_{m,n,s} \cdot e^{2\pi i \cdot X_{m,s} \cdot Y_n}, \qquad (34)$$

This general form of the J matrix can be simplified for various distortion monitoring scenarios, two of which are outlined in the following.

In certain embodiments, the intensities and scanner positions are monitored once per camera frame, intensity changes are small within a camera frame (given for short camera shutter times, for example) and intensity fluctuations of the light source affect all frequencies equally. The calculation of averages in Eq. 34 is limited to one summand. I is a function of frame m only. Eq. 34 simplifies to a formulation of the J matrix that accounts for light source intensity fluctuations.

$$J_{m,n} = c \cdot I_m \cdot e^{2\pi i \cdot X_m \cdot Y_n}, \qquad (35)$$

In some embodiments, intensities and scanner positions are monitored once per camera frame, intensity changes due to the scan are significant within a camera frame (long camera shutter times) and intensity fluctuations are frequency dependent. Although only one scanner position is measured per camera frame, an estimate can be given for the motion of the scanner within the frame integration time and the consequent effect on the measurement. Assuming a linear motion of the scanner between frame m−1 and m+1, the quantity X will change from $X_m - T \cdot FR \cdot (X_{m+1} - X_{m-1})/4$ to $X_m + T \cdot FR \cdot (X_{m+1} - X_{m-1})/4$ within the camera frame m, where T is the integration time of the camera frames and FR is the frame rate of the camera measured in Hz (1/s). The sum in Eq. 34 is replaced by an integral which after solution results in $$J_{m,n} = c \cdot I_{m,n} \cdot \mathrm{sinc}\left(T \cdot FR \cdot \frac{X_{m+1} - X_{m-1}}{2} \cdot Y_n\right) \cdot e^{2\pi i \cdot X_m \cdot Y_n}, \qquad (36)$$

where the definition $\mathrm{sinc}(x) = \sin(\pi x)/\pi x$ was used and a constant light source intensity was assumed within the camera frame integration time. The expression in Eq. 36 reflects a frequency dependent reduction of the fringe contrast due to finite frame integration times of the camera. For the first and the last camera frame, the fraction within the sinc function is replaced by $X_{m+1} - X_m$ and $X_m - X_{m-1}$, respectively.

There are interferometric applications where the functions I in Eq. 34 or the function X in Eqs. 29 and 34 cannot be expressed for all camera pixels equally. In those cases, the J-matrix has to be calculated for individual camera pixels or groups of camera pixels. Possible reasons for pixel dependent variations include tip-tilt like motion of the interferometric cavity perturbing the piston-like scanning motion, vignetting predominantly affecting pixels at the edge of the field of view, or varying surface normal angles with respect to the scan motion (e.g., when measuring spherical surfaces using a Fizeau type interferometer with a reference sphere)

Applications that do not require a spectral analysis of the signal per se can also benefit from a signal analysis using the J-matrix approach. Since the described procedure can be seen as a substitute for a DFT, an inverse DFT of the calculated spectrum will reveal a signal equivalent to the original signal sampled at even increments and freed of any other influences that were considered in the calculation of the J-matrix (light source fluctuations, fringe contrast reduction due to finite frame integration times, etc).

Figure 11:
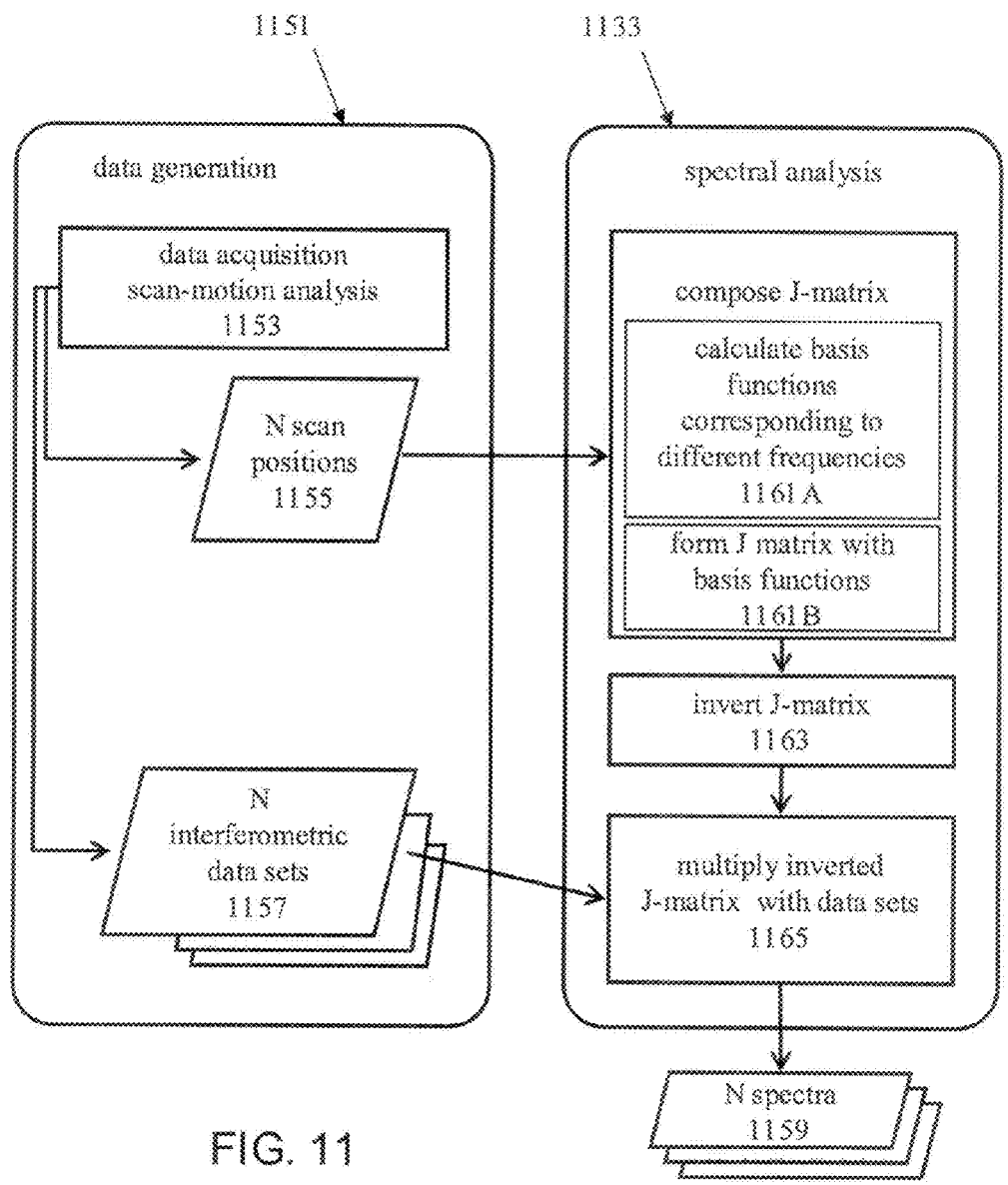
FIG. 11 is a flow chart showing a J-matrix approach.
Figure 12A:
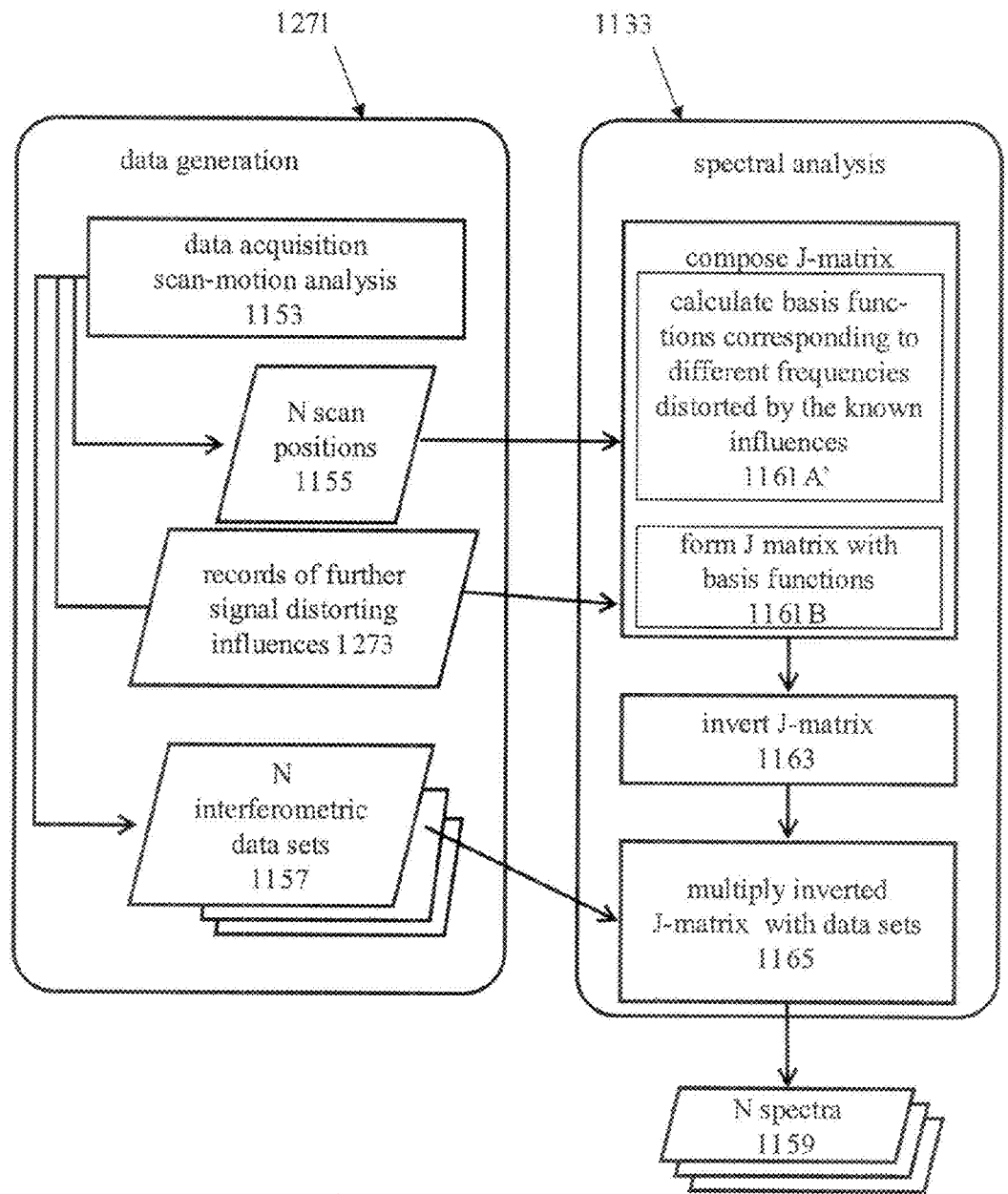
FIGS. 12A-B are flow charts showing J-matrix approaches.
Figure 12B:
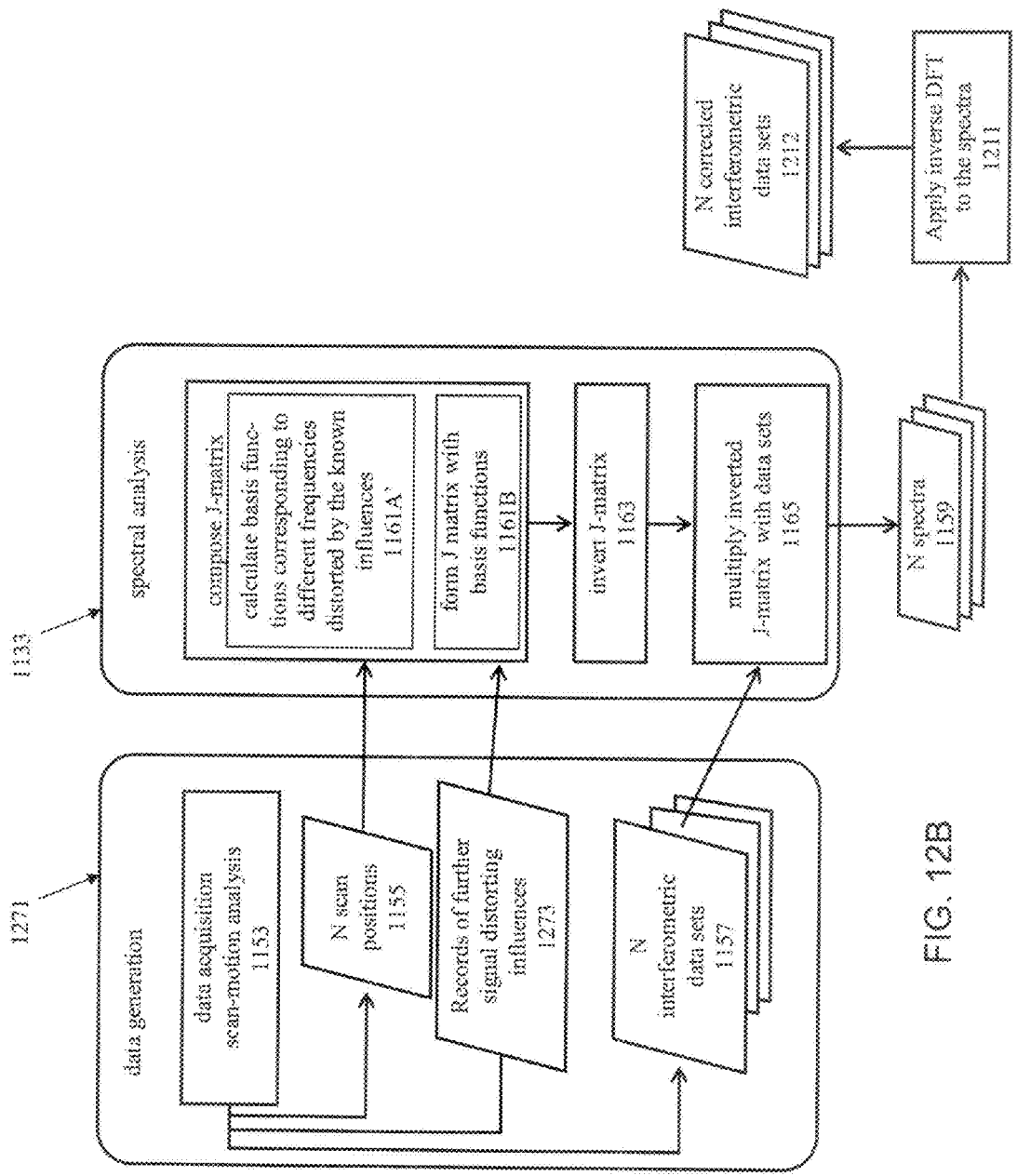

Three variations of the J-matrix approach are summarized in the flow charts shown in FIGS. 11, 12A, and 12B. Specifically, the flowchart in FIG. 11 illustrates spectral analysis using the J-matrix approach, the flow chart in FIG. 12A illustrations the extended J-matrix $J^{ext}$ with compensating for further signal distortions, while FIG. 12B illustrates the use of the J-matrix formalism for the reconstruction of corrected interferometry signals.

Referring to FIG. 11, the J-matrix approach involves a data generation portion (1151) and a spectral analysis portion (1133), resulting in N spectra being produced (1159). Data generation 1151 includes, for example, data acquisition and the scan-motion determination (1153), which provides N scan-positions (1155) and N interferometric data sets (1157) to the spectral analysis portion (1133). The N scan-positions 1155 may not be equidistant but a deviation is known from the determined scan-motion history. The N interferometric data sets 1157 correspond to the low coherence interferometry signals acquired using the primary source and detector of the interferometry system.

Spectral analysis 1133 involves the spectrally decomposition of the N interferometric data sets 1157 and provides N spectra 1159 as output for further analysis. Specifically, spectral analysis 1133 includes composing the J-matrix (1161), inverting the J-matrix (1163), and multiplying the inverted J-matrix with the data sets 1157 (1165).

To compose the J-matrix, one first calculates basis functions corresponding to different frequencies (1161A) and then forms the J-matrix with the basis functions as columns (1161B). In general, the basis functions correspond to values of pure oscillatory signals at the given disturbed scan-positions.

The N-spectra 1159 can be directly used for the evaluation of the scan or can alternatively, or in addition, be used to reconstruct corrected interferometry signals based on, e.g., the (unmodified) basis functions of the DFT.

Referring now to FIG. 12A, for the extended J-matrix, data generating portion (1271) is similar to that for the J-matrix approach except the portion measures additionally further signal-distorting influences 1273 that are then also considered for composing the J-matrix. Specifically, the basis functions for the extended J-matrix correspond to values of pure oscillatory signals at the given disturbed scan-positions modified according to the further signal distorting influences 1273. Spectral analysis 1233 includes similar steps to the J-matrix approach, however, composing the J-matrix involves calculating basis functions corresponding the different frequencies that are modified based on the records of further signal distorting influences 1273.

The flowchart shown in FIG. 12B illustrates the application of the extended J-matrix where the N spectra 1159 are calculated in way identical to the procedure outlined in FIG. 12A. Subsequently, the corrected spectra are used to reconstruct a set of N corrected interferometric data sets 1211 that are derived by the application of an inverse DFT 1212.

FIGS. 13A-15C illustrate via numerical experiment how the J-matrix method performs compared to a conventional DFT when applied to different low coherence signal examples.

FIGS. 13A-13E illustrate data for a vibration and camera noise free signal (i.e., a signal having no scan errors). FIG. 13A shows the signal itself, which is a synthetically generated cosine with a Gaussian envelope. The solid line is the undisturbed continuous signal, whereas actual data points are indicated by the dots. Those signal plots show only about a quarter of the whole SWLI signal. FIGS. 13B-13E show the spectrum amplitude retrieved by the DFT and the J-matrix method as well as the error magnitude of the spectrum. Specifically, FIGS. 13B and 13D show the spectrum and spectrum error when using the DFT method while FIGS. 13C and 13E show the spectrum and spectrum error when using the J-matrix method. In the absence of scan errors, the DFT and J-matrix frequency spectra are identical Gaussian distributions and both have zero spectrum error.

Figure 14A:
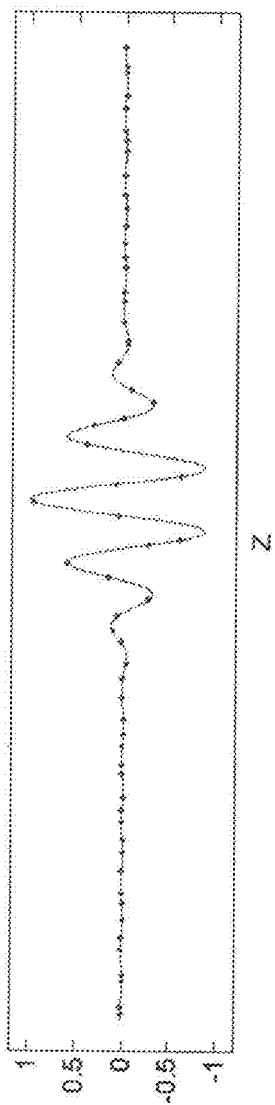
FIGS. 14A-14E are plots from numerical experiments comparing a J-matrix approach with a DFT approach.
Figure 14B:
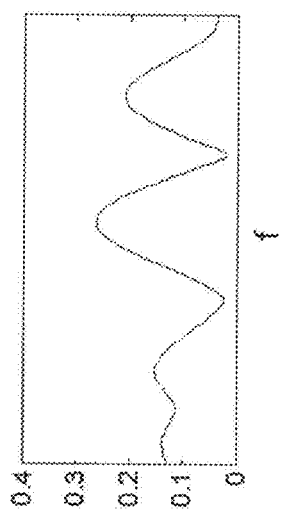
Figure 14D:
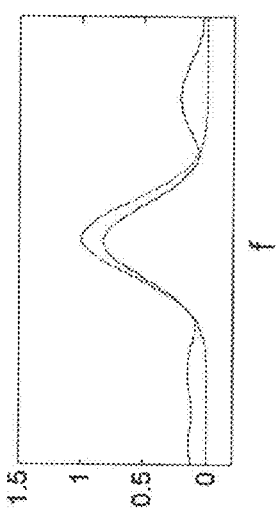
Figure 14C:
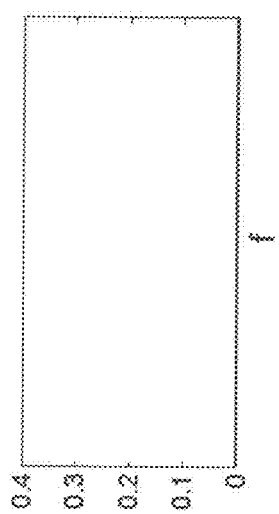
Figure 14E:
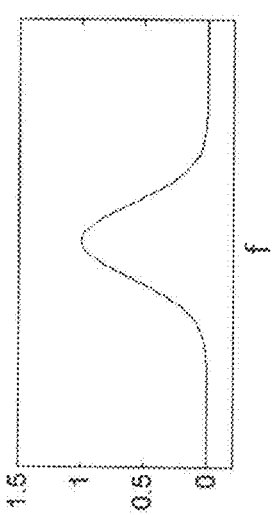

FIGS. 14A-14E show similar plots for data as those shown in FIGS. 13A-13E, however here the data points are still on the ideal curve but taken at unevenly distributed scan positions. As can be seen in FIG. 14B, when using the DFT method, the scan errors result in a frequency spectrum that deviates from the ideal Gaussian curve. The information about the exact sample locations is lost when using the standard DFT method and therefore leads to errors in the spectrum, as is evident from FIG. 14D. FIGS. 14C and 14E, however, shows that J-matrix method still retrieves an error-free spectrum.

FIGS. 15A-15E show similar plats as those shown in FIGS. 13A-13E, but except that here both uneven sampling and a floor noise affect the signal. As can be seen in FIG. 15A, the result is that the data points deviate from the ideal curve in addition to being distributed at uneven scan increments. Referring to FIGS. 15B-15E, the floor noise causes both the DFT and J-matrix spectra to deviate from being smoothly-varying functions and introduce errors in the spectrum. However, in general, the magnitudes of the errors are larger in for the DFT method than the J-matrix method.

In the examples discussed above in relation to FIGS. 13A-15E, the sample positions were set to deviate from strictly equidistant positions by about 1/16th of a period RMS and the camera noise level in FIGS. 15A-15E was 1% RMS of the full signal range.

In practice, the benefit of using the J-matrix method depends on the mixture of error sources. For example, where vibration is the dominant source of error and the vibration can be monitored, the J-matrix can lead to a substantial improvement in measurement accuracy. Where unmonitored noise is dominant, the J-matrix approach may not help significantly.

Figure 16A:
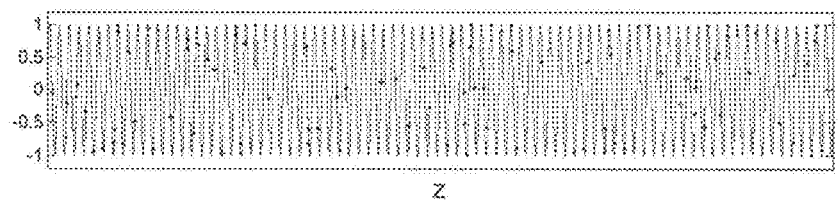
FIGS. 16A-16B are plots from numerical experiments demonstrating a J-matrix approach.
Figure 16B:
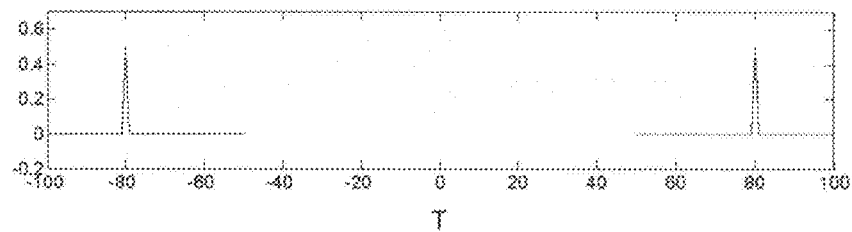

While the J-matrix method has been discussed in relation to improving the accuracy of measurements made using a low coherence interferometer (e.g., a SWLI interferometer), more generally it can be applied to other types of interferometry data. For example, the J-matrix method can be used to analyze signals acquired using a long coherence length interferometer (i.e., that include sinusoidal fringes but not modulated with a Gaussian envelope like a SWLI signal). Without wishing to be bound by theory, use of the J-matrix on such a signal is demonstrated using numerical experiment. Referring to FIGS. 16A-16B, for example, a signal composed of 80 periods of a pure sine-wave are sampled with only 100 samples at completely random sampling positions in the given interval. FIG. 16A shows a plot of the signal, where the sample data points are shown by dots on the sinusoidal curve. In a Nyquist sense, the signal is under-sampled. Referring specifically to FIG. 16B, the 100 data points were analyzed with a 100×100 J-matrix, where the J-matrix was composed of basis functions that correspond to 50 to 99 periods in the given interval and their negative counterparts. It was assumed that some knowledge about the frequency content exists. Selective frequency bands were used to define the basis functions. The data was noise-free. The J-matrix spectrum shows a distinct peak at 80 cycles per interval, indicating that the J-matrix method performs reliably.

Figure 17A:
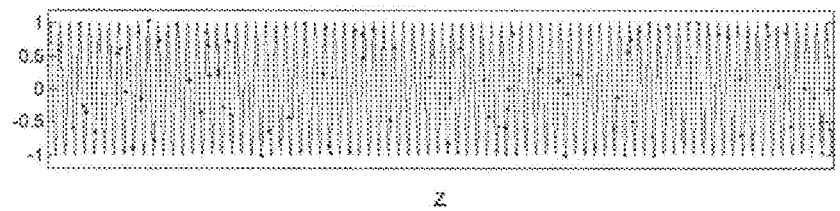
FIGS. 17A-17C are plots from numerical experiments demonstrating a J-matrix approach.
Figure 17B:
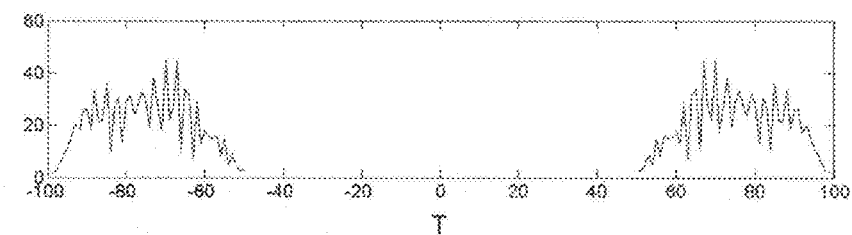
Figure 17C:
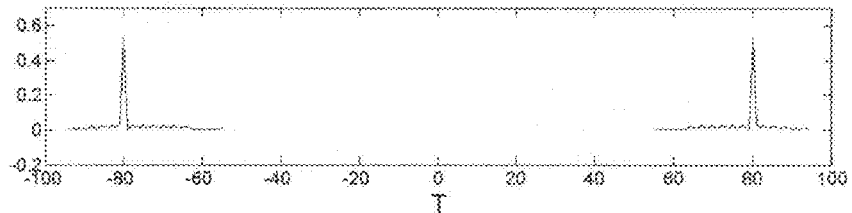

Referring to FIGS. 17A-17C, a second numerical experiment was performed using the same data as shown in FIG. 16A, with additional noise corresponding to 2% of the signal range added to the signal. Two J-matrix analyses were performed on this data. Referring specifically to FIG. 17B, in the first analysis, a badly-conditioned 100×100 J-matrix method was used yielding an error-filled frequency spectrum. Referring to FIG. 17C, in the second analysis, the data was analyzed using a 100×80 J-matrix, resulting in distinct peaks at the correct frequency.

Figure 18:
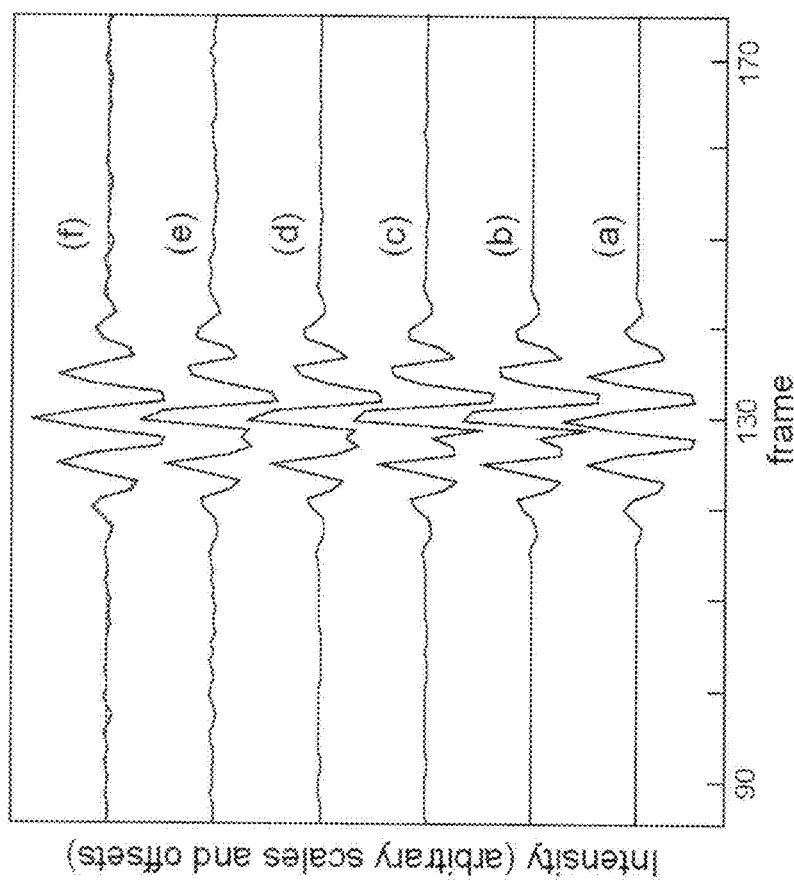
FIG. 18 shows plots of interferometric signals from a numerical experiment.

Referring to FIG. 18, numerical experiments were performed in which the extended J-matrix was used to recover a distorted interferometric signal as opposed to just calculating the corrected spectrum of a signal. The example shows six possible signals of a low coherence interferometer (labeled (a)-(f)) where from signal (b) to signal (e) more and more signal distorting influences were added. The series starts with signal (a), which shows an undistorted interferometric signal. Signal (b) corresponds to a scan with uneven scan increments. Some degree of light source fluctuations is added in signal (c), while in signal (d) the effect of a finite frame integration time was included. This effect is most obvious around frame 128. The final noise source added was camera noise, resulting in the distorted interferometric signal (e). The basis functions of the extended J-matrix included all signal distorting influences but the camera noise, which cannot be independently monitored. After calculation of the spectrum, an inverse DFT revealed the corrected interferometric signal (f). The original undistorted signal is overlaid for comparison as a dashed line. In this experiment, a rectangular 256×181 element extended J-matrix was used with the higher frequency range removed.

As discussed previously, information about the unevenly sampled scan positions, $X_m$, can be provided from a variety of sources. Of course, in some embodiments, the information is provided based on measurements of a monitor system, for example, as described in connection with the embodiments shown in FIGS. 1, 7, 9, and 10. However, more generally, the information can be provided from other sources. For example, the information can be obtained using accelerometers, touch probes, capacitive gages, air gages, optical encoders (e.g., linear optical encoders), or from techniques based on interpretation of the low coherence interferometry data themselves.

Compound Reference

In some embodiments, information about the scan errors is determined using a compound reference. A compound reference is a reference object that has at least two reference interfaces: a primary reference interface and a secondary reference interface.

The primary reference interface is configured as a conventional reference interface while the secondary reference interface is configured provide information that allows one to monitor the displacement of the test object relative to the interference microscope while scanning the OPD of the interference microscope. In general, the secondary reference interface is mechanically fixed with respect to the primary reference interface.

The effect of the primary reference and secondary reference interfaces is to provide a field-dependent complex effective reflectivity that varies at least in phase over the field of view of the system. In general, the effective reflectivity is structured to facilitate determining an overall or low-spatial frequency phase offset for the interference image.

The operating principle of a compound reference is described in connection with FIGS. 19-31.

Figure 19:
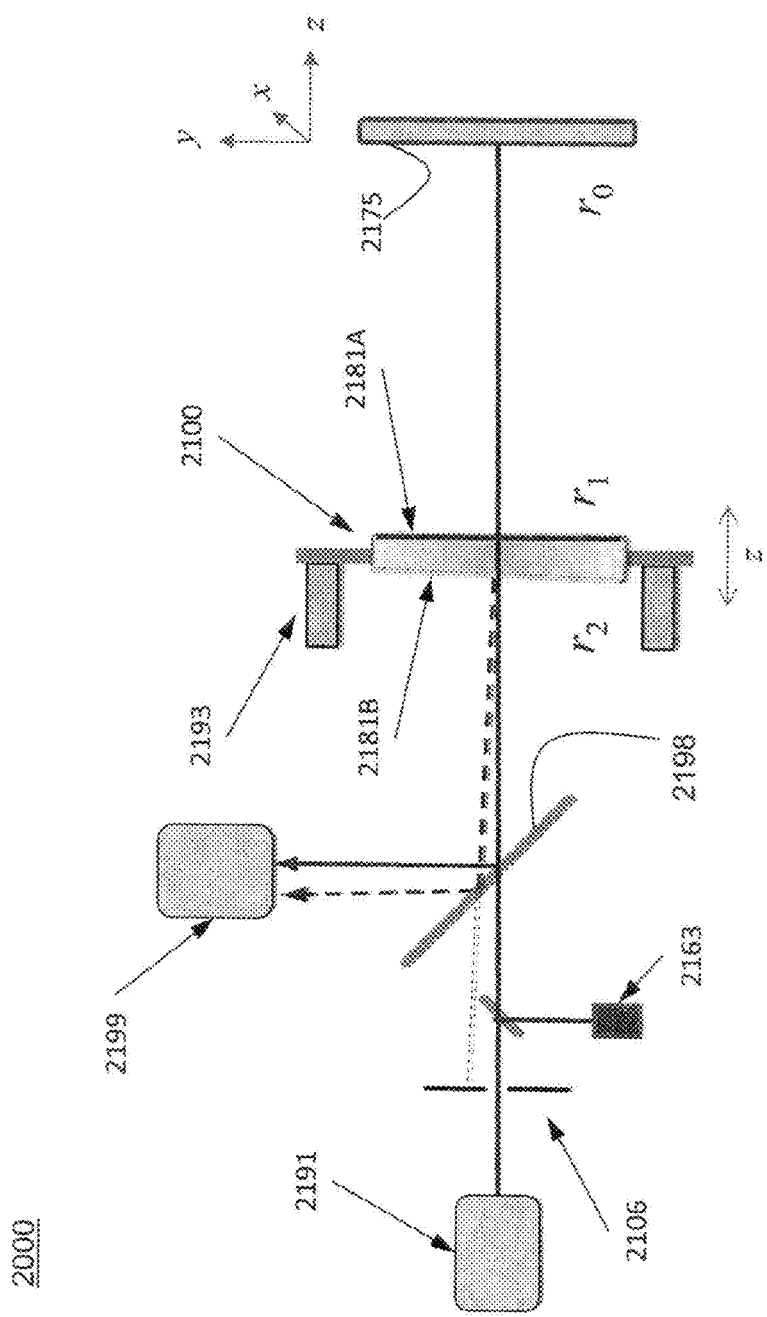
FIG. 19 is a schematic diagram of an embodiment of an interferometry system with a compound reference.

FIG. 19 shows a simplified diagram of an embodiment of a laser Fizeau interferometry system 2000 including a light source 2163, a beam splitter 2198, an interferometric cavity formed by a test object 2175 and a compound reference 2100, which has a primary reference surface 2181A with a reflectivity $r_1$ and a secondary reference surface 2181B with a reflectivity $r_2$. Compound reference 2100 is displaceable in Z-direction with an actuator 2193 (also referred to as a phase shifter) to perform an interferometric scan. Interferometry system 2000 includes further a primary camera 2191 and an aperture 2106, and a secondary camera 2199 (also referred to as a monitor camera). FIG. 19 does not show additional optical elements such as lenses or other features of an imaging interferometry system some of which are explained, for example, in connection with FIG. 28.

Secondary reference surface 2181B is oriented so that light reflected therefrom is blocked from primary camera 2191 but is incident on secondary camera 2199. Monitor camera 2199 and compound reference 2100 work together to determine a characteristic of the interferometer cavity such as the instantaneous average optical path length change (also referred to as piston) with respect to a starting position of a scan movement initiated with actuator 2193.

Monitor camera 2199 views an interference pattern created by primary reference surface 2181A, secondary reference surface 2181B of compound reference 2100, and test object 2175, while primary camera 2191 views only the two-surface interference of primary reference surface 2181A and test object 2175. The information about the interferometer cavity gathered by monitor camera 2199 facilitates, for example, generation of the object 3D surface height by providing information about the overall optical path to test object 2175 even in the presence of vibration or air turbulence.

Without wishing to be bound by theory, interference signals are generated using system 2000 as follows. It is assumed that in FIG. 19, the surface of test object 2175 has a complex reflectivity $r_0$, primary reference surface 2181A has reflectivity $r_1$, and secondary reference surface 2181B has reflectivity $r_2$. All of these reflectivities can have a dependence on the lateral coordinates x, y. Light originating from light source 2163 partially reflects from both the primary and secondary reference surfaces 2181A and 2181B, as well as from the surface of test object 2175. However, primary camera 2191 only detects light reflected from primary reference surface 2181A and test object 2175, because secondary reference surface 2181B is tilted in such a way that its reflection is blocked by aperture 2106. Monitor camera 2199, on the other hand, does not have an aperture and therefore sees all three reflections.

The interference detected with primary camera 2191 can be described as $$I = R_0 + R_1 + 2\sqrt{R_0 R_1} \cos(\theta - \phi) \qquad (37)$$

where the intensity reflectivities are $$R_0 = |r_0|^2 \qquad (38)$$

$$R_1 = |r_1|^2 \qquad (39)$$

and the phase θ is proportional to the object surface height h $$h = \frac{\lambda}{4\pi}\theta \quad (40)$$

$$\theta = \arg(r_0) \quad (41)$$

and the phase profile offset related to the reference is $$\varphi = \arg(r_1) \quad (42)$$

For monitor camera 2199, the interference can be described as $$I = P + R_0 + 2\sqrt{R_0 P}\cos(\theta - \theta) \quad (43)$$

where $$P = |\rho_1|^2 \quad (44)$$

$$\theta = \arg(\rho) \quad (45)$$

given the effective compound reference reflectivity $$\rho = r_1 + r_2. \quad (46)$$

Figure 20:
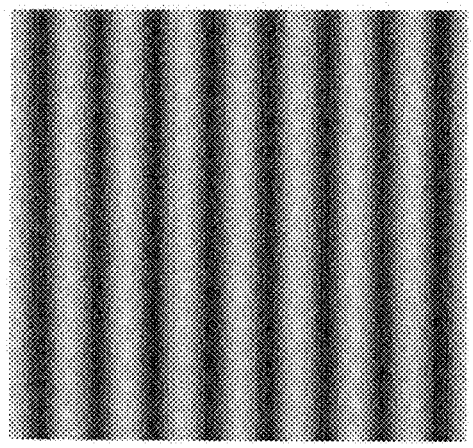
FIG. 20 is a simulated intensity reflectivity image based on a compound reference only.

As an example, FIG. 20 illustrates the compound intensity reflectivity profile P calculated by simulation over a grid of 100×100 pixels, for the case of no test object 2175 being present and a relative tilt between primary reference surface 2181A and secondary reference surface 2181B that accumulates to two wavelengths of optical path difference, a primary reflectivity $R_1$ of 4% and a secondary reflectivity $R_2$ of 0.4% over the full field-of-view (FOV).

Figure 21A:
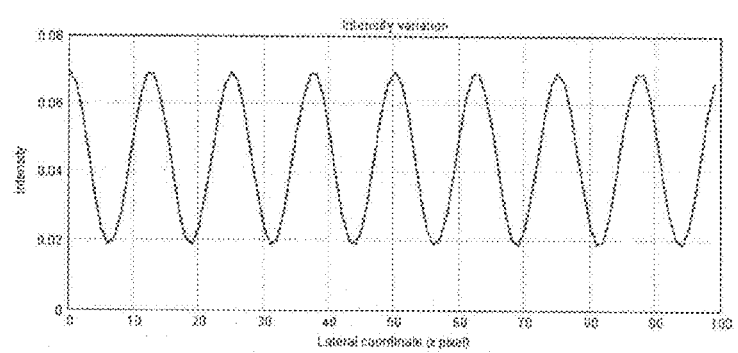
FIG. 21A shows a plot of the intensity reflectivity across the image of FIG. 20.
Figure 21B:
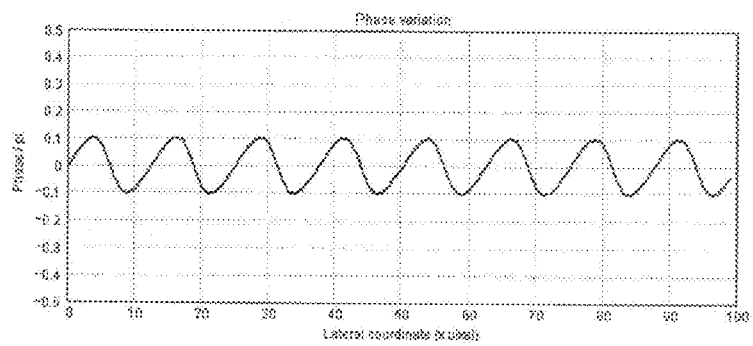
FIG. 21B shows a plot of the phase variation across the image of FIG. 20.

FIG. 21A shows a cross section of FIG. 20 in the x (i.e., horizontal) direction of the image, showing more quantitatively the intensity profile P resulting from the combination of the two reference surfaces (Eq. (44)). FIG. 21B shows how the complex phase θ of compound reference 2100 varies over the same lateral cross section as the intensity profile of FIG. 21A.

Figure 22:
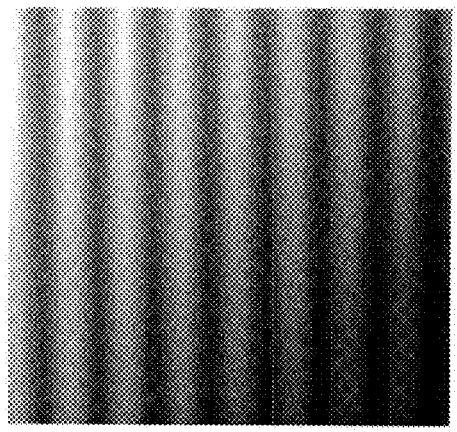
FIG. 22 is a simulated intensity reflectivity image based on a compound reference and a test object detected with a monitor camera.

Introducing test object 2175, FIG. 22 shows a monitor interference pattern I as viewed by monitor camera 2199 for the case of test object 2175 having a reflectivity of $R_0$=2% being introduced and being slightly tilted with respect to primary reference surface 2181A along the diagonal from upper left to lower right of monitor interference pattern I. The intensity variations are primarily related to compound reference 2100, and are not visible with primary camera 2191.

Figure 24A:
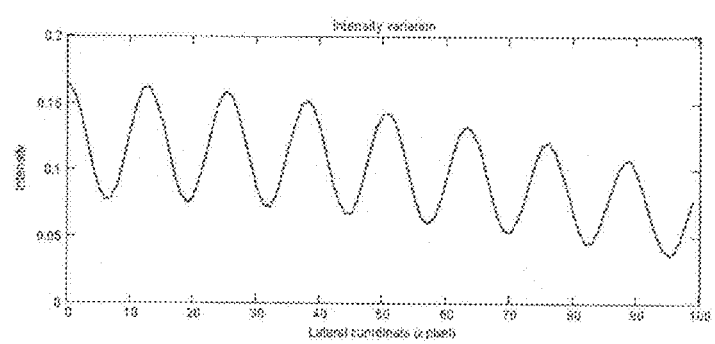
FIG. 24A shows a plot of the intensity reflectivity across the image of FIG. 22.
Figure 23:
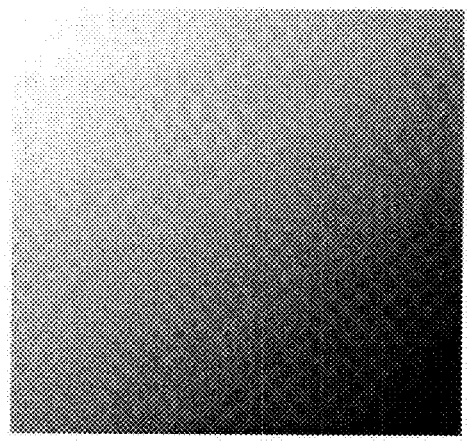
FIG. 23 is a simulated intensity reflectivity image based on a compound reference and a test object detected with a primary camera.

A simulated interference image detected with primary camera 2191 is shown in FIG. 23. The difference between the interference detected with primary camera 2191 and the interference detected with monitor camera 2199 is also evident in the cross-sectional profiles shown in FIGS. 24A, 24B, 25A, 25B. Specifically, FIG. 24A shows the interference variation on monitor camera 2199 for the compound reference as in FIG. 19 with slightly tilted test object 2175 of a 2% reflectivity and FIG. 24B shows the corresponding phase variation as viewed by monitor camera 2199.

Figure 24B:
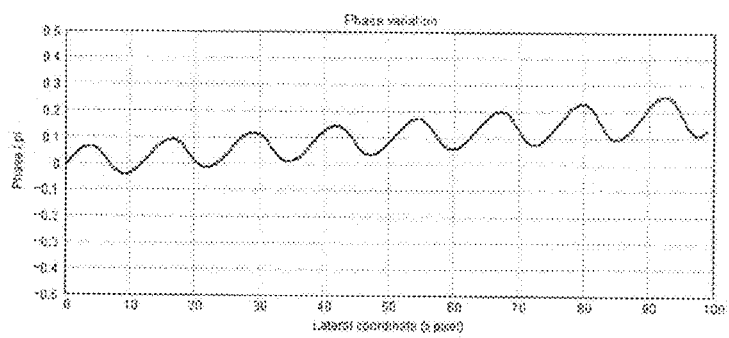
FIG. 24B shows a plot of the phase variation across the image of FIG. 22.
Figure 25A:
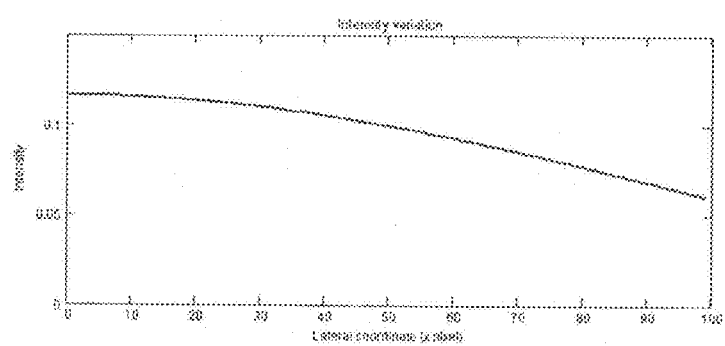
FIG. 25A shows a plot of the intensity reflectivity across the image of FIG. 23.

For the same parameters, FIG. 25A shows the interference variation on primary camera 2191 for the compound reference and slightly tilted test object 2175 and FIG. 24B shows the corresponding phase variation as viewed by primary camera 2191.

During operation, phase shifter 2193 mechanically displaces compound reference 2100 with respect to test object 2175. This results in a sequence of phase shifts for the signals as viewed by monitor camera 2199 and by primary camera 2191. The phase shifts are identical for the two cameras, even though the interference signals may be very different, as illustrated in the figures. Therefore, a determination of the phase shifts as viewed by monitor camera 2199 can be useful in the correct interpretation of the phase shifts in the data acquired by primary camera 2191.

Several exemplary data processing techniques for determining phase shifts from monochromatic interference data acquired over time are described above and show that a range of starting phase values improves the determination of the instantaneous overall optical path length of the interferometer cavity over all vibrational frequencies.

Figure 25B:
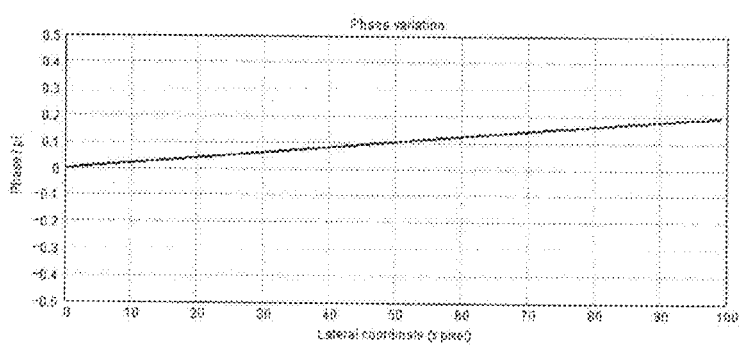
FIG. 25B shows a plot of the phase variation across the image of FIG. 23.

Comparing FIGS. 24B and 25B shows that compound reference 2100 has variations in phase across the FOV that are independent of the structure of test object 2175, which is a result of employing compound reference 2100 together with monitor camera 2199.

Figure 26:
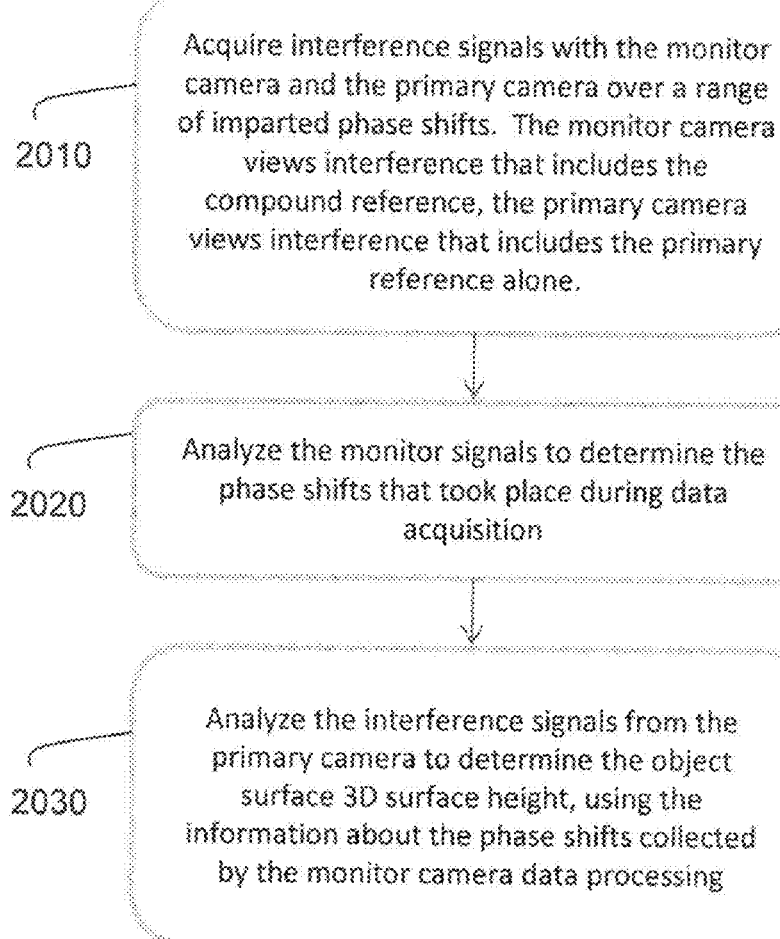
FIG. 26 is a flowchart illustrating data processing for an interference system with a compound surface.

Referring to the flowchart shown in FIG. 26, operating an interferometry system (e.g. interferometry system 2000) based on compound reference 2100 can include a data acquisition step of monitor data and interferometric data of test object 2175, data processing of the monitor data, and data processing of the interferometric data using the result of the data processing of the monitor data.

Specifically, one acquires monitor interference signals with a monitor camera and interference signals with a primary camera over a range of imparted phase shifts (step 2010). The monitor camera views interference patterns that include contributions from both the primary and the secondary reference interfaces, while the primary camera views interference patterns that include contributions from the primary reference alone.

Then, one analyzes the monitor interference signals to determine the phase shifts that took place during data acquisition (step 2020).

Using the information about the phase shifts determined from the monitor interference signals, one then analyzes the interference signals detected with the primary camera and determines, for example, the 3D surface height of the surface of the test object (step 2030).

The data processing outlined in FIG. 26 illustrates an example approach for using data acquired with a compound reference introduced in an interferometer. However, other types of data processing may be employed to determine object surface characteristics using the compound reference. For example, the intensity pattern evident in FIG. 20, which includes a dense pattern of fringes, may be analyzed using spatial methods that interpret interference fringe locations. Additional examples are disclosed, for example, in M. Kujawinska, Spatial phase measurement methods, in: Interferogram analysis, D. W. Robinson and G. T. Reid, Eds, (Bristol and Philadelphia, Inst. of Physics Publishing, 1993) pp. 145-166, the contents of which are incorporated herein by reference.

While in FIG. 19 a single optical element is used to provide the first and second reference surfaces, other configurations are also possible. For example, in some embodiments, the first and second reference interfaces that are part of different optical elements but where the optical elements are mechanically fixed with respect to each other.

Figure 27:
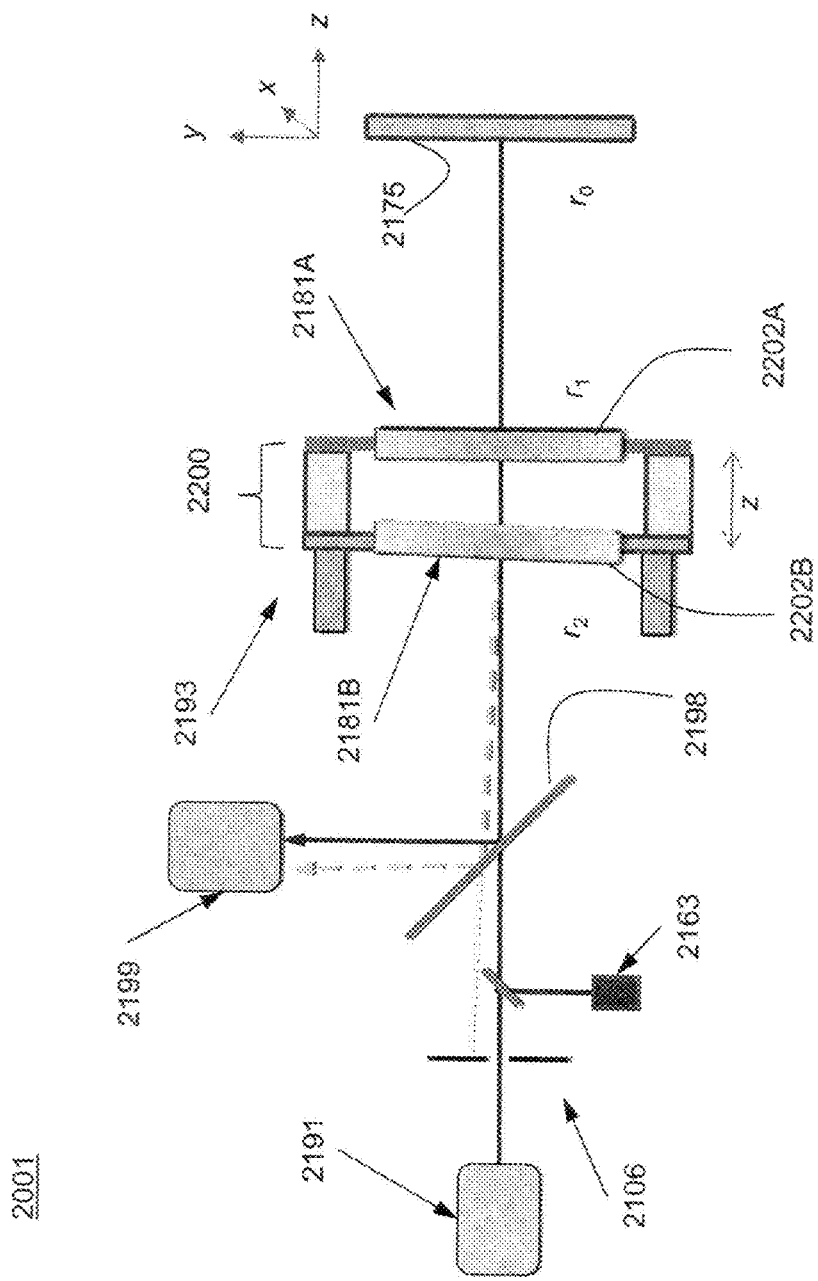
FIG. 27 is a schematic diagram of an embodiment of an interferometry system with a compound reference.

For example, FIG. 27 shows a interferometry system 2001 that includes many of the elements as discussed in connection with FIG. 19. However, instead of compound reference 2100, a compound reference assembly 2200 is used in which the primary and secondary reference surfaces are part of separate optical elements. Specifically, compound reference assembly 2200 includes a first optical element 2202A and a second optical element 2202B each mechanically fixed with respect to each other by virtue of being mounted to a common mounting flange 2204.

Figure 28:
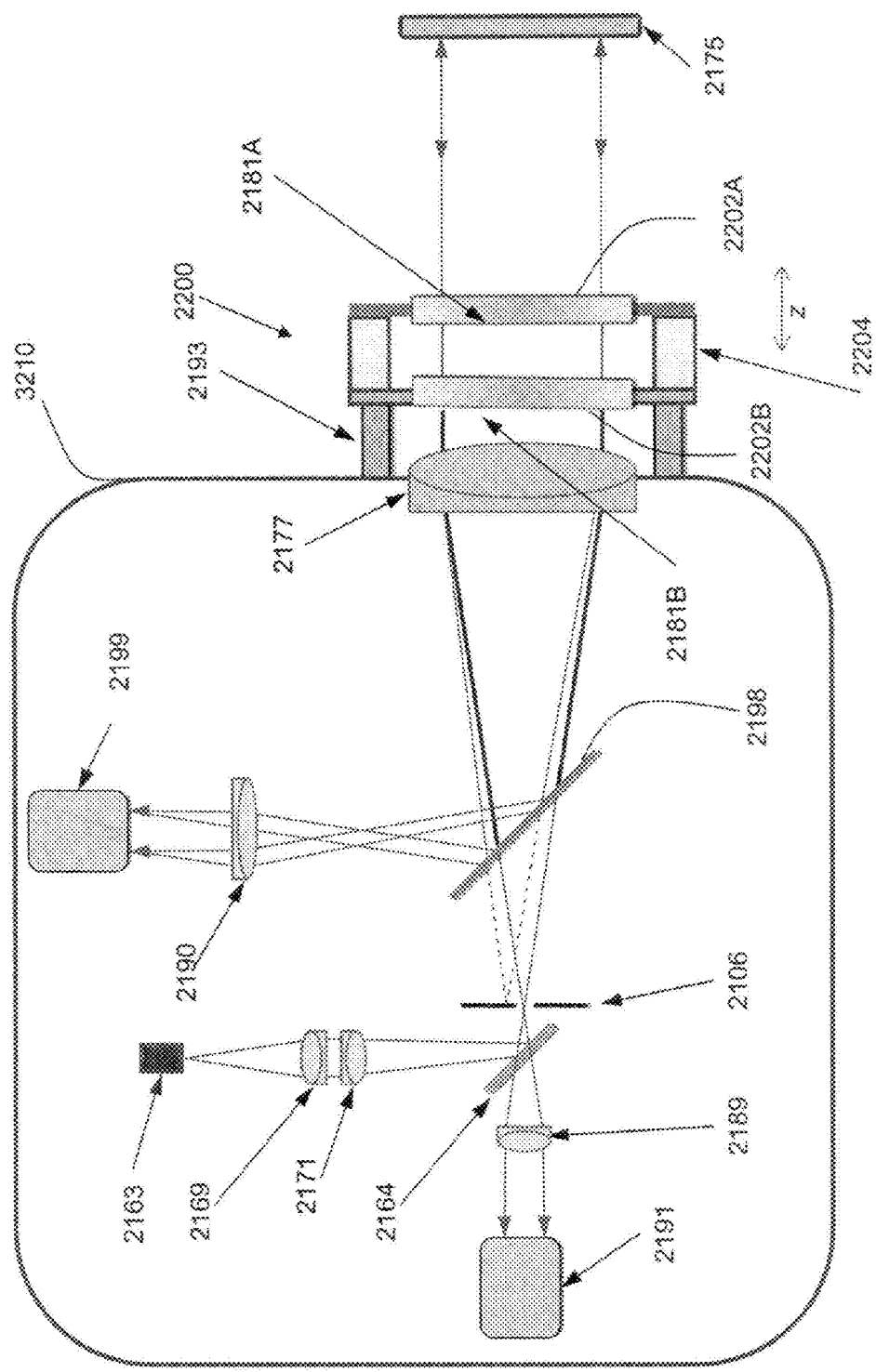
FIG. 28 is a schematic diagram of an embodiment of the interferometry system of FIG. 8 including beam guiding optics.

Referring to FIG. 28, in some embodiments, interferometry system 2001 can include a light source and detection unit 3210 that includes various optical beam guiding elements. For example, relay optics 2169 and 2171 direct light from light source 2163 to beam splitter 2164, which then passes aperture 2106 and is collimated by collimator optics 2177. Returning from the interferometric cavity, light is partly imaged with an imaging lens 2189 onto primary detector 2191. Light is also picked up with beam splitter 2198 to be directed to monitor camera 2199 onto which it is imaged by a lens 2190.

While interferometry system 2001 is configured to investigate planar test objects, other configurations are also possible.

Figure 29:
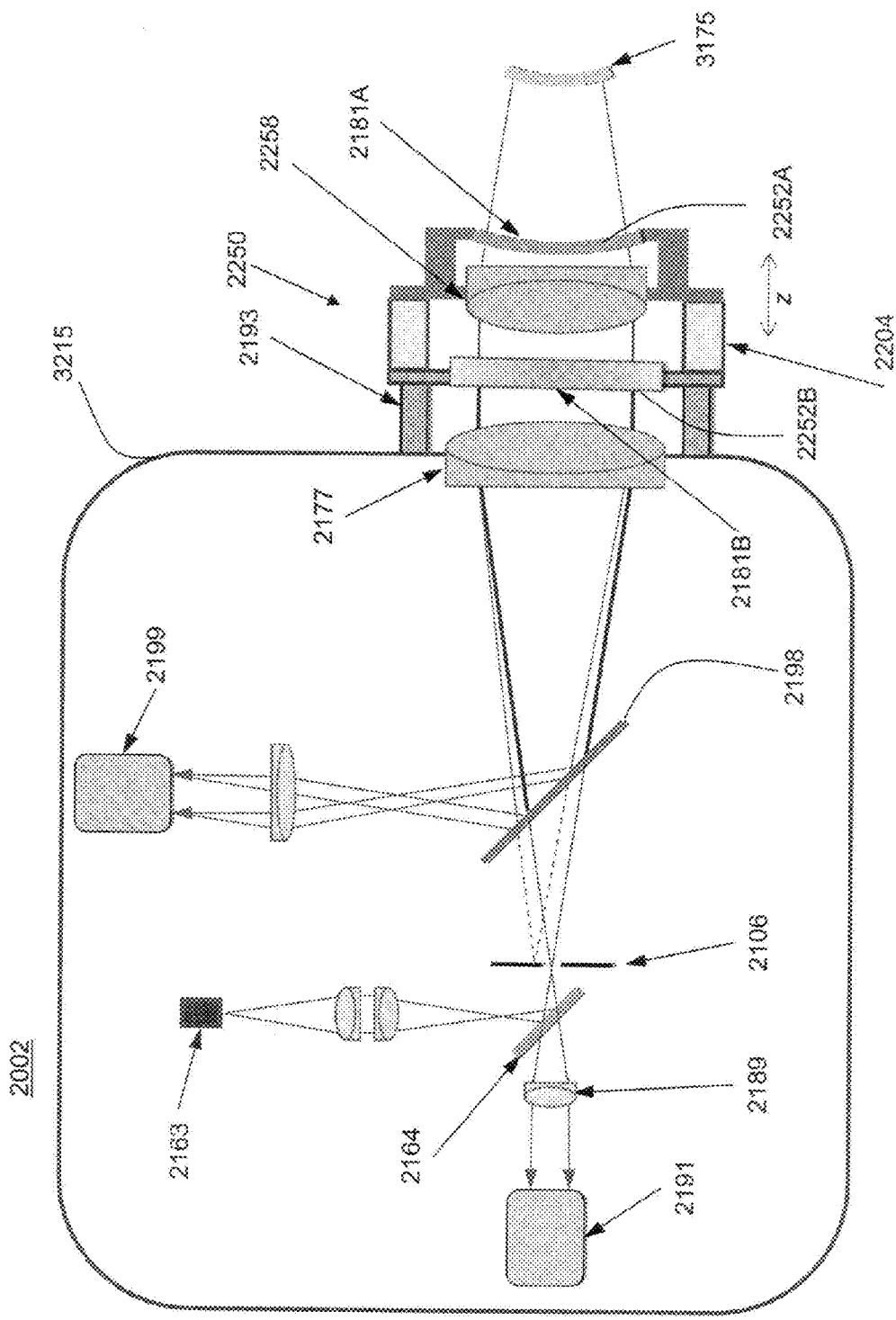
FIG. 29 is a schematic diagram of an embodiment of an interferometry system with a compound reference.

For example, FIG. 29 shows an interferometry system 2002 that includes a light source and detection unit 3215 and a compound reference 2250. Light source and detection unit 3215 is similar to light source and detection unit 3210. However, compound reference 2250 differs from compound reference 2200 in that it is configured to form a spherical, rather than planar, wavefront, to illuminate a curved test object 3175. Specifically, compound reference 2250 includes a first optical element 2252A, a lens 2258, and a second optical element 2252B. Lens 2258 and second optical element 2252B are mounted together in a single unit, which is mechanically fixed to second optical element 2252B via mounting flange 2204. First optical element 2252A provides a curved first reference surface 2181A and second optical element provides a planar second reference surface 2181B, thereby providing a field-dependent complex effective reflectivity of the interferometric cavity that varies in phase over the FOV of interferometry system 2002.

While in some embodiments such as the one shown in, e.g., FIGS. 20 and 27 the monitor image is separated from the primary image by geometry (e.g., by blocking light from the secondary reference interface from the primary camera), other configurations are also possible. For example, in certain embodiments the monitor image can be separated from the primary image by wavelength.

Figure 30:
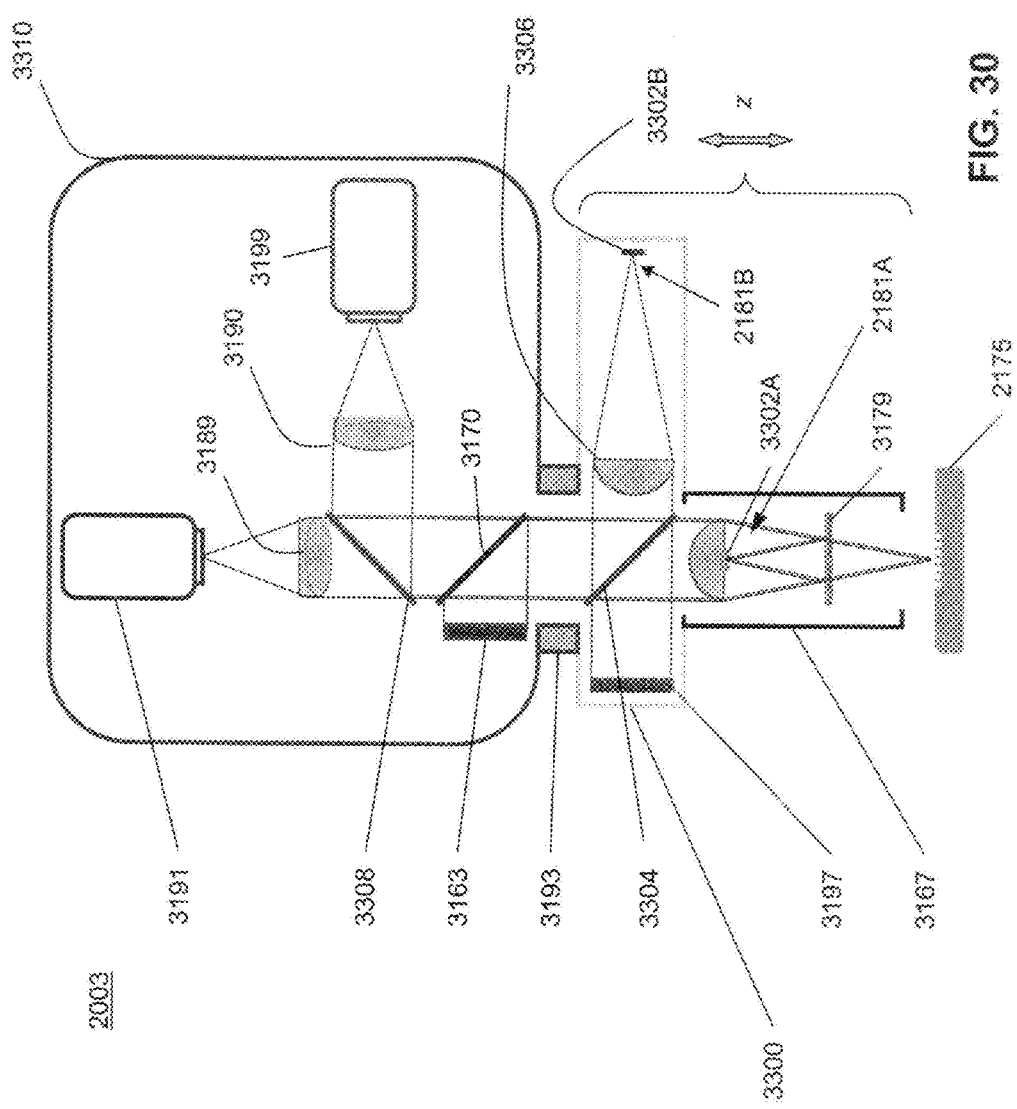
FIG. 30 is a schematic diagram of an embodiment of an interferometry system with a compound reference.
Figure 31:
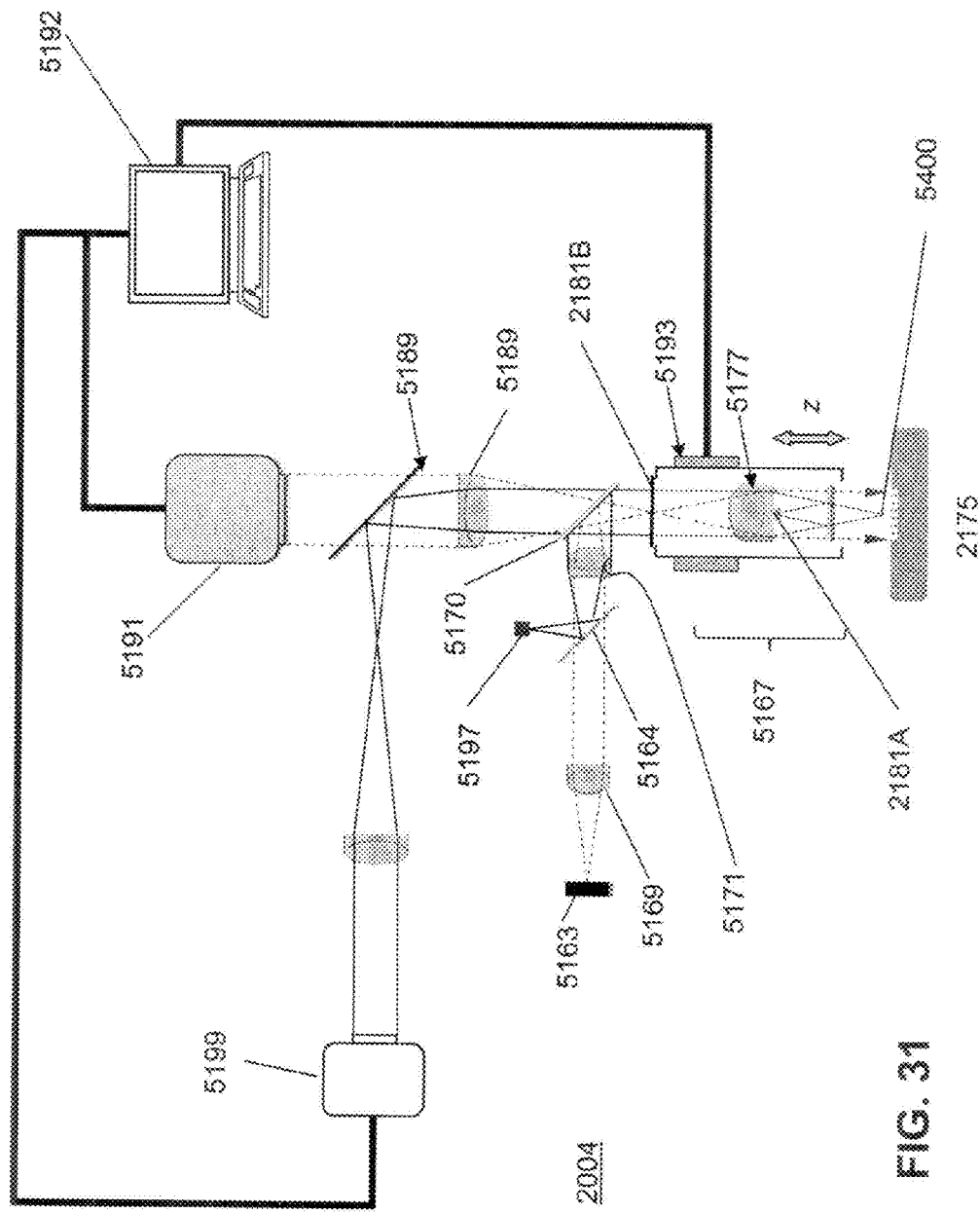
FIG. 31 is a schematic diagram of an embodiment of an interferometry system with a compound reference.
Figure 32:
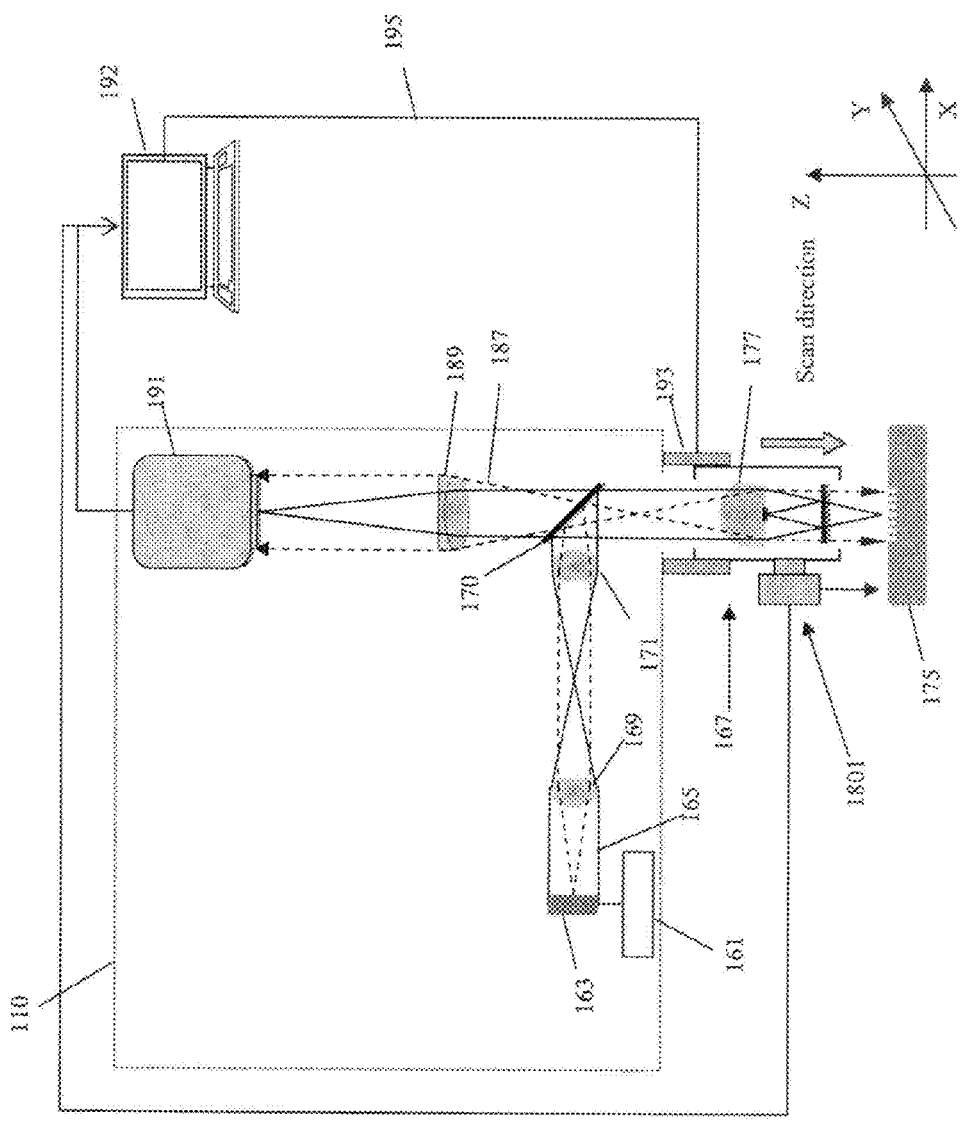
FIG. 32 is a schematic diagram of an embodiment of a low coherence interferometry system including an interference microscope and a laser displacement interferometer.

As an example, FIG. 30 illustrates an interferometry system 2003 configured to use a monitor image (e.g., monochrome monitor image) to monitor the displacement of a test object relative to the interference microscope while scanning the OPD of the interference microscope.

Specifically, interferometry system 2003 includes an interferometric platform 3310, a monitor assembly 3300, and an interference objective 3167. Interferometric platform 3310 includes a broadband source 3163, a beam splitter 3170, and an imaging lens 3189 for imaging an interference pattern onto a white light camera 3191. In addition, interferometric platform 3310 includes a pickoff mirror 3308, a monitor imaging lens 3190, and a monitor camera 3199.

Interferometric platform 3310 is attached to monitor assembly 3300 and interference objective 3167 via a mechanical scanner 3193 which displaces the subsystem of monitor assembly 3300 and interference objective 3167 with respect to test object 2175.

Monitor assembly 3300 includes a secondary light source 3197 (e.g., a narrowband source, such as a monochrome source), a partial mirror 3304 (e.g., a 50/50 mirror) at monitor wavelength(s) only, a reference lens 3306, and a secondary reference 3302B with secondary reference surface 2181B.

Interference objective 3167 includes an objective lens, an interferometer beam splitter 3179, and a primary reference mirror 3302A providing primary reference surface 2181A.

Monitoring the displacement of test object 2175 is done via a monitor image, relying on separate secondary light source 3197. The monitor image is formed via 3-surface interference including a fixed complex reflectivity for effective reference surface of primary reference surface 2181A and secondary reference 2181B. The monitor image is used for determining phase shift corrections. In some embodiments, the quality of the monitor image can be less than the SWLI interference image.

In general, the phase modulation history can be evaluated at each pixel of the monitor image independently, for example, by cosine inversion. To correct the SWLI data acquisition, the knowledge of phase shifts can then be used to interpret the white SWLI image correctly. A benefit this monitoring approach is that a conventional interference objective can be used that does not (or only to a small extent) need to be modified. Accordingly, such a configuration of a monitor mechanism can be configured to be compatible with standard objective designs.

While the interferometry systems described in connection with FIGS. 19 to 30 are configured for SWLI, alternative operation modes are also possible. For example, referring to FIG. 31, interferometry system 2004 is configured for PUPS imaging. Here, the monitor image is separated from the PUPS image by wavelength similar to interferometry system 2003. The broadband and narrowband light are generated by a common light source unit that couples light into an interferometric objective 5167 with a lens 5177 via a common beam splitter 5170. The light source unit includes a broadband light source 5163, lenses 5169 and 5171, a monitor light source 5197, and a beam splitter 5164. The illumination is focused to a single point 5400 on test object 2175. Interferometric objective 5167 can be scanned with a translation stage 5193.

In interferometry systems 2004, optical elements, e.g., a tube lens 5198 and a beam splitter 5189, are arranged such that both a primary camera 5191 and a monitor camera 5199 are located at a surface conjugate to a pupil of test objective 5167. A secondary reference with secondary reference surface 2181B is positioned such that secondary reference surface 2181B is tilted with respect to primary reference surface 2181A. Secondary reference surface 2181B is partially reflective for the monitor wavelength(s), thereby introducing a range of phase offsets for the resulting three-surface interference.

Image information at primary and monitor cameras 5191 and 5199 are provided to a control computer 5192 with a processor. Control computer 5192 also interacts with translation stage 5193.

While certain embodiments that include compound references have been described, in general, other constructions are also possible. For example, while the described embodiments featuring a compound reference all include a secondary camera for capturing the monitor information, in some embodiments a single camera can be used. For example, the secondary and primary cameras may combined into a single camera having separate FOV's for the primary and monitor images.

Moreover, one can use time-multiplexed acquisitions, or simply a single image that is processed to determine simultaneously the overall interference phase offset and object surface characteristics in separate or simultaneous data processing steps.

The compound reference may be constructed from two or more reference reflections of any desired shape, such as flat, spherical, aspheric or other. Further, the compound reference may act over the entire field of view, or only a portion of the field of view.

Displacement Measuring Interferometers

In some embodiments, information about the scan errors is determined using a displacement measuring interferometer (DMI) that is separate (e.g., does not utilize common optical components) from the interference microscope and configured to monitor the displacement of the test object relative to the interference microscope while scanning the OPD of the interference microscope. An example of such a system is shown in FIG. 19, which shows interference microscope 110 modified so that it no longer includes secondary source 197 and secondary detector 199. Rather, a displacement measuring interferometer 1801 that utilizes, for example, a laser source, is mounted to Mirau objective 167 and configured to direct a measurement beam to reflect from test object 175. DMI 1801 is connected to computer 192 and during operation sends an interference signal to computer 192. Computer 192 monitors, based on the interference signal, the relative displacement between Mirau objective 167 and test object 175 and, in coordination with the operation of interference microscope 110, provides information about the scan errors associated with the measurements made using interference microscope 110.

In general, a variety of DMI's can be used. Examples of commercially available DMI's include, for example, the ZMI Series—Displacement Measuring Interferometers, available from Zygo Corporation (Middlefield, Conn.). Further examples of DMI's are also disclosed in U.S. patent application Ser. No. 11/656,597, entitled "INTERFEROMETER SYSTEM FOR MONITORING AN OBJECT," filed on Jan. 23, 2007, the entire contents of which is incorporated herein by reference.

In some embodiments, the light source used by DMI 1801 is included in the assembly mounted to Mirau objective 167. In certain embodiments, the light source can be housed remote from the objective and light for the DMI can be directed to the DMI via, e.g., a fiber waveguide. Examples of such systems are disclosed, for example, in U.S. patent application Ser. No. 11/656,597. Such arrangements can be advantageous in that the actual assembly mounted to the objective can be small and relatively unobtrusive, while the processing electronics and light source are remote from the objective.

In certain embodiments, multiple DMI's can be used to monitor the displacement of a test object during a scan. For example, U.S. patent application Ser. No. 11/656,597 discloses systems that include multiple detection channels, each using a DMI for measuring the displacement (e.g., relative or absolute) at a different location.

Fiber-Based Sensor Systems

Various examples of implementations of a fiber based DMI systems (also referred to as "sensor systems") for scan error monitoring are described in connection with FIGS. 33-48B.

In some embodiments, implementing a sensor system into an interferometry system can further allow determining the position of a monitor surface, e.g., a surface of the test object or the reference object. This can be used, for example, to determine a relative distance of the test object to an internal reference plane within an autofocusing mechanism of the interferometry systems.

Figure 33:
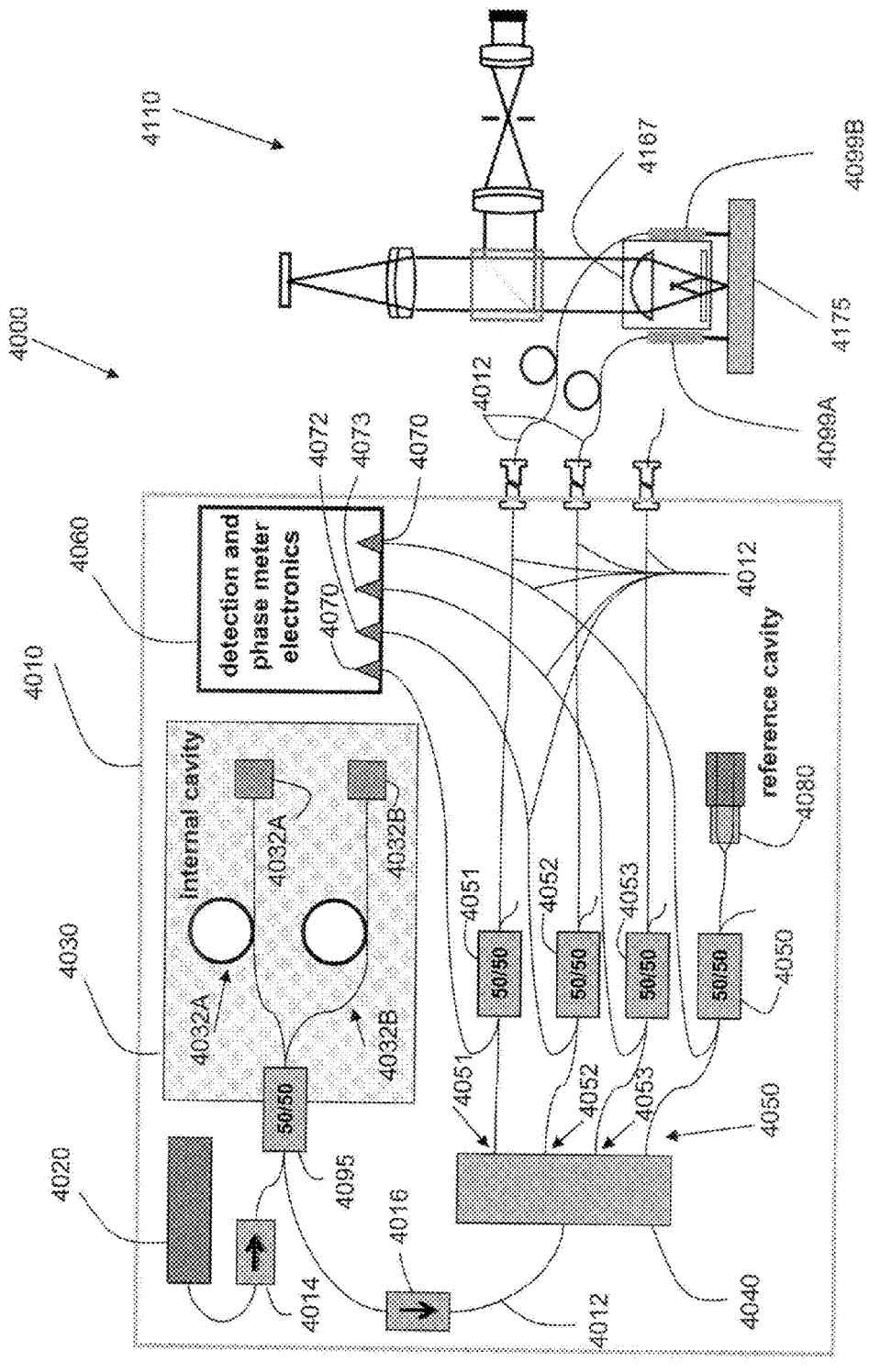
FIG. 33 is a schematic diagram of an embodiment of a combined apparatus comprising a sensor system and an interferometry system.

FIG. 33 shows an example of a sensor system 4000 including a subsystem 4010 and sensors 4099A and 4099B attached to, as an example, a Mirau objective 4167 of an interferometry system 4110.

Subsystem 4010 includes a broadband source 4020, a widely-tunable internal cavity 4030 illuminated with light from source 4020, a light distribution module 4040 receiving light from internal cavity 4030 and distributing light among various channels 4050 to 4053, and detection and phase meter electronics 4060 with an individual detection module 4070 to 4073 (e.g., photodetectors) for each of the channels 4050 to 4053, respectively.

More specifically, broadband source 4020 can be, e.g., a surface-emitting LED that emits at a central wavelength far removed from wavelengths used in the interferometry system 4110. For example, source 4020 can have a power of about 9 mW, a central wavelength of 1550 nm, a spectral width at full width half maximum of 30 nm, and a coherence length of about 50 μm.

The light from source 4020 is guided using fiber cables 4012 and isolators 4014 and 4016 to avoid system distortions due to feedback from internal cavity 4030 to source 4020 and light from light distribution module 4040 to internal cavity 4030, respectively. Isolators 4014 and 4016 can, for example, provide a 30 dB suppression of returning light.

Within the sensor system, 50/50 fiber couplers can be employed at several positions to separate, distribute, and/or combine incoming and/or outgoing light. For example, internal cavity 4030 includes a 50/50 fiber coupler 4095 connected on one side with source 4020 and light distribution module 4040. On the other side, coupler 4095 is connected with two legs of internal cavity 4030 having a OPD that can be varied. Each leg includes a fiber stretching module (FSM) 4032A, 4032B of, for example, 10 m optical fiber, each FSM set to operate in a push-pull mode to produce a tunable OPD. Each leg includes further a Faraday mirror 4034B, 4034B, respectively, which can reduce contrast fading due to polarization changes in the fiber paths.

The OPD for the light propagating along the two legs of the internal cavity is controllable, for example, by extending or shortening the optical path using FSMs 4032A and 4032B. In some embodiments, the OPD can be, for example, varied over a range of at least 3 mm, for example, over a range of 10 mm. When leaving internal cavity 4030, the light from the two legs recombines in coupler 4095.

As another example, 50/50 fiber couplers are used to split incoming and reflected light within the various channels 405-5053 such that the light returning from the sensors is directed to phase meter electronics 4060 after passing through the couplers. In particular, coupler 4090 provides reference cavity 4080 with light from channel 4050 of light distribution module 4040 and directs light from reference cavity 4080 to detection module 4070. Similarly, 50/50 fiber coupler 4091 provides sensor 4099A with light from channel 4051 of light distribution module 4040 and directs light from sensor 4099B to detection module 4071. In the same manner, couplers 4092 and 4093 interact with light from their associated channels and sensors.

With respect to the motion measurement, the sensors can generally be attached to physical objects to monitor alone or in combination the appropriate degree or degrees of freedom, e.g., with respect to a reference position. For example, channels 4051 and 4052 are connected to sensors 4099A and 4099B, respectively, which measure the distance between test object 4175 and sensors 4099A and 4099B and, therefore, Mirau objective 4167. Channels 4051 and 4052 are also referred to as measurement channels. An example of a sensor configuration is described in connection with FIG. 34 (see below).

To provide a reference signal, a reference cavity 4080 is connected with channel 4050. As discussed in connection with FIG. 35 (see below), reference cavity 4080 has a configuration similar to sensors 4099A and 4099B. Channel 4050 is also referred to as a reference channel.

Each of the sensors 4099A and 4099B is configured to observe a sensor cavity that together with internal cavity 4030 forms an independent coupled-cavity interferometer. The sensor cavity is formed, for example, between a reflecting surface of the sensor and a reflecting surface of an observed part. In the configuration of FIG. 33, the reflecting surface of the sensors is the last face of the sensors end and the reflecting surface of the observed part is the surface of the test object. In such a configuration, the OPD of the sensor cavity changes proportionally to the scan motion along the axis of the Mirau objective 4167.

Figure 34:
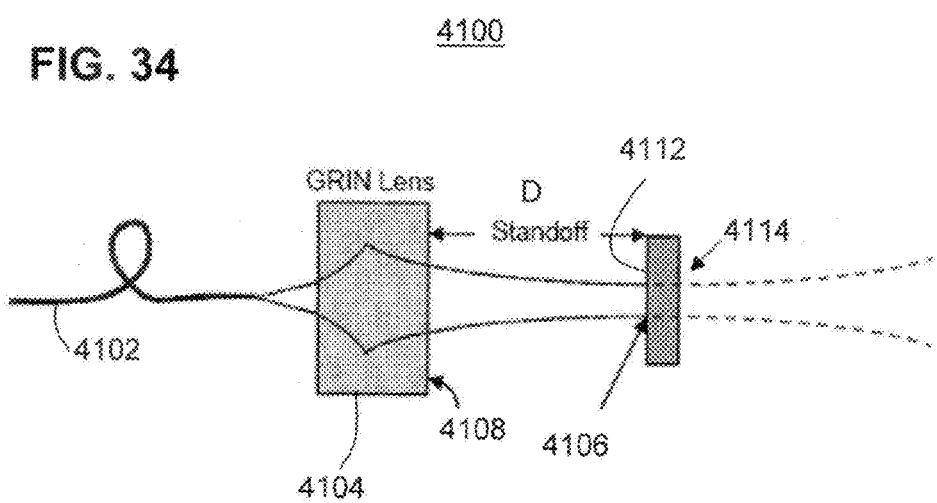
FIG. 34 is a schematic diagram of an embodiment of a sensor.

An example configuration of a sensor 4100 is illustrated in FIG. 34. A thermally expanded core (TEC) fiber 4102 is attached to a graded index (GRIN) lens 4104. Sensor 4100 is designed to provide a beam of specific width at a beam waist position 4106. To facilitate the placement of the beam waist location during sensor manufacture, a gap between GRIN lens 4104 and TEC fiber 4102 can be incorporated that is adjusted during manufacture to set the beam waist position 4106 relative to last face 4108 of sensor 4100. During operation, sensor 4100 forms a sensor cavity with a target surface 4112 of a target 4114. Target 4114 can be, for example, test object 4175 or an optical element, or a portion of a mount of one of those elements.

In the configuration of sensor 4000, last face 4108 of GRIN lens 4104 can be used as a reference surface if required. Then, last face 4108 and target surface 4112 form the sensor cavity. Alternatively, last face 4108 can be anti-reflection (AR) coated to reduce surface reflection. Depending on the application, sensor 4100 may or may not use last face as a reference surface. Sensor 4100 is of simple configuration and can be reduced in size and cost.

The desired surfaces contributing to the sensor cavity can be selected by adjusting the geometry of the coupled-cavity interferometer because the restricted coherence length of the illuminating light can exclude interference from unwanted surfaces.

Figure 35:
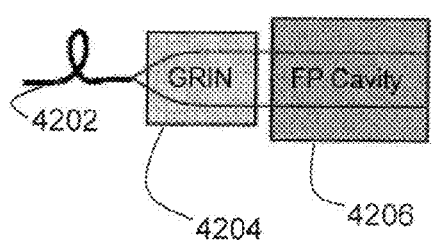
FIG. 35 is a diagram of a reference cavity.

An example configuration of a reference cavity 4200 is shown in FIG. 35. Reference cavity 4200 includes a fiber cable 4202 to receive light from distributor 4040. A GRIN lens 4204 collimates the beam into a fixed OPD Fabry Perot (FP) cavity. In some embodiments, the reference OPD is adjusted to be, for example, twice the standoff distance D, which as indicated in FIG. 34, is equal to the distance from last face 4108 to the test surface for the case of the best focus of the objective.

Referring again to FIG. 33, during operation of sensor system 4000, light of the appropriate coherence and intensity is supplied to internal cavity 4030 providing a controllable OPD between the two legs. After passing through internal cavity 4030, fiber distribution system 4040 splits light amongst the various measurement channels 4051-4052 and reference channel 4050. Isolators 4014 and 4016 assure that the illumination performance is not compromised by optical feedback. Measurement channels 4051-4052 direct light to and from sensors 4099A and 4099B, which are attached to the interferometry system 4110 in such a way as to form a sensor cavity whose OPD depends on a degree of freedom that is to be monitored by the respective sensor. The light returns within measurement channels 4050-4052 along the same illumination fibers 4012 and is directed to electronics 4060, which detect and process the signals of one or more channels to derive information about the monitored degree(s) of freedom.

Tuning the OPD of internal cavity 4030 varies the phase modulation, which is used to determine the interferometric phase(s) and OPD(s) of the sensor cavity in the measurement channel. Sensor system 4000 can employ the phase modulation for the following measurement modes: a coherence scanning mode and a motion (or phase) monitoring mode. Sensor system 4000 can be configured to rapidly switch between these modes as needed.

In the coherence scanning mode, the OPD of the sensor cavities can be determined within the tuning range of internal cavity 4030 by finding the point in the internal cavity tune, where the modulation in the respective channel is maximum. The coherence scanning mode can be used, for example, within a autofocus mechanism as described below in connection with FIGS. 38 and 39.

In the coherence scanning mode, the OPD of internal cavity 4030 is varied with a large amplitude while the phase meter electronics 4060 searches for the coherence peak (maximum interference modulation) for measurement channels 4051-4053, for example, simultaneously and in real time. The OPD of internal cavity 4030 when the channel coherence is maximum determines the OPD of the sensor cavity associated with that channel. Specifically, with proper setting of the reference OPD, the distance between peak interference positions of reference channel 4050 and of a measurement channel 4051 or 4052 shows the relative position of, e.g., test object 4175 from the best focus position.

The motion monitoring mode can be used, for example, for vibration monitoring. In the motion monitoring mode, the interferometric phase of a measurement channel 4051-4053 is measured at high speed. Thus, one can monitor the OPD variation of one channel relative to any other channel, provided the measurement channels 4051-4053 are within the coherence peak of the illuminating light.

In the motion monitoring mode, the OPD of internal cavity 4030 is varied at high frequency with small amplitude in a manner that allows the interference phase of the sensor cavity or cavities to be calculated with a phase extraction algorithm at a high update rate. The rate of change of a sensor cavity is assumed to be small enough so that the interferometric phase change between adjacent samples is less than $\pi$, allowing continuous phase interpolation via standard phase-connect methods.

In the motion monitoring mode, reference channel 4050 can be used to subtract changes in the optical path within internal cavity 4030 from the measured phase corresponding to the motion of the observed test surface. For example, reference channel 4050 can accommodate a drift of internal cavity 4030 as long as the drift is slow relative the update frequency of the measured phase.

In some embodiments, the light beam emitted from the sensor propagates approximately parallel to the motion axis to reduce misalignments which can introduce an error in the measured motion proportional to the cosine of the misalignment angle. The return loss of a sensor is also dependent on the incident angle of the illuminating light on the test surface an, in particular, can increase as a function of target surface tilt. In general, the tilt sensitivity of a sensor depends on the details of the sensor design and can depend, for example, on the distance between the GRIN lens and the beam waist position—known as the sensor working distance. In general, aligning the sensor emission perpendicular to the nominal surface plane of the observed part can enlarge the usable tilt phase space.

In the embodiment shown in FIG. 33, the OPD of the internal cavity 4030 when the FSMs are not energized is defined as the "nominal OPD". If the sensors are to be used for autofocusing, the OPD of a sensor cavity should be close to the nominal OPD when the objective is at best focus. This way the interference peak contrast position can be used to identify best focus.

The FSMs used to control the OPD of the internal cavity can be temperature sensitive, with an OPD temperature coefficient of, for example, about 10 ppm/C. Bringing the two FSMs in intimate thermal contact can minimize OPD variations from temperature differences. Moreover, the FSMs can be driven by PZTs that experience creep. The creep is caused by a realignment of PZT domains due to electrostatic stress under thermal agitation, which typically has a logarithmic time dependence. Finally, it can be difficult to physically match the fiber lengths of the two legs of the internal cavity during fabrication.

In view of the OPD variability, one can use one channel as a fixed reference cavity of a compensation mechanism. In some embodiments, an OPD of the reference cavity is set to be equal to the nominal OPD of the internal cavity. An example of a fixed reference cavity is shown in FIG. 35.

The reference channel can be acquired simultaneously and synchronously with the remaining measurement channels. When analyzing the signal of the monitor channels, one can subtract the reference phase from the phase measurements. Thus, to the extent that the reference cavity OPD is fixed, any OPD variation of the internal cavity can be subtracted out as long as that variation is small compared to the coherence length so that the reference signal is never lost.

The reference cavity further can be used to define the nominal OPD position, which can corresponds to the objective best focus position for autofocusing.

As an example, the operation of a microscope with a sensor system is described in connection with FIGS. 36-38. The sensor system can be, for example, a sensor system as described above in connection with FIG. 33. The operation includes an autofocus function of the sensor system and a motion (or phase) monitoring function.

Figure 36:
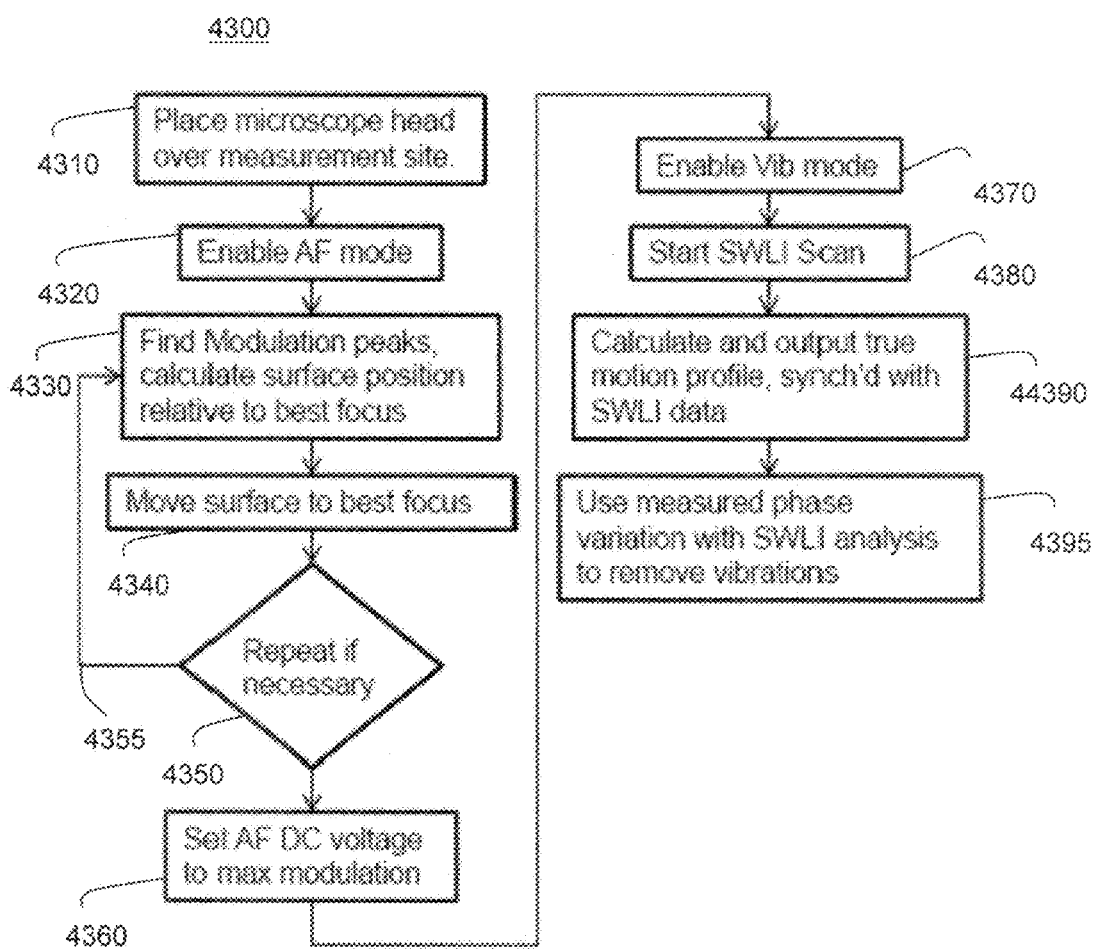
FIG. 36 is a flow chart of an operation of a combined apparatus comprising a sensor system and an interferometry system.

As indicated in the flow chart 4300 of FIG. 36, a microscope head, e.g., the objective of an interference microscope, is positioned over a measurement site at which a test object is positioned (step 4310). The test object has a test surface that is to be examined with the microscope.

Once the autofocus mode of the sensor system is enabled (step 4320) and a OPD scan is performed.

Figure 37:
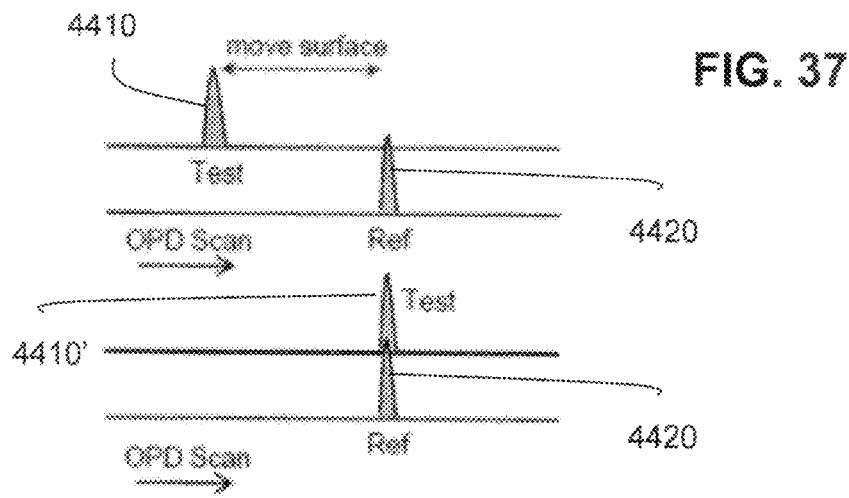
FIG. 37 is a plot illustrating an autofocus mode of a combined apparatus comprising a sensor system and an interferometry system.
Figure 38:
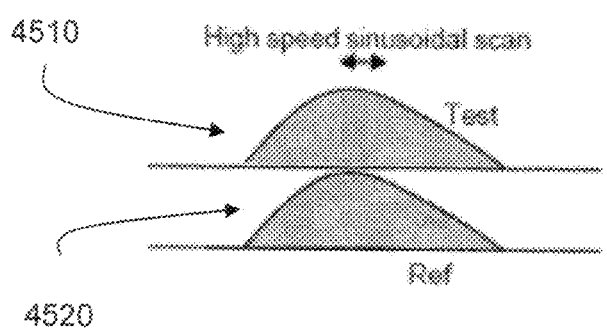
FIG. 38 is a plot illustrating a motion monitoring mode of an combined apparatus comprising a sensor system and an interferometry system.

FIG. 37 shows schematically a modulation peak 4410 of a test signal of a monitor cavity and a modulation peak 4420 of a reference signal of a reference cavity measured during an autofocus OPD scan. The measured signals are analyzed using, for example, an electronic processor that identifies the position of the modulation peaks and calculates the position of the surface of the test object relative to a best focus position (step 4330). In this example, the best focus position is indicated by the position of the modulation peak 4420 of the reference signal.

Based on the determined relative position, the microscope then moves the test surface towards the best surface position by the distance measured (step 4340). The resulting position of the test surface can be verified (step 4350) as shown schematically in FIG. 38, in which a modulation peak 4410' of the monitor cavity and the modulation peak 4420 of the reference cavity occur at about the same OPD of the OPD scan. To ensure proper positioning or for refinement, a loop 4355 over step 4330 and step 4340 can be performed.

Once the microscope has been brought into focus (when the test cavity and reference cavity coherence functions overlap). Once proper position is confirmed and the microscope has been brought into focus, one sets the autofocus DC voltage of the OPD scan to maximal modulation (step 4360). FIG. 38 shows schematically a monitor signal 4510 and a reference signal 4520 of such a high speed sinusoidal scan of the OPD in the sensor system. In some embodiments, one further clamps the FSM voltage at the point of maximum interference fringe contrast.

Then, one enables the vibration mode (step 4370), which monitors the motion of the test surface, and starts the SWLI (or PUPS) scanning measurement of the test object (step 4380) with the microscope. The synchronous measurement of the motion allows calculating and outputting the true motion profile, which is synchronized with the SWLI (PUPS) data (step 4390).

Based on the true motion, one can use the measured phase variations together with SWLI (or PUPS) analysis to remove scan error contributions (step 4395). This can be done in real time or while post-processing the SWLI (or PUPS) data.

While in the forgoing example the autofocus function and the motion monitoring function are performed sequentially, each of these functions can be applied individually and/or multiple times.

In some embodiments using autofocus mode, the OPD scan and the parameters of sensor systems are selected to provide for a working range, e.g., greater than 1 mm for a working distance, e.g., of greater 5 mm, a position resolution of, e.g., about 100 nm, a position repeatability of, e.g., about 250 nm (on structured parts), a spot size of about, e.g, about 0.5 mm diameter, and speed greater, e.g., 10 Hz.

When applying the autofocus function to a sensor system with FSMs, such as FSMs 4032A, 4032B in the interferometry system shown in FIG. 33, the FSMs can be energized, for example, with a relatively slow (e.g., ~10 Hz) large amplitude sinusoidal voltage and the test surface position can be determined from the relative delay between the test and reference coherence peaks. The total OPD sweep range depends on the length of the optical fiber in the spools of FSMs 4032A, 4032B and the maximum extension of the PZT of FSMs 4032A, 4032B. Creep and temperature sensitivity can depend directly on the fiber length, so the optimum amount of fiber to use is often a tradeoff between sweep length and acceptable sensitivity. For example, an FSM using 18 m of optical fiber provides a 6.6 mm OPD scan, a 9.5 micron/V transfer coefficient and a 254 micron/C temperature sensitivity.

In some embodiments using motion monitor mode, the OPD scan and the parameters of sensor systems are selected to provide for a motion resolution of less than 0.2 nm, a repeatability of less then 1 nm (on structured parts), a sample rate of about 200 kHz, and a update frequency greater 5 kHz.

Moreover, when applying the motion monitor function to a sensor system with FSMs such as FSMs 4032A, 4032B in the interferometry system shown in FIG. 33, the FSMs can be energized with a high frequency (e.g., ~10 kHz) waveform (at a DC clamp that provides best interference) with an amplitude that enables the calculation of the cavity interferometric phase at high rates. In some embodiments, this is done with a sawtooth or triangular modulation profile if standard linear phase shifting algorithms are used. In other embodiments, the modulation is sinusoidal and a SinPSI algorithm is employed. For example, in the sinusoidal phase shifting algorithms disclosed in U.S. Patent Application published as US-2008/0180679-A1 to P. J. De Groot entitled "SINUSOIDAL PHASE SHIFTING INTERFEROMETRY," and/or in U.S. patent application Ser. No. 12/408,121, entitled "ERROR COMPENSATION IN PHASE SHIFTING INTERFEROMETRY," filed on Mar. 20, 2009, can be used. The entire contents of both US-2008/0180679-A1 and U.S. Ser. No. 12/408, 121 are incorporated herein by reference.

The channels can be simultaneously sampled with an appropriate frequency and phase relative to this modulation so that a new phase is obtained once each cycle. The phase variation is then converted into a physical length variation by multiplying by $\lambda/4\pi$. The computational burden is small at these rates and can easily be performed in real time with a standard microprocessor for all channels simultaneously.

During an interferometric measurement (e.g., SWLI or PUPS), the cavity motion can read by the microprocessor controlling the interferometry system. The motion data can be used to either correct the scan motion of the interferometry system in real-time via a feedback mechanism, or time stamped to the interferometric data, saved and used during post processing of the interferometric data to correct for undesired scan motions, for example using the J-matrix method described herein.

In general, various types of interferometry objectives can be used in combination with a sensor system having a sensor forming a monitor cavity with a monitor surface during operation. In the following, several examples are described in which a sensor is mounted to an interferometry objective such that the monitor cavity is formed using the test object examined with the interferometry objective.

As an enlarged view, FIG. 39 shows an objective unit 4540 as indicated in FIG. 33 that includes Mirau objective 4167 and a sensor collar 4545. Mirau objective 4167 includes lenses 4550 and mirrors 4560 that provide a test optical path and a reference optical path for the interferometric measurement. Sensor collar 4545 includes sensors 4099A and 4099B that are connected, for example, via fibers 4012 to subsystem 4010 as shown in FIG. 33. Sensors 4099A and 4099B emit radiation perpendicular onto test object 4175, thereby forming a monitor cavity with the surface of the test object at regions that are not within the field-of-view of Mirau objective 4167.

FIG. 40 illustrates the combination of a sensor 4570 with a Michelson objective 4580. Sensor 4570 irradiates test object 4175 via a beam splitter 4585 essentially within the field-of-view of Michelson objective 4580.

FIG. 41 illustrates the implementation of two sensors 4590A and 4590B within a Linnik objective 4592. Linnik objective 4592 includes Schwarzschild optics 4594A and 4594B and polarizers P in each of a test leg 4596A and a reference leg 4596B. Sensors 4590A and 4590B are positioned in the center part of Linnik objective 4592. Sensor 4594A irradiates test object 4175 under an angle of 90 degrees, for example, within the field-of-view of Linnik objective 4580, thereby forming a first monitor cavity with the surface of test object 4175. Similarly, sensor 4594B irradiates reference object 4181 under an angle of 90 degrees, thereby forming a second monitor cavity with the surface of reference object 4181. As indicated, reference object 4181 is displacable for providing the phase shift for, e.g., an interferometric SWLI measurement.

As described above, sensor systems can be implemented in various ways depending on interferometric objective used. Moreover, sensor systems can be implemented in various ways depending on the scanning modes used for the interferometric measurement. For example, one distinguishes between focus scanning and path-length scanning depending on whether the focus is being scanned or the path length is scanned while maintaining the focus position.

In focus scanning, the position of the focal plane of interference objective relative to test surface is varied, typically by moving the objective as a whole. Focus scanning can be used with interferometric objectives whose reference surface is inaccessible—such as, for example, Mirau-type objectives.

In path-length scanning the reference surface is moved (e.g., its position is sinusoidal modulated) while the focal plane is fixed. Path-length scanning can be used with Linnik or Michelson objectives where the reference surface can be accessed and SWLI and PUPS interferometry can be performed.

As examples suited for focus-scanning, FIGS. 42A-42C show implementations of sensors with a generic objective 4600. Though one sensor is shown in FIGS. 42A-42C as well in most of the following figures, more than one sensor can be employed for redundancy or to provide angular motion information.

In FIG. 42A, a sensor 4610 is buried in a stage 4620 holding the test object and monitors the motion of generic objective 4600 relative to stage 4620. In FIG. 42B, a sensor 4630 is attached to generic objective 4600 and monitors the motion of generic objective 4600 relative to stage 4620 (if a surface part of the stage forms the monitor cavity) or directly to test object (if a surface part of the test object forms the monitor cavity). In FIG. 42C, a sensor 4640 is mounted to generic objective 4600 such that it emits a sensor beam 4650 that reflects obliquely off stage 4620 or the test surface and is then reflected back to sensor 4640 from a minor 4660 mounted on the other side of generic objective 4600. The configuration of FIG. 42C can reduce Abbé errors when sensor beam 4650 reflects from a measurement point 4670 of generic objective 4600 (as indicated in FIG. 42C) but can have a reduced vertical motion sensitivity.

Michelson and Linnik objectives allow particularly simple sensor configurations for focus scanning that reduce Abbé errors without compromising vertical sensitivity by using optics of the Michelson and Linnik objectives for defining the optical path of the sensor beam.

Figure 43A:
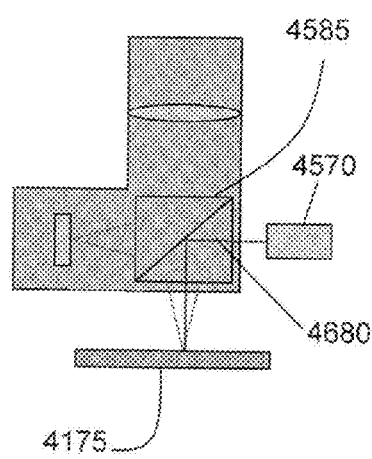
FIG. 43A is a schematic diagram showing a combination of a Michelson objective and a sensor.

For example, the combination of a Michelson objective with sensor 4570 shown in FIG. 43A corresponds to the configuration shown in FIG. 41, in which a sensor beam 4680 of sensor 4570 is reflected by beam splitter 4585 orthogonally onto test object 4175. Sensor 4570 can include a built-in reference as described, for example, in connection with FIG. 34 to provide an interferometric cavity.

Figure 43B:
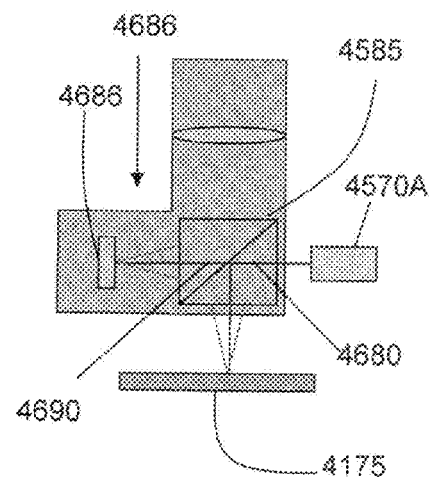
FIG. 43B is a schematic diagram showing a combination of a Michelson objective and a sensor.

In contrast to the configuration shown in FIG. 43A, the configuration shown in FIG. 43B can be operated with a sensor 4570A that does not provide a built-in reference because a reference leg 4686 of the Michelson objective provides a reference object 4688 that is used also as reference for sensor 4570A. Specifically, the interaction of beam splitter 4585 with sensor beam 4680 is configured such that a reference beam 4690 is transmitted to and reflected back from reference object 4688. Beam splitter 4585 can be based, for example, on polarization state or wavelength splitting.

Figure 43C:
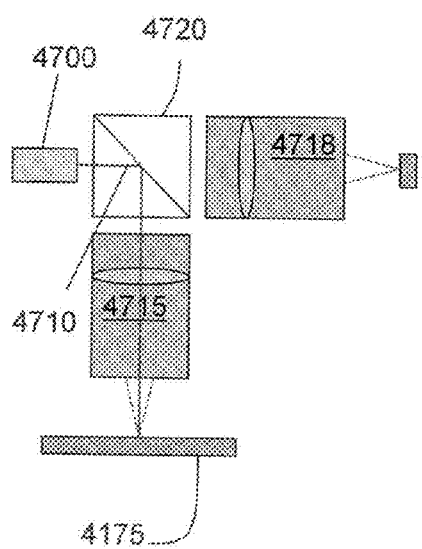
FIG. 43C is a schematic diagram showing a combination of a Linnik objective and a sensor.

As another example, the combination of a Linnik objective with a sensor 4700 and lens based test objective 4715 and lens based reference objective 4718 is shown in FIG. 43C. As in FIG. 43A, a sensor beam 4710 of sensor 4700 is reflected by beam splitter 4720 orthogonally onto test object 4175. Sensor 4700 can include a built-in reference as described, for example, in connection with FIG. 34 to provide an interferometric cavity.

Figure 43D:
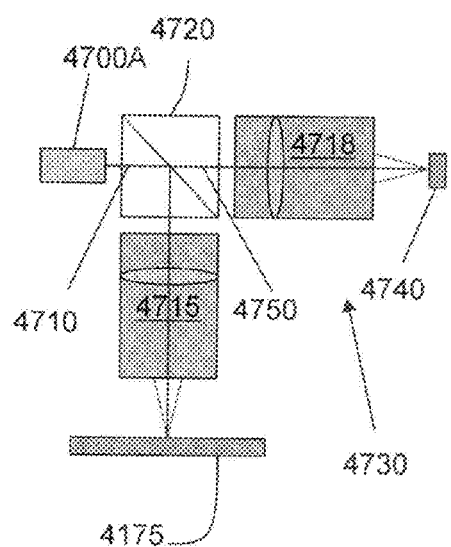
FIG. 43D is a schematic diagram showing a combination of a Linnik objective and a sensor.

In contrast to the configuration shown in FIG. 43C, the configuration shown in FIG. 43D can be operated with a sensor 4700A that does not provide a built-in reference because a reference leg 4730 of the Linnik objective provides a reference object 4740 that is used also as reference for sensor 4700A. Specifically, the interaction of beam splitter 4720 with sensor beam 4710 is configured such that a reference beam 4750 is transmitted to and reflected back from reference object 4740. Beam splitter 4720 can be based, for example, on polarization state or wavelength splitting.

While FIGS. 43A-43D were described as configurations being used with focus scanning, in certain embodiments sensor systems can be combined with interferometry systems that operate with path-length scanning. In path-length scanning, the objective reference surface rather than the target surface is scanned to vary the OPD during the interferometric measurement.

Figure 44B:
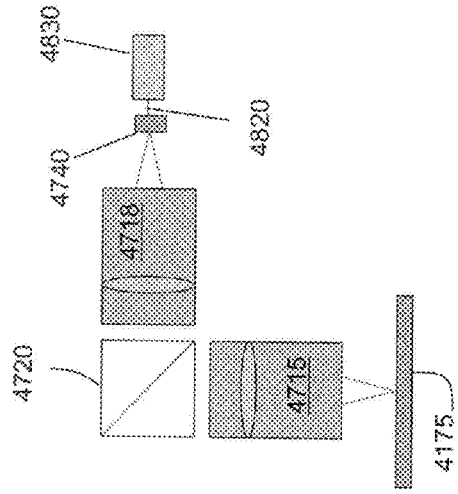
FIG. 44B is a schematic diagram showing a combination of a Linnik objective and a sensor.
Figure 44A:
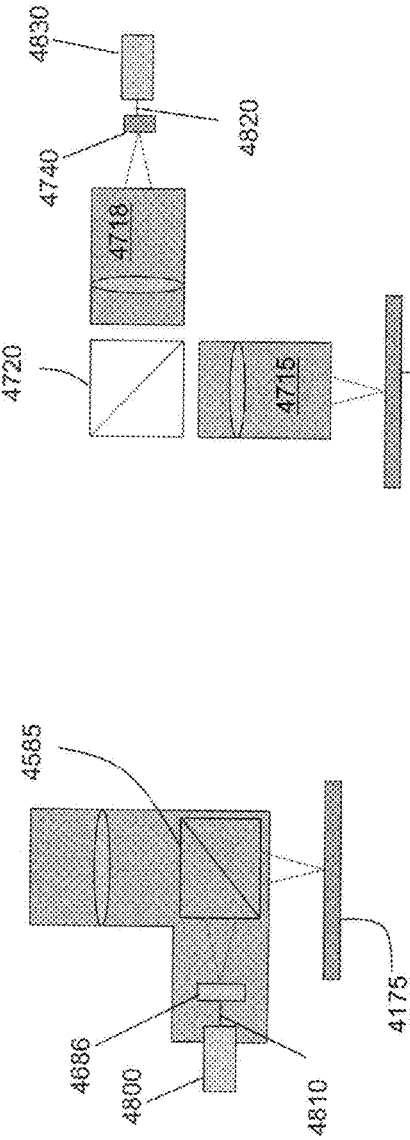
FIG. 44A is a schematic diagram showing a combination of a Michelson objective and a sensor.

For example as shown in FIG. 44A, a Michelson objective can be combined with a sensor 4800 that forms a monitor cavity with the surface of the back side of reference object 4810. A sensor beam 4820 of sensor 4800 reflected back by reference object 4810 is sensitive to motion of reference object 4810 and can be used to correct for motion errors but not for autofocus sing. Sensor 4800 can include a built-in reference as described, for example, in connection with FIG. 34 to provide an interferometric cavity.

As another example, the combination of a Linnik objective with a sensor 4830 is shown in FIG. 44B. As in FIG. 44A, a sensor beam 4840 of sensor 4830 is reflected by reference object 4686. Also sensor 4830 can include a built-in reference as described, for example, in connection with FIG. 34 to provide an interferometric cavity.

As examples using sensors without a built-in reference, the configurations as described in connection with FIGS. 43B and 43D can be used in path-length scanning. Then instead of scanning, e.g., test object 4175 or Linnik test objective 4715 in the test leg, one maintains the focus position in the test leg and varies in FIG. 43B the position of reference object 4686 and in FIG. 43D the position of reference object 4740, Linnik reference objective 4718, or both (e.g., synchronously).

In certain applications, one scans the reference surface and target surface simultaneously. Then, one can use the sensor system to monitor both motions simultaneously. Moreover, additional degrees of freedom can also be monitored, such as a reference surface tilt, which can be useful, for example, for PUPS applications.

Monitoring two or more motions simultaneously can be performed with two or more separate sensors that, for example, are connected to separate channels of subsystem 4010 as described in connection with FIG. 33. Examples how two or more sensors can be positioned at a Michelson or a Linnik interferometer are shown in FIGS. 45A-45C.

Figure 45C:
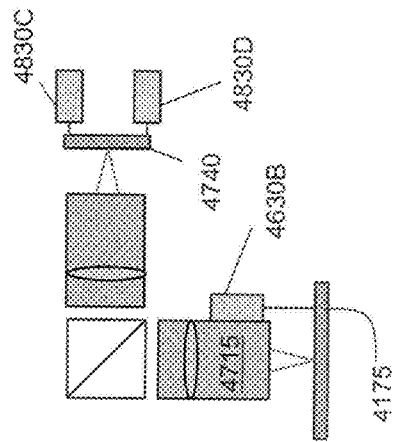
FIG. 45C is a schematic diagram showing a combination of a Linnik objective and three sensors.
Figure 45B:
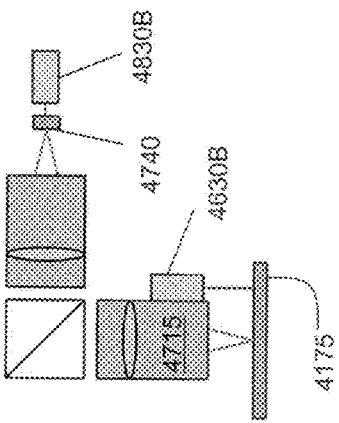
FIG. 45B is a schematic diagram showing a combination of a Linnik objective and two sensors.
Figure 45A:
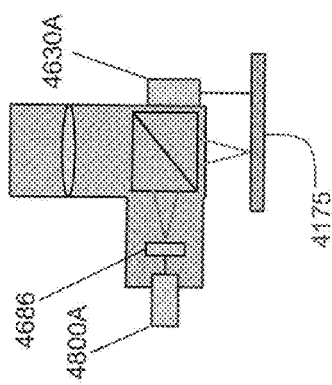
FIG. 45A is a schematic diagram showing a combination of a Michelson objective and two sensors.

FIG. 45A is a combination of the embodiments shown in FIGS. 42B and 44A in which a first sensor 4630A mounted to the Michelson objective monitors the motion of test object 4175 relative to the Michelson objective while a second sensor 4800A monitors the motion of reference object 4686.

FIG. 45B is a combination of the embodiments shown in FIGS. 42B and 44B in which a first sensor 4630B mounted to the Linnik test objective 4715 monitors the motion of test object 4175 relative to the Linnik objective while a second sensor 4830B monitors the motion of reference object 4740.

Figure 46:
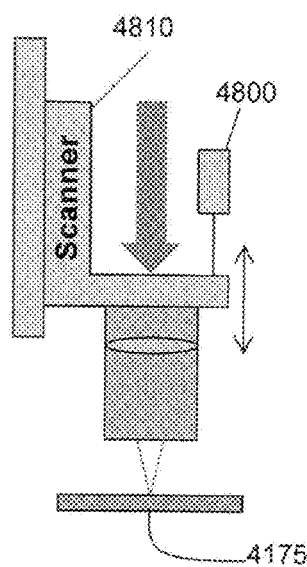
FIG. 46 is a schematic diagram showing a configuration of an objective and a scanner with a sensor.

FIG. 45C shows a configuration similar to the configuration shown in FIG. 45B in which additionally to the motion of reference object 4740 the tilt and piston of the reference surface of reference object 4740 are monitored with two sensors 4830C and 4830D. FIG. 46 shows an embodiment where a sensor 4800 monitors the motion of a scanner 4810 directly, rather than monitoring the interferometric cavity. Monitoring scanner 4810 can be performed if scanner 4810 was the largest source of motion uncertainty and thus can enable the use of more imprecise and inexpensive scanning mechanisms.

Figure 47:
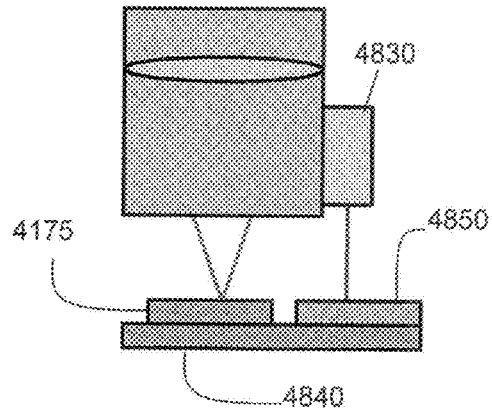
FIG. 47 is a schematic diagram showing a configuration of an objective with a sensor and a separate reference minor.
Figure 48A:
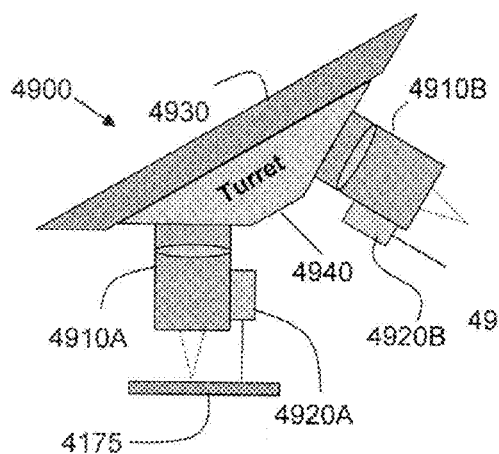
FIG. 48A is a schematic diagram showing a configuration of a turret objective with two sensors and two objectives.
Figure 48B:
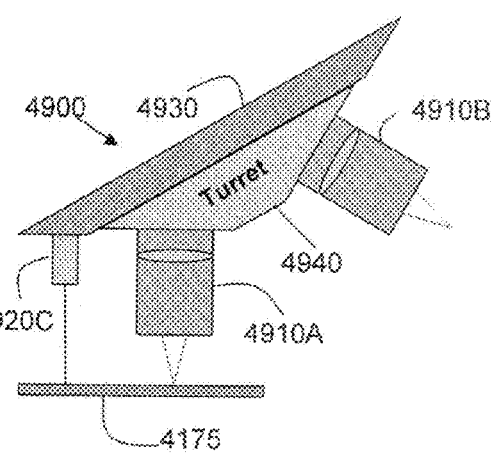
FIG. 48B is a schematic diagram showing a turret objective with a sensor and two objectives.
Figure 49A:
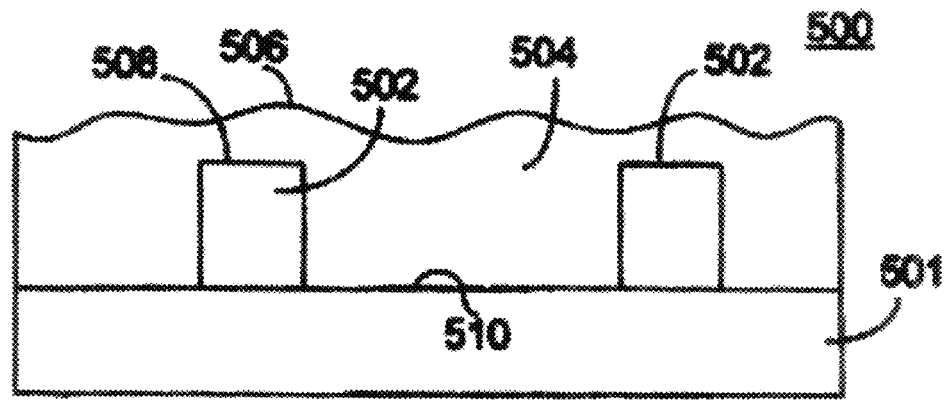
FIG. 49A is a schematic showing a device exemplary of the film structure resulting from the deposition of a dielectric over copper features deposited on a substrate.
Figure 49B:
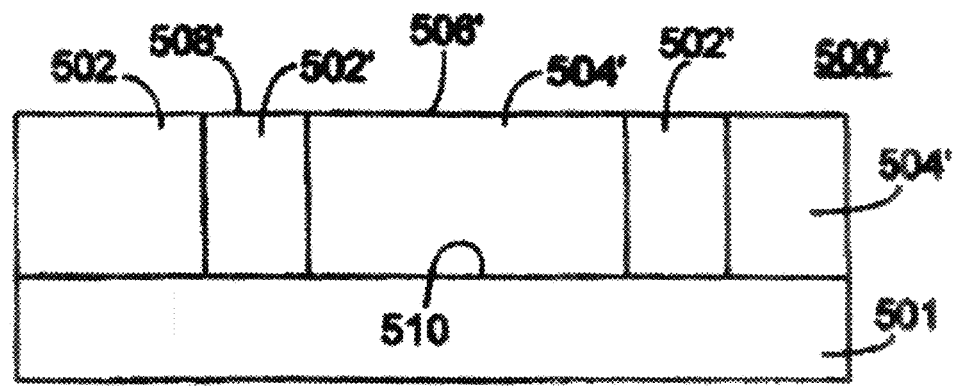
FIG. 49B is a schematic diagram of the device shown in FIG. 49A after undergoing chemical mechanical processing.
Figure 50A:
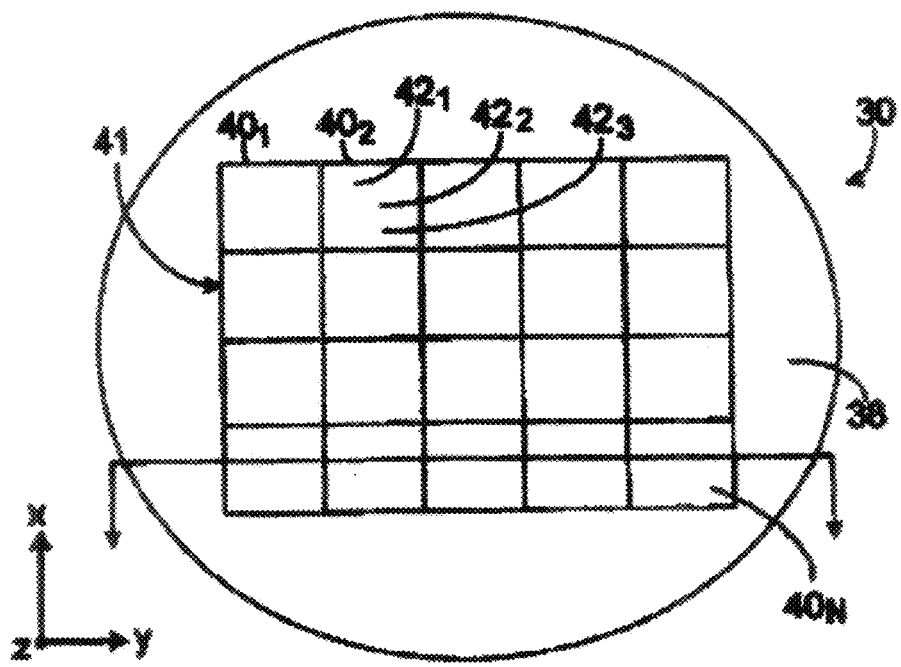
FIG. 50A is a schematic diagram showing a top down view of an object that includes a substrate, e.g., a wafer, and an overlying layer, e.g., photoresist layer.
Figure 50B:
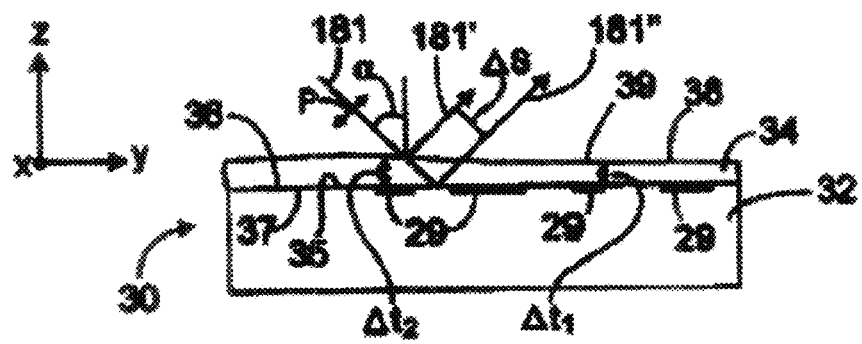
FIG. 50B is a schematic diagram showing a side on view of the object.
Figure 51A:
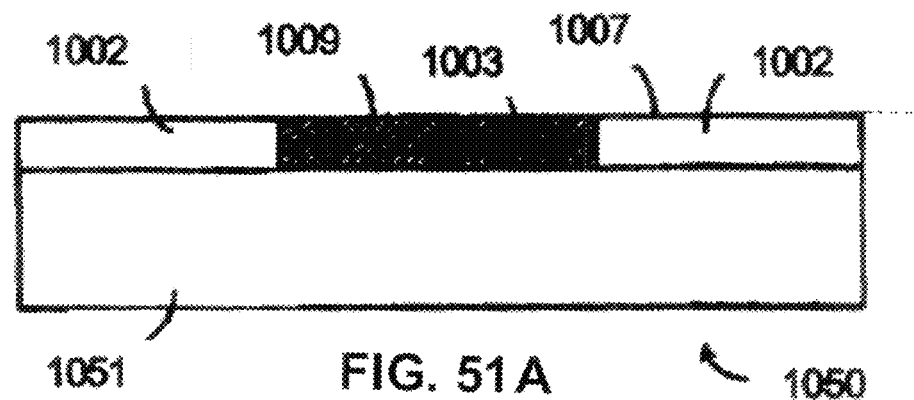
FIG. 51A is a schematic diagram of a structure suitable for use in solder bump processing.
Figure 51B:
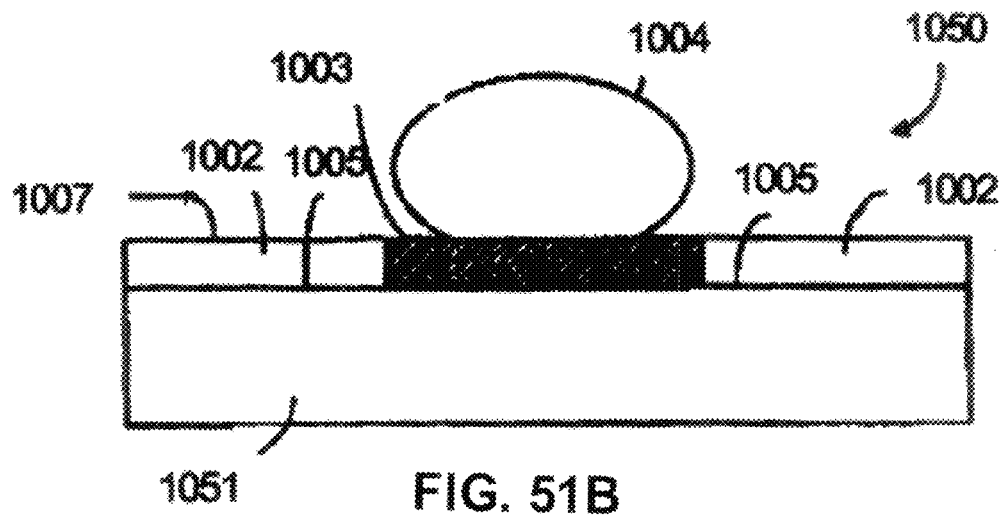
FIG. 51B is a schematic diagram of the structure from FIG. 51A after solder bump processing has occurred.
Figure 52A:
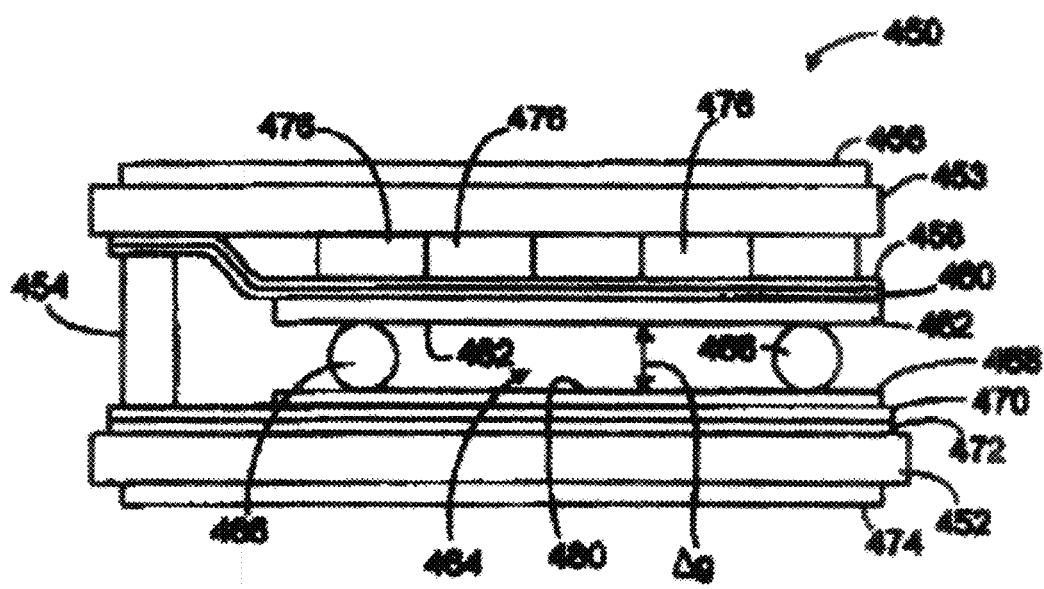
FIG. 52A is a schematic diagram of an LCD panel composed of several layers.
Figure 52B:
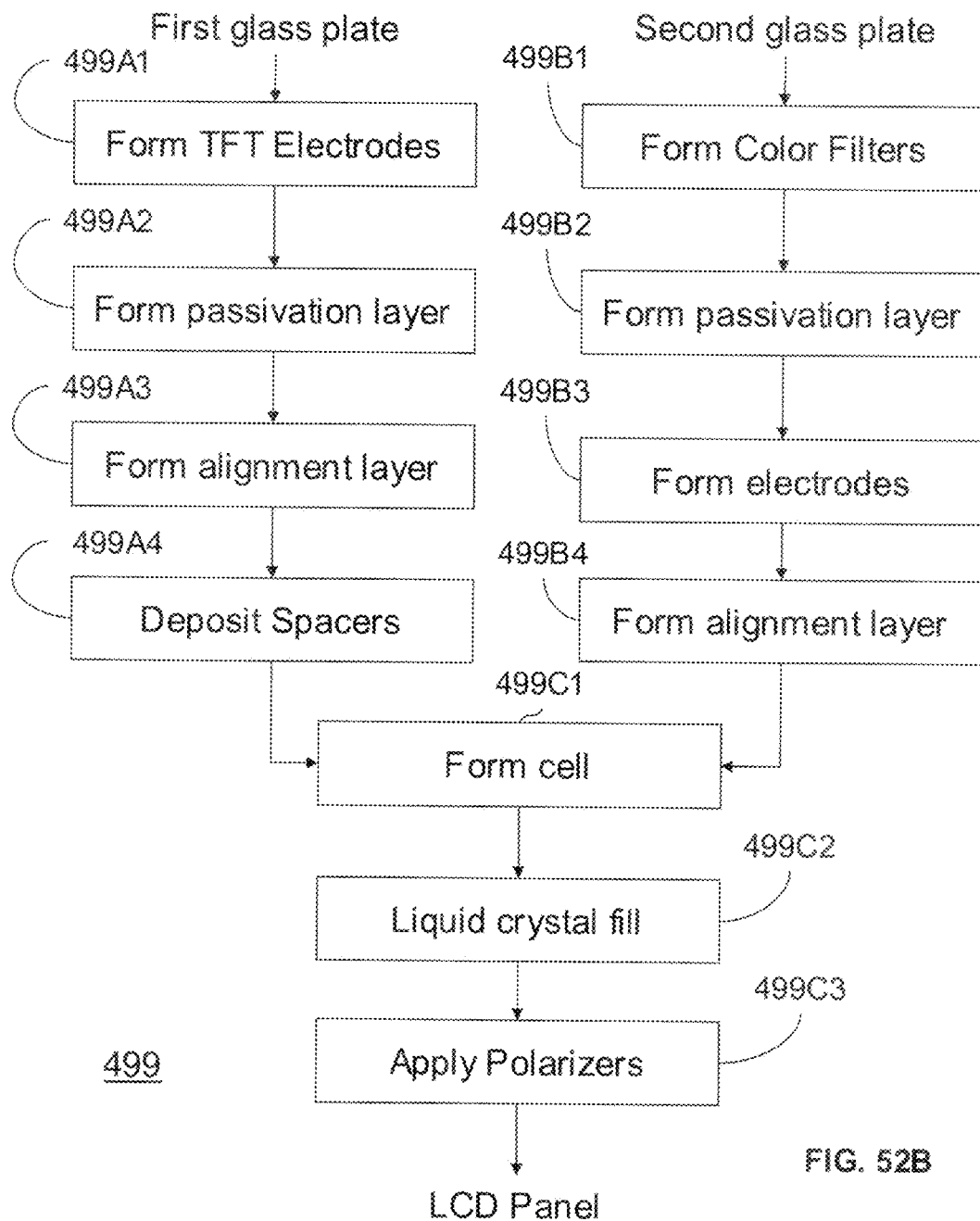
FIG. 52B is a flow chart showing various steps in LCD panel production.

FIG. 47 shows an embodiment that can allow monitoring an interferometric cavity in the case that a test surfaces 4820 of test object 4175 is too small to be directly accessed with an off-axis sensor 4830, or in the case that test surfaces 4820 of test object 4175 has a surface slope that does not provide a reliable return signal to sensor 4830. In this case, test object 4175 is mounted to a special parts stage 4840 having a mirror 4850 that sensor 4830 looks at. The mirror surface is mounted such that its surface height corresponds to the expected surface height of test object 4175. This configuration can, for example, applied in assembly line applications, where the test objects are very similar. FIGS. 48A and 48B show configurations incorporating an objective turret 4900 with a rotating part 4930 and a non-rotating part 4940. Turrets can be used in microscope applications for providing different types of objectives 4910A and 4910B with, for example, specific magnifications to the measurement. In FIG. 48A, each objective 4910A and 4910B has its own attached sensor 4920A and 4920B, while in FIG. 48B a single sensor 4920C is attached to non-rotating part 4940 of turret 4900. The configuration shown in FIG. 48A is not or at least less influenced by unanticipated motion in the mechanical linkage between rotating part 4930 and non-rotating part 4940 of turret 4900 because the motion in the mechanical linkage is at least in principle considered by sensors 4920A and 4920B. However, the configuration shown in FIG. 48B can require a smaller number of sensors and does not need to be concerned about winding the return fibers as turret 4900 is rotated.

Alternative Embodiments

While the source sub-system in some of the described embodiments include primary source 163 and a secondary source 197, other configurations are also possible. In general, the wavelength of light from secondary source 197 can vary as desired, provided the wavelength(s) is detectable by secondary detector 199. The chosen wavelength may be within the bandwidth of primary source 163, or at an entirely different wavelength. For example, primary source 163 may be selected to provide white, visible-wavelength light; while secondary source 197 provide light that is in the UV or the IR portions of the spectrum. Furthermore, secondary source 197 may provide light at a series of discrete wavelengths, either together or in sequence.

Moreover, in some embodiments, the source sub-system includes a single source, rather than separate primary and secondary sources. The single source produces both the radiation for primary detector 191 and the radiation for secondary detector 199. For example, filter 101 that is used in conjunction with secondary detector 199 can be selected to pass a single wavelength (or narrow wavelength band) from the source to secondary detector 199.

In general, secondary source 197 may be extended or a point source, and the secondary source imaging may be Koehler or critical. Generally, when using a point source with PUPS, critical illumination is preferred so as to illuminate the pupil; while for SWLI, Koehler illumination is generally preferred so as to illuminate a large area of the part.

Primary source 163 may be an LED, an arc lamp, an incandescent lamp, a white-light laser, or any other source suitable for broadband interferometry.

In embodiments, an aperture stop may be used to control the spatial extent of the light source. An intermediate-plane illumination is also feasible.

Various configurations of the detector sub-system are also possible. For example, secondary detector 199 generically may be described as a detector with a minimum of two detection points or pixels. Thus, secondary detector 199 can be a single detector with integrated detector elements (as shown in the described embodiments), or may be composed of multiple, discrete single-element detectors.

In some embodiments, a single detector can be used in place of primary detector 191 and secondary detector 199. For example, primary detector 191 can include several detector elements devoted to the task of acquiring monitor signals. This may include, for example, including separate narrowband filters in front of the corresponding detector elements, or may include optics selected so as to direct the light for the monitor signals to specific element of primary detector 191.

Various ways of introducing phase diversity between the monitor signals has been discussed. Other ways of achieving this are also possible. For example, in addition to introducing a relative tilt between the reference and measurement light to introduce fringes across the FOV of secondary detector 199, additional optical elements can be used to achieve the same effect. For example, in some embodiments, polarization elements to can be used to shift phase across the light at detector 199. This includes, for example, the limit case of a single measurement point with polarizing elements to generate relative phase shifts between the measurement and reference beams.

In the described embodiments, the detector and source sub-systems are incorporate both the primary and secondary detectors and sources, respectively. Other embodiments are also possible. For example, in some embodiments, the secondary source and detector are bundled together into a separate sub-system sharing some of the optics of the primary system. For example, the secondary source and detector may be packaged together into a module that fits between the primary detector and the rest of the system, or between the objective and the rest of the system.

Further, while the foregoing discussion assumes that the scan profile is nominally linear in time, the scan error correction techniques can be applied to other scan profiles too.

While the embodiments disclosed above feature interference microscopes having either Linnik or Mirau objectives, the techniques for scan error production can be implemented using other types of interference microscopes as well (e.g., microscopes using Michelson interferometers). More generally, the techniques are not limited to use in interference microscopes, and can be implemented using non-microscope interferometers as well.

Computer Program

Any of the computer analysis methods described above can be implemented in hardware or a combination of both. The methods can be implemented in computer programs using standard programming techniques following the method and figures described herein. Program code is applied to input data to perform the functions described herein and generate output information. The output information is applied to one or more output devices such as a display monitor. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits preprogrammed for that purpose.

Each such computer program is preferably stored on a storage medium or device (e.g., ROM or magnetic diskette) readable by a general or special purpose programmable computer, for configuring and operating the computer when the storage media or device is read by the computer to perform the procedures described herein. The computer program can also reside in cache or main memory during program execution. The analysis method can also be implemented as a computer-readable storage medium, configured with a computer program, where the storage medium so configured causes a computer to operate in a specific and predefined manner to perform the functions described herein.

Embodiments relate to interferometry systems and methods for determining information about a test object. Additional information about suitable low-coherence interferometry systems, electronic processing systems, software, and related processing algorithms is disclosed in commonly owed U.S. patent applications published as US-2005-0078318-A1 entitled "METHODS AND SYSTEMS FOR INTERFEROMETRIC ANALYSIS OF SURFACES AND RELATED APPLICATIONS," US-2004-0189999-A1 entitled "PROFILING COMPLEX SURFACE STRUCTURES USING SCANNING INTERFEROMETRY," and US-2004-0085544-A1 entitled "INTERFEROMETRY METHOD FOR ELLIPSOMETRY, REFLECTOMETRY, AND SCATTEROMETRY MEASUREMENTS, INCLUDING CHARACTERIZATION OF THIN FILM STRUCTURES," the contents of which are incorporated herein by reference.

Exemplary Applications

The low coherence interferometry methods and systems incorporating scan error correction described above may used for any of the following surface analysis problems: simple thin films; multilayer thin films; sharp edges and surface features that diffract or otherwise generate complex interference effects; unresolved surface roughness; unresolved surface features, for example, a sub-wavelength width groove on an otherwise smooth surface; dissimilar materials; polarization-dependent properties of the surface; and deflections, vibrations or motions of the surface or deformable surface features that result in incident-angle dependent perturbations of the interference phenomenon. For the case of thin films, the variable parameter of interest may be the film thickness, the refractive index of the film, the refractive index of the substrate, or some combination thereof. Exemplary applications including objects and devices exhibit such features are discussed next.

Semiconductor Processing

The systems and methods described above can be used in a semiconductor process for tool specific monitoring or for controlling the process flow itself. In the process monitoring application, single/multi-layer films are grown, deposited, polished, or etched away on unpatterned Si wafers (monitor wafers) by the corresponding process tool and subsequently the thickness and/or optical properties are measured using the interferometry system employing the scan error correction technique disclosed herein. The average, as well as within wafer uniformity, of thickness (and/or optical properties) of these monitor wafers are used to determine whether the associated process tool is operating with targeted specification or should be retargeted, adjusted, or taken out of production use.

In the process control application, latter single/multi-layer films are grown, deposited, polished, or etched away on patterned Si, production wafers by the corresponding process tool and subsequently the thickness and/or optical properties are measured with the interferometry system employing the scan error correction technique disclosed herein. Production measurements used for process control typical include a small measurement site and the ability to align the measurement tool to the sample region of interest. This site may consists of multi-layer film stack (that may itself be patterned) and thus requires complex mathematical modeling in order to extract the relevant physical parameters. Process control measurements determine the stability of the integrated process flow and determine whether the integrated processing should continue, be retargeted, redirected to other equipment, or shut down entirely.

Specifically, for example, the interferometry systems disclosed herein can be used to monitor the following equipment: diffusion, rapid thermal anneal, chemical vapor deposition tools (both low pressure and high pressure), dielectric etch, chemical mechanical polishers, plasma deposition, plasma etch, lithography track, and lithography exposure tools. Additionally, the interferometry system disclosed herein can be used to control the following processes: trench and isolation, transistor formation, as well as interlayer dielectric formation (such as dual damascene).

Copper Interconnect Structures and Chemical Mechanical Polishing

It is becoming common among chip makers to use the so-called 'dual damascene copper' process to fabricate electrical interconnects between different parts of a chip. This is an example of a process which may be effectively characterized using a suitable surface topography system. The dual damascene process may be considered to have six parts: (1) an interlayer dielectric (ILD) deposition, in which a layer of dielectric material (such as a polymer, or glass) is deposited onto the surface of a wafer (containing a plurality of individual chips); (2) chemical mechanical polishing (CMP), in which the dielectric layer is polished so as to create a smooth surface, suitable for precision optical lithography, (3) a combination of lithographic patterning and reactive ion etching steps, in which a complex network is created comprising narrow trenches running parallel to the wafer surface and small vias running from the bottom of the trenches to a lower (previously defined) electrically conducting layer, (4) a combination of metal deposition steps which result in the deposition of copper trenches and vias, (5) a dielectric deposition step in which a dielectric is applied over the copper trenches and vias, and (6) a final CMP step in which the excess copper is removed, leaving a network of copper filled trenches (and possibly vias) surrounded by dielectric material.

Referring to FIG. 20A, a device 500 is exemplary of the film structure resulting from the deposition of a dielectric 504 over copper features 502 deposited on a substrate 501. The dielectric 504 has a non-uniform outer surface 506 exhibiting height variations therealong. Interference signals obtained from device 500 can include interference patterns resulting from surface 506, an interface 508 between copper features 502 and dielectric 504, and an interface 510 between substrate 501 and dielectric 504. The device 500 may include a plurality of other features that also generate interference patterns.

Referring to FIG. 20B, a device 500' illustrates the state of device 500 after the final CMP step. The upper surface 506 has been planarized to a surface 506', and interface 508 may now be exposed to the surroundings. Interface 510 at the substrate surface remains intact. Device performance and uniformity depends critically on monitoring the planarization of surface 504. It is important to appreciate that the polishing rate, and therefore the remaining copper (and dielectric) thickness after polishing, depends strongly and in a complex manner on the polishing conditions (such as the pad pressure and polishing slurry composition), as well as on the local detailed arrangement (i.e., orientation, proximity and shape) of copper and surrounding dielectric regions. Hence, portions of surface 506 over copper elements 502 may etch at different rates than other portions of surface 506. Additionally, once interface 508 of copper elements 502 is exposed, the dielectric and copper elements may exhibit different etch rates.

This 'position dependent polishing rate' is known to give rise to variable surface topography on many lateral length scales. For example, it may mean that chips located closer to the edge of a wafer on aggregate are polished more rapidly than those located close to the center, creating copper regions which are thinner than desired near the edges, and thicker than desired at the center. This is an example of a 'wafer scale' process nonuniformity—i.e., one occurring on length scale comparable to the wafer diameter. It is also known that regions which have a high density of copper trenches polish at a higher rate than nearby regions with low copper line densities. This leads to a phenomenon known as 'CMP induced erosion' in the high copper density regions. This is an example of a 'chip scale' process non-uniformity—i.e., one occurring on a length scale comparable to (and sometimes much less than) the linear dimensions of a single chip. Another type of chip scale nonuniformity, known as 'dishing', occurs within single copper filled trench regions (which tend to polish at a higher rate than the surrounding dielectric material). For trenches greater than a few microns in width dishing may become severe with the result that affected lines later exhibit excessive electrical resistance, leading to a chip failure.

CMP induced wafer and chip scale process nonuniformities are inherently difficult to predict, and they are subject to change over time as conditions within the CMP processing system evolve. To effectively monitor, and suitably adjust the process conditions for the purpose of ensuring that any non-uniformities remain within acceptable limits, it is important for process engineers to make frequent non-contact surface topography measurements on chips at a large number and wide variety of locations. This is possible using embodiments of the interferometry methods and systems described above.

In some embodiments one or more spatial properties, e.g., the topography of surface 506 and/or the thickness of dielectric 504, are monitored by obtaining low coherence interference signals from the structure before and/or during CMP. Based on the spatial properties, the polishing conditions can be changed to achieve the desired planar surface 506'. For example, the pad pressure, pad pressure distribution, polishing agent characteristics, solvent composition and flow, and other conditions can be determined based on the spatial properties. After some period of polishing, the spatial property can again be determined and the polishing conditions changed as needed. The topography and/or thickness is also indicative of the end-point at which, e.g., surface 504' is achieved. Thus, the low coherence interference signals can be used to avoid depressions caused by over polishing different regions of the object. The low coherence interference methods and systems are advantageous in this respect because spatial properties of the device, e.g., the relative heights of the surface of the dielectric (a) over copper elements 502 and (b) over substrate surface 510 but adjacent copper elements 502 can be determined even in the presence of the multiple interfaces.

Photolithography

In many microelectronics applications, photolithography is used to pattern a layer of photoresist overlying a substrate, e.g., a silicon wafer. Referring to FIGS. 20A and 20B, an object 30 includes a substrate, e.g., a wafer, 32 and an overlying layer, e.g., photoresist layer 34. Object 30 includes a plurality of interfaces as occur between materials of different refractive index. For example, an object-surroundings interface 38 is defined where an outer surface 39 of photoresist layer 34 contacts the environment surrounding object 30, e.g., liquid, air, other gas, or vacuum. A substrate-layer interface 36 is defined between a surface 35 of wafer 32 and a bottom surface 37 of photoresist layer 34. Surface 35 of the wafer may include a plurality of patterned features 29. Some of these features have the same height as adjacent portions of the substrate but a different refractive index. Other features may extend upward or downward relative to adjacent portions of the substrate. Accordingly, interface 36 may exhibit a complex, varying topography underlying the outer surface of the photoresist.

A photolithography apparatus images a pattern onto the object. For example, the pattern may correspond with elements of an electronic circuit (or the negative of the circuit). After imaging, portions of the photoresist are removed revealing the substrate underlying the removed photoresist. The revealed substrate can be etched, covered with deposited material, or otherwise modified. Remaining photoresist protects other portions of the substrate from such modification.

To increase manufacturing efficiencies, more than one device is sometimes prepared from a single wafer. The devices may be the same or different. Each device requires that a subset of the wafer be imaged with a pattern. In some cases, the pattern is sequentially imaged onto different subsets. Sequential imaging can be performed for several reasons. Optical aberrations can prevent achieving adequate pattern focus quality over larger areas of the wafer. Even in the absence of optical aberrations, the spatial properties of the wafer and photoresist may also prevent achieving adequate pattern focus over large areas of the wafer. Aspects of the relationship between the spatial properties of the wafer/resist and focus quality are discussed next.

Referring back to FIG. 20B, object 30 is shown with a number N subsets $40_i$, each smaller than a total area 41 the object to be imaged. Within each subset $40_i$, spatial property variations, e.g., height and slope variations of the wafer or photoresist, are typically smaller than when taken over the total area 41. Nonetheless, the wafer or photoresist of different subsets $40_i$ typically have different heights and slopes. For example, layer 34 exhibits thicknesses $\Delta t_1$ and $\Delta t_2$, which vary the height and slope of surface 39. Thus, each subset of the object may have a different spatial relationship with the photolithography imager. The quality of focus is related to the spatial relationship, e.g., the distance between the object and the photolithography imager. Bringing different subsets of the object into proper focus may require relative repositioning of the object and imager. Because of the object height and slope variations, proper subset focus cannot be achieved solely by determining the position and orientation of the object with respect to a portion of the object that is remote to the imaged subset, e.g., a side 43 of the object.

Proper focus can be achieved by determining a spatial property of an object within a subset of the object to be imaged (or otherwise processed). Once the position of the subset has been determined, the object (and/or a portion of the photolithography imager) can be moved, e.g., translated, rotated, and/or tilted, to modify the position of the subset with respect to a reference, e.g., a portion of the photolithography imager. The determination and movement (if necessary) can be repeated for each subset to be imaged.

The determination of the spatial property of the subset can include determining a position and/or height of one or more points of an outer surface of a thin layer of the object, the one or more points lying within the subset of the object to be imaged. For example, the position and orientation of the outer surface 39 of subset $40_2$ (FIG. 20A) can be determined based upon the positions of points $42_1$-$42_3$ within the subset. The determination of the spatial property of the subset to be imaged can include using an interferometer to illuminate the subset with light and detecting an interference signal including light reflected from the illuminated subset. In some embodiments, a plurality of subsets are simultaneously imaged with light to obtain a plurality of interference signals. Each interference signal is indicative of one or more spatial properties of a subset. Thus, the interference signals can be used to prepare an image indicative of the topography of the object over a plurality of the subsets. During photolithography of the subsets, the wafer is positioned based upon the topography of the individual subsets as determined from the plurality of interference signals. Hence, each subset can be positioned for optimum focus with respect to the photolithography apparatus.

Detecting an interference signal from each subset of an object to be imaged can include detecting light reflected from the subset and reference light over an OPD range that is at least as large as a coherence length of the detected light. For example, the light may be detected at least over its coherence length. In some embodiments, the interferometer is configured so that the light reflected from the illuminated subset is dominated by light reflected from either an outer interface (such as outer surface 39) or an inner interface (such as interface 36). In some embodiments, a spatial property of an object is determined based on only a portion of the interference signal. For example, if the interference signal includes two or more overlapping interference patterns, a spatial property of the object can be determined based upon a portion of one of the interference patterns that is dominated by contributions from a single interface of the object.

Solder Bump Processing

Referring to FIGS. 21A and 21B, a structure 1050 is exemplary of a structure produced during solder bump processing. Structure 1050 includes a substrate 1051, regions 1002 non-wettable by solder, and a region 1003 wettable by solder. Regions 1002 have an outer surface 1007. Region 1003 has an outer surface 1009. Accordingly, an interface 1005 is formed between regions 1002 and substrate 1001.

During processing a mass of solder 1004 is positioned in contact with wettable region 1003. Upon flowing the solder, the solder forms a secure contact with the wettable region 1003. Adjacent non-wettable regions 1002 act like a dam preventing the flowed solder from undesirable migration about the structure. It is desirable to know spatial properties of the structure including the relative heights of surfaces 1007, 1009 and the dimensions of solder 1004 relative to surface 1002. As can be determined from other discussions herein, structure 1050 includes a plurality of interfaces that may each result in an interference pattern. Overlap between the interference patterns prevents accurate determinate of the spatial properties using known interference techniques. Application of the systems and methods discussed herein allow the spatial properties to be determined.

Spatial properties determined from structure 1050 can be used to change manufacturing conditions, such as deposition times for layers 1002,1003 and the amount of solder 1004 used per area of region 1003. Additionally, heating conditions used to flow the solder can also be changed based on the spatial properties to achieve adequate flow and or prevent migration of the solder.

Flat Panel Displays

The interferometry systems and methods disclosed herein can be used in the manufacture of flat panel displays such as, for example, liquid crystal displays (LCDs).

In general, a variety of different types of LCDs are used in many different applications, such as LCD televisions, desktop computer monitors, notebook computers, cell phones, automobile GPS navigation systems, automobile and aircraft entertainment systems to name a few. While the specific structure of LCDs can vary, many types of LCD utilize a similar panel structure. Referring to FIG. 23A, for example, in some embodiments, a LCD panel 450 is composed of several layers including two glass plates 452,453 connected by an edge seal 454. Glass plates 452 and 453 are separated by a gap 464, which is filled with a liquid crystal material. Polarizers 456 and 474 are applied to the outer surfaces of glass plates 453 and 452, respectively. When integrated into a LCD, one of the polarizers operates to polarize light from the display's light source (e.g., a backlight, not shown) and the other polarizer serves as an analyzer, transmitting only that component of the light polarized parallel to the polarizer's transmission axis.

An array of color filters 476 is formed on glass plate 453 and a patterned electrode layer 458 is formed on color filters 476 from a transparent conductor, commonly Indium Tin Oxide (ITO). A passivation layer 460, sometimes called hard coat layer, commonly based on SiOx is coated over the electrode layer 458 to electrically insulate the surface. An alignment layer 462 (e.g., a polyimide layer) is disposed over the passivation layer 460 to align the liquid crystal material in gap 464.

Panel 450 also includes a second electrode layer 472 formed on glass plate 452. Another hard coat layer 470 is formed on electrode layer 472 and another alignment layer 468 is disposed on hard coat layer 470. In active matrix LCDs (AM LCDs), one of the electrode layers generally includes an array of thin film transistors (TFTs) (e.g., one or more for each sub-pixel) or other integrated circuit structures.

The liquid crystal material is birefringent and modifies the polarization direction of light propagating through the LCD panel. The liquid crystal material also has a dielectric anisotropy and is therefore sensitive to electric fields applied across gap 464. Accordingly, the liquid crystal molecules change orientation when an electric field is applied, thereby varying the optical properties of the panel. By harnessing the birefringence and dielectric anisotropy of the liquid crystal material, one can control the amount of light transmitted by the panel.

The cell gap Δg, i.e., thickness of the liquid crystal material, is determined by spacers 466, which keep the two glass plates 452,453 at a fixed distance. In general, spacers can be in the form of preformed cylindrical or spherical particles having a diameter equal to the desired cell gap or can be formed on the substrate using patterning techniques (e.g., conventional photolithography techniques). The cell gap affects both the amount of optical retardation of light traversing the panel and the viscoelastic response of molecular alignment of the liquid crystal material, and therefore an important parameter to accurately control in LCD panel manufacturing.

In general, LCD panel manufacturing involves multiple process steps in forming the various layers. For example, referring to FIG. 23B, a process 499 includes forming the various layers on each glass plate in parallel, and then bonding the plates to form a cell. As illustrated, initially, TFT electrodes are formed (step 499A1) on a first glass plate. A passivation layer is formed (step 499A2) over the TFT electrodes, and then an alignment layer is formed (step 499A3) over the passivation layer. Next, spacers are deposited (step 499A4) on the alignment layer. Processing of the second glass plate typically involves forming color filters (step 499B1) and forming a passivation layer over the color filters (step 499C1). Then, electrodes (e.g., common electrodes) are formed (step 499B3) on the passivation layer, and an alignment layer is then formed (step 499B4) on the electrodes.

The cell is then formed by bonding the first and second glass plates together (step 499C1), and the cell is then filled with the liquid crystal material and sealed (step 499C2). After sealing, the polarizers are applied to the outer surface of each of the glass plates (step 499C3), providing the completed LCD panel. The combination and ordering of the steps shown in the flow chart are illustrative and, in general, other step combinations and their relative ordering can vary.

Furthermore, each step illustrated in the flow chart in FIG. 23B can include multiple process steps. For example, forming the TFT electrodes (commonly referred to as "pixel electrodes") on the first glass plate involves many different process steps. Similarly, forming the color filters on the second glass plate can involve numerous process steps. Typically, forming pixel electrodes, for example, includes multiple process steps to form the TFTs, ITO electrodes, and various bus lines to the TFTs. In fact, forming the TFT electrode layer is, in essence, forming a large integrated circuit and involves many of the same deposition and photolithographic patterning processing steps used in conventional integrated circuit manufacturing. For example, various parts of the TFT electrode layer are built by first depositing a layer of material (e.g., a semiconductor, conductor, or dielectric), forming a layer of photoresist over the layer of material, and exposing the photoresist to patterned radiation. The photoresist layer is then developed, which results in a patterned layer of the photoresist. Next, portions of the layer of material lying beneath the patterned photoresist layer are removed in a etching process, thereby transferring the pattern in the photoresist to the layer of material. Finally, the residual photoresist is stripped from the substrate, leaving behind the patterned layer of material. These process steps can be repeated many times to lay down the different components of the TFT electrode layer, and similar deposition and patterning steps are often used to form color filters as well.

In general, the interferometry techniques disclosed herein can be used to monitor production of LCD panels at a variety of different stages of their production. For example, the interferometry techniques can be used to monitor the thickness and/or uniformity of photoresist layers used during LCD panel production. As explained previously, photoresist layers are used in lithographic patterning of TFT components and color filters, for example. For certain process steps, a layer of photoresist can be studied using a low coherence interferometry system prior to exposing the photoresist to patterned radiation. The low coherence interferometry systems can measure a thickness profile of the photoresist layer at one or more locations of the glass plate. Alternatively, or additionally, the techniques can be used to determine a surface profile of the photoresist layer. In either case, where the measured photoresist layer characteristics is within specified tolerance windows, the photoresist layer can be exposed to the desired patterned radiation. Where the photoresist layer is not within the specified window, it can be stripped from the glass plate and a new photoresist layer deposited.

In some embodiments, the interferometry techniques are used to monitor characteristics of a patterned photoresist layer. For example, critical dimensions (e.g., line widths) of patterned features can be studied. Alternatively, or additionally, the interferometry techniques can be used to determine overlay error between the features in the patterned resist and features beneath the photoresist layer. Again, where measured critical dimensions and/or overlay error are outside process windows, the patterned photoresist can be stripped from the substrate and a new patterned photoresist layer formed.

In certain embodiments, the interferometry techniques can be used in conjunction with half-tone photolithography. Increasingly, half-tone photolithography is used where specific thickness variations in the features of a patterned resist layer are desired. The low coherence interferometry techniques disclosed herein can be used to monitor thickness profiles of photoresist patterns in half-tone regions. In addition, the techniques can be used to determine both overlay and critical dimensions of these features.

In some embodiments, the interferometry techniques can be used to detect contaminants (e.g., foreign particles) at different stages on the glass plates at different stages of the production process. Such contaminants can give rise to visual defects (i.e., mura defects) in display panels, ultimately affecting the manufacturer's yield. Often, such defects are only detected by visual inspection, usually performed after the panel has been assembled. The interferometry techniques disclosed herein can be used to perform automated inspection of the glass plates at one or more points during the production process. Where particles are detected, the contaminated surface of the glass plate can be cleaned before the next production step. Accordingly, use of the techniques can reduce the occurrence of mura defects in panels, improving panel quality and reducing manufacturing costs.

Among other factors, the electrooptic properties (e.g., the contrast ratio and brightness) are dependent on the cell gap $\Delta g$. Cell gap control during manufacturing is often critical to obtaining uniform, quality displays. In certain embodiments, the disclosed interferometry techniques can be used to ensure that cell gap has desired uniformity. For example, the techniques can be used to monitor the height and/or position of spacers on a glass plate. Monitoring and controlling spacer height, for example, can reduce cell gap variations across a display.

In some cases, the actual cell gap may differ from the dimensions of spacers because, during assembly, pressure or vacuum is applied to introduce the liquid crystal medium, the edge seals cure and may change dimensions, and the added liquid crystal material can generates capillary forces between the glass plates. Both before and after adding the liquid crystal mater, the surfaces of the exposed layers on the glass plates reflect light that results in an interference pattern indicative of the cell gap $\Delta g$. The low coherence nature of the interference signal either itself or in combination with the described interference signal processing techniques can be used to monitor properties of the cell including the cell gap $\Delta g$ during manufacture even in the presence of interfaces formed by other layers of the cell.

An exemplary method can include obtaining a low coherence interference signal including interference patterns indicative of the cell gap $\Delta g$ prior to adding the liquid crystal material. The cell gap (or other spatial property of the cell) is determined from the interference patterns and can be compared to a specified value. Manufacturing conditions, e.g., a pressure or vacuum applied to the glass plates can be changed to modify the cell gap $\Delta g$ if a difference between the specified value and the determined cell gap exceeds tolerances. This process can be repeated until achieving the desired cell gap. Liquid crystal material is then introduced into the cell. The amount of liquid crystal medium to be added can be determined from the measured spatial property of the cell. This can avoid over- or underfilling the cell. The filling process can also be monitored by observing interference signals from the surfaces of the exposed layers on the glass plates. Once the cell has been filed, additional low coherence interference patterns are obtained to monitor the cell gap $\Delta g$ (or other spatial property). Again, the manufacturing conditions can be changed so that the cell gap is maintained or brought within tolerances.

In certain LCDs, the alignment layers include protruding structures that provide desired alignment characteristics to the liquid crystal material. For example, some LCDs have more than one alignment domain for each pixel of the display where protruding alignment structures provide the different align domains. Low coherence interferometry can be used to measure various properties of the protrusions, such as, for example, their shape, line width, height, and/or overlay error with respect to underlying features of the LCD panel. Where the protrusions are determined to be unsatisfactory, they can be repaired or removed and rebuilt as necessary.

In general, low coherence interferometry systems can be set up to monitor various stages of LCD panel production as desired. In some embodiments, inspection stations including an interferometry system can be set up in the manufacturing line itself. For example, monitoring stations can be installed in the clean manufacturing environment where the photolithography steps are performed. Delivery of the glass plates to and from the inspection stations can be entirely automated, being performed robotically. Alternatively, or additionally, inspection stations can be established removed from the manufacturing line. For example, where only a sampling of the displays are to be tested, the samples can be retrieved from the manufacturing line and taken offline for testing.

Referring to FIG. 23C, an exemplary inspection station 4000 includes a table 4030, which includes a gantry 4020 on which an interferometric sensor 4010 (e.g., an interferometric microscope, such as disclosed previously) is mounted. Table 4030 (which can include vibration isolation bearings) supports a LCD panel 4001 (or glass plate) and positions panel 4001 with respect to sensor 4010. Sensor 4010 is mounted to gantry 4020 via a rail that allows the sensor to move back and forth in the direction of arrow 4012. Gantry 4020 is mounted on table 4030 on rails that allows the gantry to move back and forth in the direction of arrow 4014. In this way, inspection station 4000 can move sensor 4010 to inspect any location on display panel 4001.

Station 4000 also includes control electronics 4050 which controls the positioning system for sensor 4010 and acquires the signals from sensor 4010 that include information about panel 4001. In this way, control electronics 4050 can coordinate sensor positioning with data acquisition.

Laser Scribing and Cutting

Lasers can be used to scribe objects in preparation for separating different, concurrently manufactured structures, e.g., microelectronics structures. The quality of separation is related to the scribing conditions, e.g., laser focus size, laser power, translation rate of the object, and scribe depth. Because the density of features of the structure may be large, the scribe lines may be adjacent thin film or layers of the structures. Interfaces associated with the thin film or layers may create interference patterns that appear when interferometry is used to determine the scribe depth. The methods and systems described herein can be used to determine the scribe depth even in the presence of such adjacent films or layers.

An exemplary method can include scribing one or more electronic structures and separating the structures along the scribe lines. Before and/or after separation, low coherence interference signals can be used to determine the depth of scribe. Other scribing conditions are known, e.g., laser spot size, laser power, translation rate. The scribe depth can be determined from the interference signals. The quality of separation as a function of the scribing conditions, including the scribe depth, can be determined by evaluating the separated structures. Based on such determinations, the scribing conditions necessary to achieve a desired separation quality can be determined. During continued manufacturing, low coherence interference signals can be obtained from scribed regions to monitor the process. Scribing conditions can be changed to maintain or bring the scribe properties within tolerances.

A number of embodiments of the invention have been described. Other embodiments are in the claims.

What is claimed is:

1. An interferometry system, comprising:
    a detector sub-system comprising a monitor detector;
    interferometer optics for combining test light from a test object with primary reference light from a first reference interface and secondary reference light from a second reference interface to form a monitor interference pattern on a monitor detector, wherein the first and second reference interfaces are mechanically fixed with respect to each other and the test light;
    a scanning stage configured to scan an optical path difference (OPD) between the test light and the primary and secondary reference light to the monitor detector while the detector sub-system records the monitor interference pattern for each of a series of OPD increments; and an electronic processor electronically coupled to the detector sub-system and the scanning stage, the electronic processor being configured to determine information about the OPD increments based on the detected monitor interference pattern.

2. The interferometry system of claim 1, wherein the detector sub-system comprises a primary detector and the interferometer optics are arranged to combine test light and first reference light to form a primary interference pattern on the primary detector, the primary interference pattern being different from the monitor interference pattern.

3. The interferometry system of claim 2, wherein the electronic processor is configured to determine information about the test object based on the detected primary interference pattern.

4. The interferometry system of claim 3, wherein determining information about the test object comprises reducing uncertainty in the information about the test object due to vibrations in the interferometry system based on the information about the OPD increments.

5. The interferometry system of claim 2, wherein the interferometer optics are configured so that the primary detector receives none of the secondary reference light.

6. The interferometry system of claim 5, wherein the interferometer optics comprise an aperture stop positioned to transmit test light and primary reference light to the primary detector, but block secondary reference light from the primary detector.

7. The interferometry system of claim 5, wherein the interferometer optics comprise a wavelength filter that transmits test light and primary reference light to the primary detector, but blocks secondary reference light from the primary detector.

8. The interferometry system of claim 1, wherein the monitor detector is a multi-element detector and the first and second reference interfaces are configured so that a relative phase difference between the primary and secondary reference light varies across a field of view of the multi-element detector.

9. The interferometry system of claim 1, wherein the first and second reference interfaces are arranged so that the primary and secondary reference light propagate along non-parallel paths at the monitor detector.

10. The interferometry system of claim 1, wherein the first and second reference interfaces are surfaces.

11. The interferometry system of claim 10, wherein the first and second reference interfaces correspond to opposing surfaces of a common optical element.

12. The interferometry system of claim 11, wherein the common optical element is a wedge.

13. The interferometry system of claim 10, wherein the first and second interfaces correspond to surfaces of different optical elements.

14. The interferometry system of claim 1, wherein the interferometer optics define an optical axis and the first and second interfaces are oriented at different angles with respect to the optical axis.

15. The interferometry system of claim 1, further comprising an illumination sub-system for producing the test light, primary reference light, and secondary reference light.

16. The interferometry system of claim 15, wherein the illumination sub-system comprises a common light source that produces the test light, primary reference light, and secondary reference light.

17. The interferometry system of claim 16, wherein the common source is a broadband source.

18. The interferometry system of claim 15, wherein the illumination sub-system comprises a primary source for providing the test light and primary reference light and a monitor source for providing the secondary reference light.

19. A method, comprising:
    combining test light from a test object with primary reference light from a first reference interface and secondary reference light from a second reference interface to form a monitor interference pattern on a monitor detector, wherein the first and second reference interfaces are mechanically fixed with respect to each other and the test light;
    scanning an optical path difference (OPD) between the test light and the primary and secondary reference light to the monitor detector;
    recording the monitor interference pattern for each of a series of OPD increments; and determining information about the OPD increments based on the detected monitor interference pattern.

* * * * *